US012795345B2

(12) United States Patent
Zhang et al.

(10) Patent No.: US 12,795,345 B2
(45) Date of Patent: Nov. 10, 2026

(54) COMMUNICATION SHARING METHOD AND SYSTEM, AND RELATED APPARATUS

(71) Applicant: HUAWEI TECHNOLOGIES CO., LTD., Shenzhen (CN)

(72) Inventors: Xiaoquan Zhang, Beijing (CN); Tao Li, Beijing (CN); Qiaoyan Ba, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 18/906,963

(22) Filed: Oct. 4, 2024

(65) Prior Publication Data

US 2025/0031026 A1 Jan. 23, 2025

Related U.S. Application Data

(63) Continuation of application No. PCT/CN2023/107163, filed on Jul. 13, 2023.

(30) Foreign Application Priority Data

Jul. 26, 2022 (CN) ........................ 202210886323.X

(51) Int. Cl.
*H04W 8/18* (2009.01)

(52) U.S. Cl.
CPC .................................... *H04W 8/18* (2013.01)

(58) Field of Classification Search
CPC ... H04M 1/72412; H04W 12/43; H04W 4/60; H04W 4/80; H04W 76/14; H04W 8/18; H04W 8/205; G06F 1/1698; G06F 3/04817; G06F 3/04847
See application file for complete search history.

(56) References Cited

U.S. PATENT DOCUMENTS 11,089,134 B1 8/2021 Gordon et al.
12,003,387 B2 * 6/2024 Sundermeyer ...... G06F 3/04817
2004/0204087 A1 10/2004 Carlsson
(Continued)

FOREIGN PATENT DOCUMENTS

CN 101742731 A 6/2010
CN 105611524 A 5/2016
(Continued)

OTHER PUBLICATIONS

Extended European Search Report in European Appln. No. 23845329.4, mailed on May 21, 2025, 5 pages.
(Continued)

*Primary Examiner* — Amy R Hsu
(74) *Attorney, Agent, or Firm* — Fish & Richardson P.C.

(57) ABSTRACT

In an example method, a device A may send SIM card information of device A to device B, and device B can use the SIM card information of device A as SIM card information of a virtual SIM card in device B. Device B may access the Internet, make and answer calls, and receive and send SMS messages through the SIM card of device A. The technical solutions provided in this application are implemented, so that when device B has no SIM card, or a SIM card inserted into the device B has no service, the SIM card of device A may be used to access the Internet, make and answer calls, and receive and send SMS messages.

20 Claims, 57 Drawing Sheets

(56) References Cited

U.S. PATENT DOCUMENTS

| | | | | |
|---|---|---|---|---|
| 2007/0004457 | A1* | 1/2007 | Han | H04W 8/20 455/558 |
| 2010/0275135 | A1* | 10/2010 | Dunton | H04L 12/282 715/753 |
| 2016/0117076 | A1 | 4/2016 | Kim et al. | |
| 2017/0220226 | A1* | 8/2017 | Wu | G06F 3/0485 |

FOREIGN PATENT DOCUMENTS

| | | | |
|---|---|---|---|
| CN | 106304027 | A | 1/2017 |
| CN | 108419232 | A | 8/2018 |
| CN | 113630910 | A | 11/2021 |
| CN | 113726640 | A | 11/2021 |

OTHER PUBLICATIONS

International Search Report and Written Opinion in International Appln. No. PCT/CN2023/107163, mailed on Aug. 23, 2023, 10 pages (with English Translation).

* cited by examiner

Mobile phone 40

CONT. FROM FIG. 48A-1

CONT. FROM FIG. 48A-1

COMMUNICATION SHARING METHOD AND SYSTEM, AND RELATED APPARATUS

CROSS-REFERENCE TO RELATED APPLICATIONS

This application is a continuation of International Application No. PCT/CN2023/107163, filed on Jul. 13, 2023, which claims priority to Chinese Patent Application No. 202210886323.X filed on Jul. 26, 2022. Both of the aforementioned applications are hereby incorporated by reference in their entireties.

TECHNICAL FIELD

This application relates to the field of terminals and communication technologies, and in particular, to a communication sharing method and system, and a related apparatus.

BACKGROUND

Currently, when a device B has no subscriber identity module (SIM) card, or the device B is not in a network area covered by an operator corresponding to a SIM card in the device B, the device B cannot perform communication services such as Internet access, call making and answering, and SMS message receiving and sending. A device A has a SIM card, and in a network area covered by an operator corresponding to the SIM in the device A, the device A has communication capabilities such as Internet access, call making and answering, and SMS message receiving and sending. The device B may access the Internet by connecting to a hotspot of the device A. However, the device B still cannot perform communication through a call or receive and send SMS messages. Alternatively, a user may remove the SIM card of the device A and insert the SIM card into the device B. In this way, the device B can perform communication such as Internet access, call making, and SMS message sending. However, in this case, the device A cannot perform communication such as Internet access, call making, and SMS message sending.

Therefore, how to share the communication capabilities of the device A with the device B without removing the SIM card of the device A to the device B is an urgent problem to be resolved.

SUMMARY

This application provides a communication sharing method and system, and a related apparatus. According to the communication sharing method provided in embodiments of this application, a communication capability of a device A may be shared with a device B without removing a SIM card of the device A to the device B.

According to a first aspect, this application provides a communication sharing method. The method may be applied to a communication sharing system, the system includes a first device, a second device, and a network device, and the method includes: The first device displays a first collaboration interface, where an icon of the first device and an icon of the second device are displayed on the first collaboration interface; the first device detects a first operation, where the first operation is used to enable the icon of the second device to approach the icon of the first device; the first device displays a first option box in response to the first operation, where the first option box is used to select to share a mobile communication capability of the second device; the first device detects a second operation, where the second operation is used to select the first device for sharing the mobile communication capability of the second device; the first device obtains first information in SIM card information of a first SIM card of the second device in response to the second operation; the first device receives a first request of a first application; the first device sends the first request of the first application to the second device, and indicates the second device to send the first request to the network device based on the first SIM card corresponding to the first information; the second device sends the first request to the network device; the network device sends a first response to the second device based on the first request; and the second device sends the first response to the first device.

The SIM card information of the first SIM card includes at least one of the following items: an integrated circuit card identity ICCID, an international mobile subscriber identity IMSI, a mobile subscriber international integrated services digital network number MSISDN, an authentication key, an operator root key, and an authentication algorithm; and the first information includes at least one of the following items: the integrated circuit card identity ICCID, the international mobile subscriber identity IMSI, and the mobile subscriber international integrated services digital network number MSISDN in the SIM card information of the first SIM card.

In this way, based on the first information in the first SIM card information of the second device, the mobile communication capability provided by the first SIM card in the second device may be shared with the first device. In this way, when no SIM card is inserted into the first device or the first device has no SIM card capability, the first device can still use a mobile communication network through the first SIM card in the first device, to access the Internet, make and answer calls, receive and send SMS messages, and the like.

With reference to the first aspect, in a possible implementation, after the first device obtains the first information in the SIM card information of the first SIM card of the second device in response to the second operation, the method further includes: The first device displays first prompt information in a status bar of the first device, where the first prompt information includes at least one of the following items: signal strength of mobile communication provided by the first SIM card, an operator name corresponding to the first SIM card, and a network standard corresponding to the first SIM card.

In this way, a user may be prompted, on a user interface of the first device, that the first device has the mobile communication capability. In this way, user experience can be improved.

With reference to the first aspect, in a possible implementation, after the first device displays the first prompt information in the status bar of the first device, the method further includes: The first device disconnects from the second device, and the first device stops displaying the first prompt information.

In this way, the user may be prompted, on the user interface of the first device, that the first device no longer has the mobile communication capability. In this way, user experience can be improved.

With reference to the first aspect, in a possible implementation, after the first device obtains the first information in the SIM card information of the first SIM card of the second device in response to the second operation, the method may further include: The first device displays second prompt information, where the second prompt information indicates that the first device uses the mobile communication capability of the second device.

In this way, the user may learn, on a user interface of the second device, that the mobile communication capability of the second device is shared with the first device. In this way, user experience can be improved.

With reference to the first aspect, in a possible implementation, after the first device displays the second prompt information, the method may further include: The first device disconnects from the second device, and the first device stops displaying the second prompt information.

The second prompt information includes the icon of the second device and a mobile communication capability sharing icon.

In this way, the user may learn, on the user interface of the first device, that the first device stops sharing of the mobile communication capability. In this way, user experience can be improved.

With reference to the first aspect, in a possible implementation, after the first device obtains the first information in the SIM card information of the first SIM card of the second device in response to the second operation, the method may further include: The second device displays third prompt information in a status bar of the second device, where the third prompt information indicates that the second device shares the mobile communication capability.

In this way, a user may be prompted, on a user interface of the second device, that the second device shares the mobile communication capability. In this way, user experience can be improved.

With reference to the first aspect, in a possible implementation, after the second device displays the third prompt information in the status bar of the second device, the method may further include: The first device disconnects from the second device, and the second device stops displaying the third prompt information.

The third prompt information includes a mobile communication capability sharing icon.

In this way, the user may learn, on the user interface of the second device, that the second device stops sharing the mobile communication capability. In this way, user experience can be improved.

With reference to the first aspect, in a possible implementation, after the first device obtains the first information in the SIM card information of the first SIM card of the second device in response to the second operation, the method may further include: The second device displays fourth prompt information, where the fourth prompt information prompts the second device to share the mobile communication capability with the first device.

In this way, a user may be prompted, on a user interface of the second device, that the second device shares the mobile communication capability. In this way, user experience can be improved.

With reference to the first aspect, in a possible implementation, after the second device displays the fourth prompt information, the method may further include: The first device disconnects from the second device, and the second device stops displaying the fourth prompt information.

The fourth prompt information includes the icon of the first device and a mobile communication capability sharing icon.

In this way, the user may learn, on the user interface of the second device, that the second device stops sharing the mobile communication capability. In this way, user experience can be improved.

With reference to the first aspect, in a possible implementation, the method may further include: The first device displays a first prompt box, where a first pop-up window indicates whether a user selects the first device to use the mobile communication capability of the second device; the first device detects a third operation, where the third operation is used to select, in the first pop-up window, the first device to use the mobile communication capability of the second device; and the first device obtains the first information in the SIM card information of the first SIM card of the second device in response to the third operation.

In this way, the second device may automatically prompt, by using the first prompt box, the user to connect the second device to the first device, and share the mobile communication capability of the first device. In this way, user experience can be improved.

With reference to the first aspect, in a possible implementation, that the first device displays a first option box in response to the first operation specifically includes: The first device displays a first control in response to the first operation; the first device detects a fourth operation performed on the first control; and the first device displays the first option box in response to the fourth operation.

With reference to the first aspect, in a possible implementation, the method may further include: The second device displays a second collaboration interface, where the icon of the first device and the icon of the second device are displayed on the second collaboration interface; the second device detects a fifth operation, where the first operation is used to enable the icon of the first device to approach the icon of the second device; the second device displays a second option box in response to the fifth operation, where the second option box is used to select to share the mobile communication capability of the second device with the first device; the second device detects a sixth operation, where the sixth operation is used to select the second device to share the mobile communication capability of the second device with the first device; and the second device sends the first information in the SIM card information of the first SIM card of the second device to the first device in response to the sixth operation.

In this way, a user may perform an operation on the second device, to establish a connection between the first device and the second device, so that the first device obtains the first information in the SIM card information of the first SIM card of the second device.

With reference to the first aspect, in a possible implementation, the method may further include: The second device displays a first setting bar, where the first setting bar is used to set and display a limit of traffic that is of a mobile communication network and that can be provided by the second device for the first device.

With reference to the first aspect, in a possible implementation, the method may further include: When a value of traffic that is of the mobile communication network and that is provided by the second device for the first device reaches the limit of the traffic that is of the mobile communication network and that can be provided by the second device for the first device, the second device stops providing the mobile communication network for the first device.

In this way, the second device may limit the traffic of the mobile communication network shared with the first device. In this way, an excessively high data traffic fee generated by the second device can be avoided.

With reference to the first aspect, in a possible implementation, the method may further include: The first device displays a first notification box, where the first notification box is used to display a value of traffic that is used by the first device and that is of a mobile communication network provided by the second device.

In this way, a user may learn in real time the value of the traffic that is used by the first device and that is of the mobile communication network provided by the second device. In this way, user experience can be improved.

With reference to the first aspect, in a possible implementation, the method may further include: The second device displays a second notification box, where the second notification box is used to display a value of traffic that is used by the first device and that is of a mobile communication network provided by the second device.

In this way, a user may learn in real time the value of the traffic that is used by the first device and that is of the mobile communication network provided by the second device. In this way, user experience can be improved.

With reference to the first aspect, in a possible implementation, after the first device obtains the first information in the SIM card information of the first SIM card of the second device in response to the second operation, the method may further include: displaying a first dialing control on a call making interface of the first device, where the first dialing control indicates the first device to perform dialing through the first SIM card of the second device.

In this way, a user may learn, on the call making interface of the first device, that dialing can be performed through the first SIM card of the second device. In this way, user experience can be improved.

With reference to the first aspect, in a possible implementation, after the first device obtains the first information in the SIM card information of the first SIM card of the second device in response to the second operation, the method may further include: displaying a first tab on an SMS message sending interface of the first device, where the first tab is used by the first device to select to send an SMS message through the first SIM card of the second device.

In this way, a user may learn, on the SMS message sending interface of the first device, that the SMS message can be sent through the first SIM card of the second device. In this way, user experience can be improved.

With reference to the first aspect, in a possible implementation, after the first device obtains the first information in the SIM card information of the first SIM card of the second device in response to the second operation, the method may further include: displaying a first virtual SIM card on a SIM card management interface of the first device, where the first virtual SIM card is generated by the first device based on the first information.

In this way, a user may manage and set the virtual SIM card on the SIM card management interface of the first device. In this way, user experience can be improved.

With reference to the first aspect, in a possible implementation, there is a second SIM card in the first device, and the method may further include: displaying an intelligent switching option on the SIM card management interface of the first device, where the intelligent switching option is used to enable or disable intelligent selection, of the first virtual SIM card or the second SIM card, that is performed by the first device for mobile communication.

In this way, intelligent SIM card switching may be performed based on network conditions of the first virtual SIM card and the second SIM card, so that network quality deterioration of a SIM card does not cause freezing of the first device. In this way, user experience can be improved.

With reference to the first aspect, in a possible implementation, the first request is used to request to establish a cellular mobile data network, and the first response indicates that the cellular mobile data network is successfully established. After the second device sends the first response to the first device, the method may further include: The first device sends first network data of the first application to the second device; the second device sends the first network data to the network device; the network device sends second network data to the second device based on the first network data; and the second device sends the received second network data to the first device.

In this way, the first device may obtain cellular mobile network data through the second device.

With reference to the first aspect, in a possible implementation, the first request is used to request to make a call, and the first response indicates that the call is successfully made. After the second device sends the first response to the first device, the method may further include: The first device sends first call data of the first application to the second device; the second device sends the first call data to the network device through the first SIM card; and the network device sends the first call data to a target device.

In this way, the first device may make a call through the first SIM card of the second device.

With reference to the first aspect, in a possible implementation, the first request is used to request to send first SMS message data, the first request carries the first SMS message data, and the first response indicates that the first SMS message data is successfully sent.

In this way, the first device may send an SMS message through the second device.

With reference to the first aspect, in a possible implementation, before the first device receives the first request of the first application, the method may include: The first device detects a seventh operation of the user, where the seventh operation is used to use the first virtual SIM card generated based on the first information as a default dialing card; and the first device sets the first virtual SIM card as the default dialing card in the first device in response to the seventh operation.

In this way, the first virtual SIM card may be set as the default dialing card in the first device.

With reference to the first aspect, in a possible implementation, the second SIM card is inserted into the first device, and the method may further include: The first device detects an eighth operation of the user, where the eighth operation is used to set the second SIM card as a default outgoing call display card; and the first device sets the second SIM card as the default outgoing call display card in response to the eighth operation. After the network device sends the first call data to the target device, the method may further include: The target device displays a mobile subscriber international integrated services digital network number of the second SIM card.

In this way, the first device may make a call through the first virtual SIM card, but a call receiving party, namely, the target device, still displays the subscriber number of the second SIM card of the first device as an incoming call number. In this way, leakage of a subscriber number of the first SIM card in the second device can be avoided.

According to a second aspect, a communication sharing method is provided. The method is applied to a first device, and the method may include: The first device displays a first collaboration interface, where an icon of the first device and an icon of a second device are displayed on the first collaboration interface; the first device detects a first operation, where the first operation is used to enable the icon of the second device to approach the icon of the first device; the first device displays a first option box in response to the first operation, where the first option box is used to select to share a mobile communication capability of the second device; the first device detects a second operation, where the second operation is used to select the first device for sharing the mobile communication capability of the second device; the first device obtains first information in SIM card information of a first SIM card of the second device in response to the second operation; the first device receives a first request of a first application; the first device sends the first request of the first application to the second device, and indicates the second device to send the first request to the network device through the first SIM card corresponding to the first information; and the first device receives a first response sent by the second device, where the first response is sent by the network device to the second device after the network device receives the first request sent by the second device.

The SIM card information of the first SIM card includes at least one of the following items: an integrated circuit card identity ICCID, an international mobile subscriber identity IMSI, a mobile subscriber international integrated services digital network number MSISDN, an authentication key, an operator root key, and an authentication algorithm; and the first information includes at least one of the following items: the integrated circuit card identity ICCID, the international mobile subscriber identity IMSI, and the mobile subscriber international integrated services digital network number MSISDN in the SIM card information of the first SIM card.

In this way, based on the first information in the first SIM card information of the second device, the mobile communication capability provided by the first SIM card in the second device may be shared with the first device. In this way, when no SIM card is inserted into the first device or the first device has no SIM card capability, the first device can still use a mobile communication network through the first SIM card in the first device, to access the Internet, make and answer calls, receive and send SMS messages, and the like.

With reference to the second aspect, in a possible implementation, after the first device obtains the first information in the SIM card information of the first SIM card of the second device in response to the second operation, the method further includes: The first device displays first prompt information in a status bar of the first device, where the first prompt information includes at least one of the following items: signal strength of mobile communication provided by the first SIM card, an operator name corresponding to the first SIM card, and a network standard corresponding to the first SIM card.

In this way, a user may be prompted, on a user interface of the first device, that the first device has the mobile communication capability. In this way, user experience can be improved.

With reference to the second aspect, in a possible implementation, after the first device displays the first prompt information in the status bar of the first device, the method further includes: The first device disconnects from the second device, and the first device stops displaying the first prompt information.

In this way, the user may be prompted, on the user interface of the first device, that the first device no longer has the mobile communication capability. In this way, user experience can be improved.

With reference to the second aspect, in a possible implementation, after the first device obtains the first information in the SIM card information of the first SIM card of the second device in response to the second operation, the method may further include: The first device displays second prompt information, where the second prompt information indicates that the first device uses the mobile communication capability of the second device.

In this way, the user may learn, on a user interface of the second device, that the mobile communication capability of the second device is shared with the first device. In this way, user experience can be improved.

With reference to the second aspect, in a possible implementation, after the first device displays the second prompt information, the method may further include: The first device disconnects from the second device, and the first device stops displaying the second prompt information.

The second prompt information includes the icon of the second device and a mobile communication capability sharing icon.

In this way, the user may learn, on the user interface of the first device, that the first device stops sharing of the mobile communication capability. In this way, user experience can be improved.

With reference to the second aspect, in a possible implementation, the method may further include: The first device displays a first prompt box, where a first pop-up window indicates whether a user selects the first device to use the mobile communication capability of the second device; the first device detects a third operation, where the third operation is used to select, in the first pop-up window, the first device to use the mobile communication capability of the second device; and the first device obtains the first information in the SIM card information of the first SIM card of the second device in response to the third operation.

In this way, the second device may automatically prompt, by using the first prompt box, the user to connect the second device to the first device, and share the mobile communication capability of the first device. In this way, user experience can be improved.

With reference to the second aspect, in a possible implementation, that the first device displays a first option box in response to the first operation specifically includes: The first device displays a first control in response to the first operation; the first device detects a fourth operation performed on the first control; and the first device displays the first option box in response to the fourth operation.

With reference to the second aspect, in a possible implementation, the method may further include: The first device displays a first notification box, where the first notification box is used to display a value of traffic that is used by the first device and that is of a mobile communication network provided by the second device.

In this way, a user may learn in real time the value of the traffic that is used by the first device and that is of the mobile communication network provided by the second device. In this way, user experience can be improved.

With reference to the second aspect, in a possible implementation, after the first device obtains the first information in the SIM card information of the first SIM card of the second device in response to the second operation, the method may further include: displaying a first dialing control on a call making interface of the first device, where the first dialing control indicates the first device to perform dialing through the first SIM card of the second device.

In this way, a user may learn, on the call making interface of the first device, that dialing can be performed through the first SIM card of the second device. In this way, user experience can be improved.

With reference to the second aspect, in a possible implementation, after the first device obtains the first information in the SIM card information of the first SIM card of the second device in response to the second operation, the method may further include: displaying a first tab on an SMS message sending interface of the first device, where the first tab is used by the first device to select to send an SMS message through the first SIM card of the second device.

In this way, a user may learn, on the SMS message sending interface of the first device, that the SMS message can be sent through the first SIM card of the second device. In this way, user experience can be improved.

With reference to the second aspect, in a possible implementation, after the first device obtains the first information in the SIM card information of the first SIM card of the second device in response to the second operation, the method may further include: displaying a first virtual SIM card on a SIM card management interface of the first device, where the first virtual SIM card is generated by the first device based on the first information.

In this way, a user may manage and set the virtual SIM card on the SIM card management interface of the first device. In this way, user experience can be improved.

With reference to the second aspect, in a possible implementation, there is a second SIM card in the first device, and the method may further include: displaying an intelligent switching option on the SIM card management interface of the first device, where the intelligent switching option is used to enable or disable intelligent selection, of the first virtual SIM card or the second SIM card, that is performed by the first device for mobile communication.

In this way, intelligent SIM card switching may be performed based on network conditions of the first virtual SIM card and the second SIM card, so that network quality deterioration of a SIM card does not cause freezing of the first device. In this way, user experience can be improved.

With reference to the second aspect, in a possible implementation, the first request is used to request to establish a cellular mobile data network, and the first response indicates that the cellular mobile data network is successfully established.

In this way, the first device may obtain cellular mobile network data through the second device.

With reference to the first aspect, in a possible implementation, the first request is used to request to make a call, and the first response indicates that the call is successfully made.

In this way, the first device may make a call through the first SIM card of the second device.

With reference to the first aspect, in a possible implementation, the first request is used to request to send first SMS message data, the first request carries the first SMS message data, and the first response indicates that the first SMS message data is successfully sent.

In this way, the first device may send an SMS message through the second device.

With reference to the first aspect, in a possible implementation, before the first device receives the first request of the first application, the method may include: The first device detects a seventh operation of the user, where the seventh operation is used to use the first virtual SIM card generated based on the first information as a default dialing card; and the first device sets the first virtual SIM card as the default dialing card in the first device in response to the seventh operation.

In this way, the first virtual SIM card may be set as the default dialing card in the first device.

With reference to the first aspect, in a possible implementation, the second SIM card is inserted into the first device, and the method may further include: The first device detects an eighth operation of the user, where the eighth operation is used to set the second SIM card as a default outgoing call display card; and the first device sets the second SIM card as the default outgoing call display card in response to the eighth operation.

In this way, the first device may make a call through the first virtual SIM card, but a call receiving party still displays a subscriber number of the second SIM card of the first device as an incoming call number. In this way, leakage of a subscriber number of the first SIM card in the second device can be avoided.

According to a third aspect, a communication sharing method is provided. The method may be applied to a second device, and the method may include: The second device displays a second collaboration interface, where an icon of a first device and an icon of the second device are displayed on the second collaboration interface; the second device detects a fifth operation, where the first operation is used to enable the icon of the first device to approach the icon of the second device; the second device displays a second option box in response to the fifth operation, where the second option box is used to select to share a mobile communication capability of the second device with the first device; the second device detects a sixth operation, where the sixth operation is used to select the second device to share the mobile communication capability of the second device with the first device; the second device sends first information in SIM card information of a first SIM card of the second device to the first device in response to the sixth operation; the second device receives a first request of a first application and second indication information that are sent by the first device, where the second indication information indicates the second device to send the first request to a network device through the first SIM card corresponding to the first information; the second device sends the first request to the network device; and the second device receives a first response sent by the network device, and sends the first response to the first device.

The SIM card information of the first SIM card includes at least one of the following items: an integrated circuit card identity ICCID, an international mobile subscriber identity IMSI, a mobile subscriber international integrated services digital network number MSISDN, an authentication key, an operator root key, and an authentication algorithm; and the first information includes at least one of the following items: the integrated circuit card identity ICCID, the international mobile subscriber identity IMSI, and the mobile subscriber international integrated services digital network number MSISDN in the SIM card information of the first SIM card.

In this way, based on the first information in the first SIM card information of the second device, the mobile communication capability provided by the first SIM card in the second device may be shared with the first device. In this way, when no SIM card is inserted into the first device or the first device has no SIM card capability, the first device can still use a mobile communication network through the first SIM card in the first device, to access the Internet, make and answer calls, receive and send SMS messages, and the like.

With reference to the third aspect, in a possible implementation, after the second device sends the first information in the SIM card information of the first SIM card of the second device to the first device in response to the sixth operation, the method may further include: The second device displays third prompt information in a status bar of the second device, where the third prompt information indicates that the second device shares the mobile communication capability.

In this way, a user may be prompted, on a user interface of the second device, that the second device shares the mobile communication capability. In this way, user experience can be improved.

With reference to the third aspect, in a possible implementation, after the second device displays the third prompt information in the status bar of the second device, the method may further include: The first device disconnects from the second device, and the second device stops displaying the third prompt information.

The third prompt information includes a mobile communication capability sharing icon.

In this way, the user may learn, on the user interface of the second device, that the second device stops sharing the mobile communication capability. In this way, user experience can be improved.

With reference to the third aspect, in a possible implementation, after the second device sends the first information in the SIM card information of the first SIM card of the second device to the first device in response to the sixth operation, the method may further include: The second device displays fourth prompt information, where the fourth prompt information prompts the second device to share the mobile communication capability with the first device.

In this way, a user may be prompted, on a user interface of the second device, that the second device shares the mobile communication capability. In this way, user experience can be improved.

With reference to the third aspect, in a possible implementation, after the second device displays the fourth prompt information, the method may further include: The first device disconnects from the second device, and the second device stops displaying the fourth prompt information.

The fourth prompt information includes the icon of the first device and a mobile communication capability sharing icon.

In this way, the user may learn, on the user interface of the second device, that the second device stops sharing the mobile communication capability. In this way, user experience can be improved.

With reference to the third aspect, in a possible implementation, the method may further include: The second device displays a first setting bar, where the first setting bar is used to set and display a limit of traffic that is of a mobile communication network and that can be provided by the second device for the first device.

With reference to the third aspect, in a possible implementation, the method may further include: When a value of traffic that is of the mobile communication network and that is provided by the second device for the first device reaches the limit of the traffic that is of the mobile communication network and that can be provided by the second device for the first device, the second device stops providing the mobile communication network for the first device.

In this way, the second device may limit the traffic of the mobile communication network shared with the first device. In this way, an excessively high data traffic fee generated by the second device can be avoided.

With reference to the third aspect, in a possible implementation, the method may further include: The second device displays a second notification box, where the second notification box is used to display a value of traffic that is used by the first device and that is of a mobile communication network provided by the second device.

In this way, a user may learn in real time the value of the traffic that is used by the first device and that is of the mobile communication network provided by the second device. In this way, user experience can be improved.

According to a fourth aspect, an electronic device is provided, including one or more processors, one or more memories, and a transceiver. The transceiver and the one or more memories are coupled to the one or more processors. The one or more memories are configured to store computer program code, the computer program code includes computer instructions, and when the one or more processors execute the computer instructions, the terminal device is enabled to perform the method in any possible implementation of the second aspect.

With reference to the fourth aspect, in a possible implementation, the electronic device is a first device.

According to a fifth aspect, an electronic device is provided, including one or more processors, one or more memories, and a transceiver. The transceiver and the one or more memories are coupled to the one or more processors. The one or more memories are configured to store computer program code, the computer program code includes computer instructions, and when the one or more processors execute the computer instructions, the terminal device is enabled to perform the method in any possible implementation of the third aspect.

With reference to the fifth aspect, in a possible implementation, the electronic device is a second device.

According to a sixth aspect, this application provides a computer storage medium, including computer instructions. When the computer instructions are run on a computer, the computer is enabled to perform the method in any possible implementation of the second aspect.

According to a seventh aspect, this application provides a computer storage medium, including computer instructions. When the computer instructions are run on a computer, the computer is enabled to perform the method in any possible implementation of the second aspect.

According to an eighth aspect, this application provides a computer program product. When the computer program product runs on a computer, the computer is enabled to perform the method in any possible implementation of the second aspect.

According to a ninth aspect, this application provides a computer program product. When the computer program product runs on a computer, the computer is enabled to perform the method in any possible implementation of the second aspect.

BRIEF DESCRIPTION OF DRAWINGS

FIG. 48A-1 to FIG. 48A-3 are a schematic interaction diagram in which a phone app in a device 2 makes a call by using obtained SIM card information of a SIM card 1 of a device 1 according to an embodiment of this application;

FIG. 49A-1 and FIG. 49A-2 are a schematic interaction diagram in which a phone APP in a device 2 sends an SMS message by using obtained SIM card information of a SIM card 1 of a device 1 according to an embodiment of this application;

DESCRIPTION OF EMBODIMENTS

Terms used in the following embodiments of this application are merely intended to describe specific embodiments, but are not intended to limit this application. As used in the specification of this application and the appended claims, the singular expression "a", "an", "the", "the foregoing", "such a", or "this" is intended to also include a plural expression unless otherwise clearly indicated in the context. It should also be understood that, the term "and/or" used in this application indicates and includes any or all possible combinations of one or more associated listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Embodiments of this application provide a communication sharing method and system, and a related apparatus. In the method provided in embodiments of this application, a device A may map SIM card information in the device A to a device B. The device B generates a virtual SIM card based on the SIM card information of the device A, and the device B performs a communication service through the virtual SIM card. In this way, a communication capability of a SIM card in the device A may be shared with the device B. For example, the device B may use the SIM card of the device A to access the Internet, make and answer calls, receive and send SMS messages, and the like. In this way, the communication capability of the device A may still be shared with the device B without removing the SIM card of the device A to the device B.

The following describes, with reference to specific scenarios, the communication sharing method provided in embodiments of this application.

Scenario 1: A single SIM card is inserted into a device 10A, no SIM card is inserted into a device 10B, and the device 10A maps the single SIM card to the device 10B.

Figure 1:
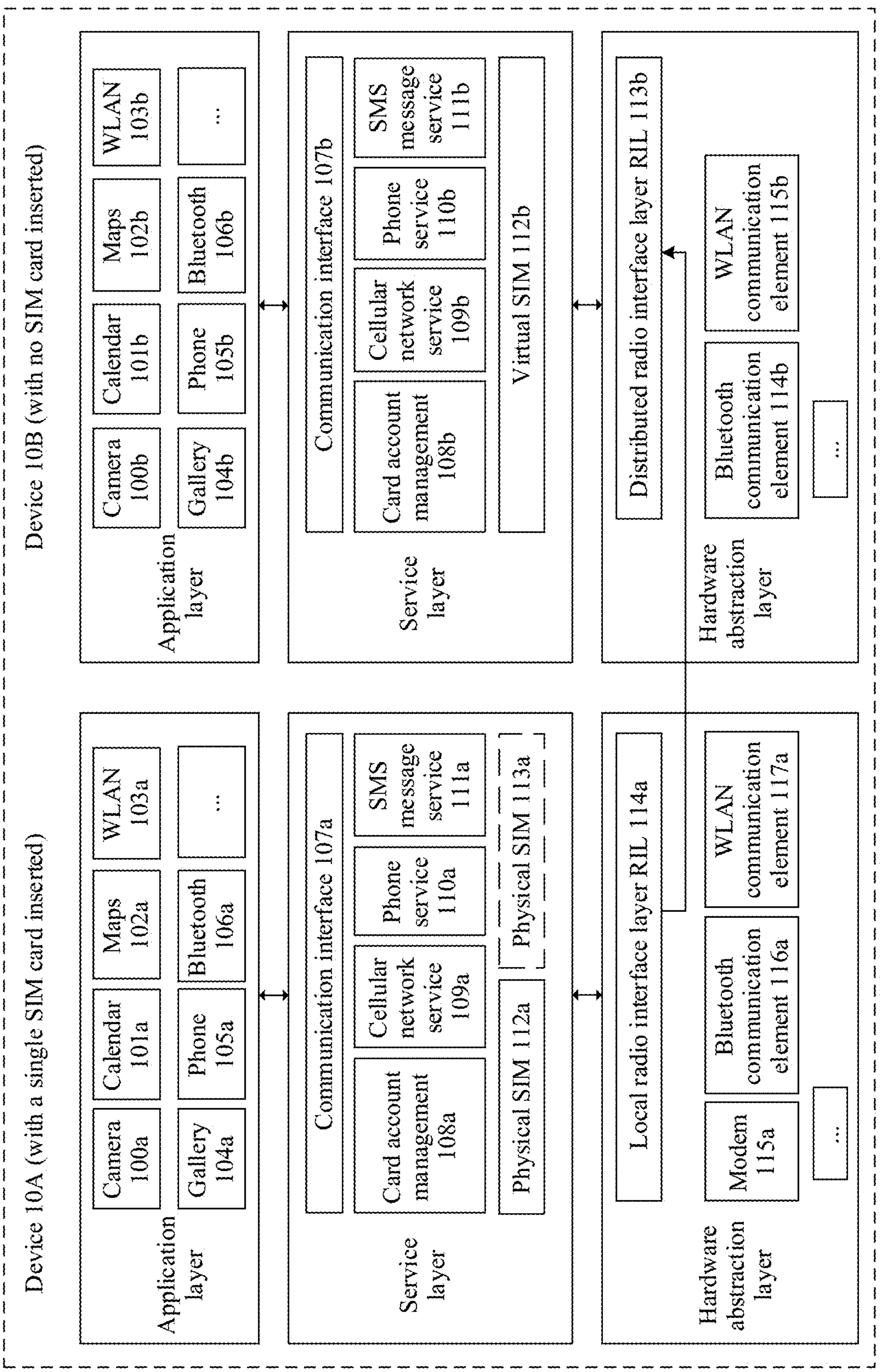
FIG. 1 is a diagram of an architecture of a communication sharing system 10 according to an embodiment of this application.

FIG. 1 is a diagram of a system architecture of a communication sharing system 10. As shown in FIG. 1, the communication sharing system 10 may include the device 10A and the device 10B. The single SIM card is inserted into the device 10A, no SIM card is inserted into the device 10B, and the device 10A may map the single SIM card to the device 10B.

The device 10A may include an application layer, a service layer, and a hardware abstraction layer (HAL).

The application layer in the device 10A may include a series of application packages.

As shown in FIG. 1, the application packages may include applications (which may also be referred to as application programs) such as Camera 100*a*, Calendar 101*a*, Maps 102*a*, a wireless local area network (WLAN) 103*a*, Gallery 104*a*, Phone 105*a*, and Bluetooth 106*a*.

The service layer may provide an interface and a system service that are related to cellular wireless communication for the applications at the application layer.

As shown in FIG. 1, the service layer of the device 10A may include a communication interface 107*a*, card account management 108*a*, a cellular network service 109*a*, a phone service 110*a*, an SMS message service 111*a*, a physical SIM 112*a*, and a physical SIM 113*a*.

The communication interface 107*a* may provide a communication capability of the system for the applications at the application layer. The communication interface 107*a* may include a related interface used for cellular wireless communication between an application (including a system application and a third-party application) and a system service, for example, a related interface for an application at the application layer to obtain SIM card account information, a related interface for requesting establishment of a cellular mobile network, and a related interface for network access through a corresponding cellular mobile network.

The card account management 108*a* may be configured to manage SIM card account information in the device 10A, and manage SIM card account information of another device (namely, a device that is near the device 10A and that establishes a communication connection to the device 10A) in secure near field transmission. Card account information of a SIM card may include SIM card information of the SIM card, and information such as whether the SIM is set as a default data traffic card, a default phone dialing card, and a default outgoing call display card.

In this embodiment of this application, the secure near field transmission may be referred to as near field secure transmission. To be specific, secure near field communication between a primary device (for example, the device 10A) and another device (for example, the device 10B) includes device discovery, identity authentication, a security check, and secure transmission that is in a plurality of manners between the primary device and the another device, so that instructions, information, and network data related to card account authentication can be securely transmitted between the devices.

The cellular network service 109*a* may be configured to provide a cellular network communication capability for the device 10A and the another device in a near field (namely, the device that is near the device 10A and that establishes the communication connection to the device 10). The cellular network service 109*a* supports the device 10A or the another device in the near field in transmitting network data through a cellular network.

The phone service 110*a* may be configured to provide a phone communication capability for the device 10A and the another device in the near field. The phone service 110*a* may support the device 10A and the another device in the near field in using the phone communication capability to make and answer calls.

The SMS message service 111*a* may be configured to provide an SMS message communication capability for the device 10A and the another device in the near field. The SMS message service 111*a* may support the device 10A and the another device in the near field in using the SMS message communication capability to send and receive SMS messages.

It may be understood that the cellular network communication capability, the phone communication capability, and the SMS message communication capability that are provided by the cellular network service, the phone service, and the SMS message service at the service layer may be provided by a physical SIM card in the device 10A, or may be provided by a physical SIM card in the another device that establishes the communication connection to the device 10A.

The physical SIM 112*a* may be configured to store SIM card information of a physical SIM card actually used in the device 10A. For example, the SIM card information may include at least one of the following items: an integrated circuit card identity (ICCID), an international mobile subscriber identity (IMSI), a mobile subscriber international integrated services digital network number (MSISDN), a contact phone number and a contact name stored in the SIM card, and information such as an authentication key, an operator root key, and an authentication algorithm that are used for authentication with a network device (for example, a base station). The application in the device 10A may obtain information about the physical SIM card through the communication interface 107*a*.

In some embodiments, the MSISDN may also be referred to as a subscriber phone number or a phone number.

In embodiments of this application, the physical SIM card includes but is not limited to a pluggable SIM card and an unpluggable eSIM.

It may be understood that, each SIM card in the device 10A corresponds to one physical SIM at the service layer. In other words, SIM card information corresponding to the SIM card is stored at the service layer.

It may be understood that, if there is only one physical SIM card in the device 10A, the service layer of the device 10A may include one physical SIM, namely, the physical SIM 112*a*. Optionally, if there are two physical SIM cards in the device 10A, the device 10A may include two physical SIM cards, namely, the physical SIM 112*a* and the physical SIM 113*a*. A quantity of physical SIM cards in the device 10A and a quantity of corresponding physical SIMs at the service layer in the device 10A are not limited in embodiments of this application.

The HAL may include a local radio interface layer (RIL) 114*a*, a modem 115*a*, a Bluetooth communication element 116*a*, a WLAN communication element 117*a*, and the like.

The local RIL 114*a* may be a wireless communication hardware interface layer corresponding to the physical SIM 112*a*. Another device may access and obtain, through the local RIL 114*a*, first information in the SIM card information that is of the physical SIM card and that is stored in the physical SIM 112*a* in the device 10A, and use a communication capability of the physical SIM card corresponding to the physical SIM 112*a*.

The modem 115*a* may be configured to modulate and demodulate received and sent cellular network signals. For details, refer to the following descriptions of the modem and the descriptions of the modem in the conventional technology. Details are not described herein again.

The device 10A may establish a communication connection to another device through a communication element, for example, the Bluetooth communication element 116*a* or the WLAN communication element 117*a*. Further, the device 10A may establish secure near field communication with the another device through the communication element, for example, the Bluetooth communication element 116*a* or the WLAN communication element 117*a*.

In some embodiments, the communication element may be referred to as a communication chip, a communication component, or the like. In other words, in some embodiments, the Bluetooth communication element 116*a* may be referred to as a Bluetooth communication chip 116*a*, a Bluetooth chip 116*a*, or a Bluetooth communication component 116*a*. The WLAN communication element 117*a* may be referred to as a WLAN communication chip 117*a*, a WLAN chip 117*a*, a WLAN communication component 117*a*, or the like.

It may be understood that the device 10A may include more or fewer modules or elements. This is not limited in embodiments of this application.

The device 10B may include an application layer, a service layer, and a HAL.

The application layer in the device 10B may include a series of application packages.

As shown in FIG. 1, the application packages may include applications (which may also be referred to as application programs) such as Camera 100*b*, Calendar 101*b*, Maps 102*b*, WLAN 103*b*, Gallery 104*b*, Phone 105*b*, and Bluetooth 106*b*.

The service layer may provide an interface and a system service that are related to cellular wireless communication for the applications at the application layer.

As shown in FIG. 1, the service layer of the device 10B may include a communication interface 107*b*, card account management 108*b*, a cellular network service 109*b*, a phone service 110*b*, an SMS message service 1/1*b*, and a virtual SIM 112*b*.

The communication interface 107*b* may provide a communication capability of the system for the applications at the application layer. The communication interface 107*b* may include a related interface used for cellular wireless communication between an application (including a system application and a third-party application) and a system service, for example, a related interface for an application at the application layer to obtain SIM card account information, a related interface for requesting establishment of a cellular mobile network, and a related interface for network access through a corresponding cellular mobile network.

The card account management 108*b* may be configured to manage SIM card account information in the device 10B, and manage SIM card account information of another device (namely, a device that is near the device 10B and that establishes a communication connection to the device 10B) in secure near field transmission. For the card account management 108*b*, refer to the descriptions of the card account management 108*a*. Details are not described herein again.

The cellular network service 109*b* may be configured to provide a cellular network communication capability for the device 10B. The cellular network service 109*b* supports the device 10B in transmitting network data through a cellular network.

The phone service 110*b* may be configured to provide a phone communication capability for the device 10B. The phone service 110*a* may support the device 10A in using the phone communication capability to make and answer calls.

The SMS message service **1*l*1***b* may be configured to provide an SMS message communication capability for the device 10B. The SMS message service 111*b* may support the device 10B in using an SMS message communication capability to send and receive SMS messages.

The virtual SIM 112*b* may be configured to store some information (which may be referred to as first information for short) in SIM card information of a physical SIM card actually used in another device (for example, the device 10A) that establishes a communication connection to the device 10B. The virtual SIM 112*b* maps the first information in the SIM card information in the another device to this device, and presents the first information to the outside in a form of SIM card information of this device. When the application in the device 10B accesses a communication interface (for example, the communication interface 107*b*) related to the SIM card, virtual SIM card information (namely, the first information) in the virtual SIM may be returned to the application based on a current service requirement.

The first information may include at least one of the following items: an integrated circuit card identity ICCID, an IMSI, and a mobile subscriber international integrated services digital network number MSISDN in the SIM card information. The first information does not include information such as an authentication key, an operator root key, and an authentication algorithm in the SIM card information. It may be understood that the information such as the authentication key, the operator root key, and the authentication algorithm in the SIM card information of the physical SIM card is data that is restricted to access, and generally cannot be obtained by another device.

In a possible implementation, the virtual SIM 112*b* is created after the card account management 108*b* in the device 10B obtains the first information in the SIM card information of the SIM card actually used in the another device. The virtual SIM 112*b* is memory space in a memory of the device 10B, and the memory space is used to store the SIM card information of the physical SIM card actually used in the another device (for example, the device 10A) that establishes the communication connection to the device 10B.

Optionally, in some examples, to save memory space, the device 10B may not create the virtual SIM 112*b*. Alternatively, the device 10B may create the virtual SIM 112*b*, but the virtual SIM 112*b* does not buffer the first information in the SIM card information of the physical SIM card actually used in the another device (for example, the device 10A) that establishes the communication connection to the device 10B. Only the card account management 108*b* needs to determine that there is a virtual SIM card in the device 10B in this case.

It may be understood that, because no physical SIM card is inserted into the device 10B or the device 10B has no SIM card capability, the card account management 108*b* in the device 10B does not have card account-related information of the physical SIM card. When the device 10B establishes the communication connection to the another device and obtains the first information in the SIM card information of the another device, the first information in the SIM card information of the another device may be stored in the virtual SIM 112*b*, and the card account-related information of the SIM card of the another device may be stored in the card account management 108*b*.

It may be understood that, when the device 10B obtains the SIM card information of the another device (where the device 10A is used as an example in the following), the cellular network communication capability, the phone communication capability, and the SMS message communication capability in the cellular network service 109*b*, the phone service 110*b*, and the SMS message service **1*l*1***b* in the device 10B are provided by the physical SIM card corresponding to the SIM card information in the another device.

It may be understood that the device 10B may obtain SIM card information of one or more physical SIM cards in the another device. When the device 10B obtains SIM card information of N physical SIM cards, N virtual SIMs in the device 10B respectively store first information in SIM card information of the N SIM cards. In other words, one virtual SIM in the device 10B may store first information in SIM card information of one physical SIM card. A quantity of virtual SIMs is not limited in embodiments of this application.

The HAL may include a distributed radio interface layer (RIL) 113*b*, a Bluetooth communication element 114*b*, a WLAN communication element 115*b*, and the like.

The distributed RIL 113*b* may map the first information in the SIM card information stored in a physical SIM corresponding to the physical SIM card in the another device to the virtual SIM 112*b* in the device 10B, and map a communication capability corresponding to the physical SIM card to the device 10B.

The device 10B may establish the communication connection to the another device (for example, the device 10A) through a communication element, for example, the Bluetooth communication element 114*b* or the WLAN communication element 115*b*.

It may be understood that the device 10B may include more or fewer modules or elements. This is not limited in embodiments of this application.

As shown in FIG. 1, the device 10B may access the local RIL 114*a* in the device 10A through the distributed RIL 113*b*, obtain the first information in the SIM card information of the physical SIM card in the device 10A, and map the communication capability of the physical SIM card in the device 10A to the device 10B. In this way, when no SIM card is inserted into the device 10B, the communication capability of the physical SIM card in the device 10A may still be shared with the device 10B without removing and inserting the SIM card of the device 10A into the device 10B.

Scenario 2: Two SIM cards are inserted into a device 20A, no SIM card is inserted into a device 20B, and the device 20A maps the two SIM cards to the device 20B.

Figure 2:
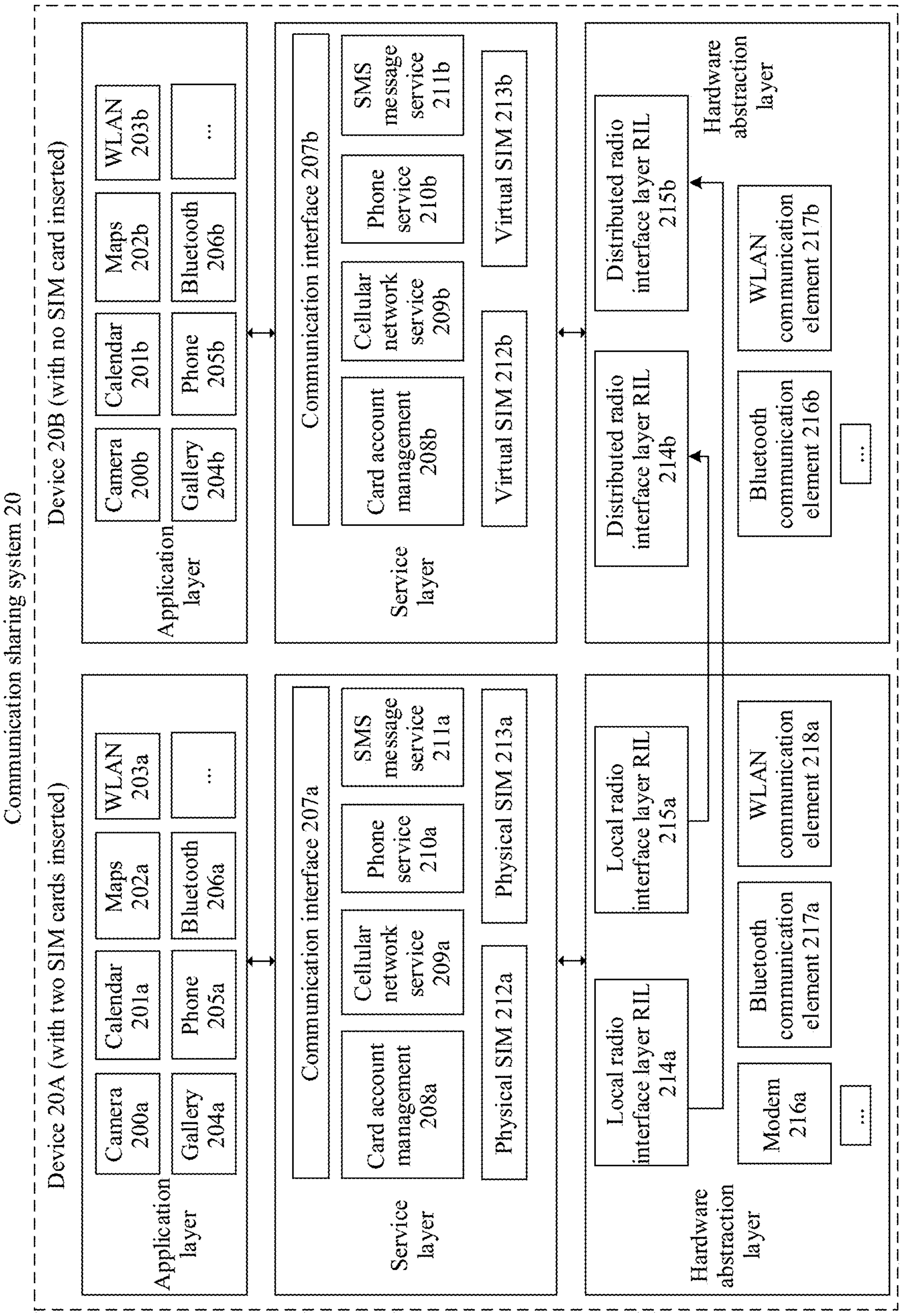
FIG. 2 is a diagram of an architecture of a communication sharing system 20 according to an embodiment of this application.

FIG. 2 is a system structural diagram of a communication sharing system 20. As shown in FIG. 2, the communication sharing system 20 may include the device 20A and the device 20B. The two SIM cards are inserted into the device 20A, no SIM card is inserted into the device 20B, and the device 20A maps the two SIM cards to the device 20B.

The device 20A may include an application layer, a service layer, and a hardware abstraction layer (HAL).

The application layer in the device 20A may include a series of application packages.

As shown in FIG. 2, the application packages may include applications (which may also be referred to as application programs) such as Camera 200*a*, Calendar 201*a*, Maps 202*a*, WLAN 203*a*, Gallery 204*a*, Phone 205*a*, and Bluetooth 206*a*.

The service layer may provide an interface and a system service that are related to cellular wireless communication for the applications at the application layer.

As shown in FIG. 2, the service layer of the device 20A may include a communication interface 207*a*, card account management 208*a*, a cellular network service 209*a*, a phone service 210*a*, an SMS message service 211*a*, a physical SIM 212*a*, and a physical SIM 213*a*.

The communication interface 207*a* may provide a communication capability of the system for the applications at the application layer. For details, refer to the descriptions of the communication interface 107*a* shown in FIG. 1. Details are not described herein again.

The card account management 208*a* may be configured to manage SIM card account information in the device 20A.

Optionally, with development of devices and future communication protocols, if the device 20A can support more than two SIM cards, when there are two physical SIM cards in the device 20A, the device 20A may further map a physical SIM card in another device to a virtual SIM card in the device 20A. In this case, the card account management 208*a* may be further configured to manage SIM card account information of another device (namely, a device that is near the device 20A and that establishes a communication connection to the device 20A) in secure near field transmission.

The cellular network service 209*a* may be configured to provide a cellular network communication capability for the device 20A and the another device in a near field (namely, the device that is near the device 20A and that establishes the communication connection to the device 20A). The cellular network service 209*a* supports the device 20A or the another device in the near field in transmitting network data through a cellular network.

The phone service 210*a* may be configured to provide a phone communication capability for the device 20A and the another device in the near field. The phone service 210*a* may support the device 20A and the another device in the near field in using the phone communication capability to make and answer calls.

The SMS message service 211*a* may be configured to provide an SMS message communication capability for the device 20A and the another device in the near field. The SMS message service 211*a* may support the device 20A and the another device in the near field in using the SMS message communication capability to send and receive SMS messages.

The physical SIM 212*a* is SIM card information of one physical SIM card (which may be referred to as a SIM card 1 for short) in two SIM cards actually used in the device 20A. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 20A may obtain information about the physical SIM card 1 through the communication interface 207*a*.

The physical SIM 213*a* is SIM card information of the other physical SIM card (which may be referred to as a SIM card 2 for short) in the two SIM cards actually used in the device 20A. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 20A may obtain information about the physical SIM card 2 through the communication interface 207*a*.

For the physical SIM 212*a* and the physical SIM 213*a*, refer to the descriptions of the physical SIM 112*a* shown in FIG. 1. Details are not described herein again.

The HAL may include a local RIL 214*a*, a local RIL 215*a*, a modem 216*a*, a Bluetooth communication element 217*a*, a WLAN communication element 218*a*, and the like.

The local RIL 214*a* may be a wireless communication hardware interface layer corresponding to the physical SIM 212*a*. Another device may access and obtain, through the local RIL 214*a*, first information in the SIM card information that is of the physical SIM card 1 and that is stored in the physical SIM 212*a* in the device 20A, and use a communication capability of the physical SIM card 1 corresponding to the physical SIM 212*a*.

The local RIL 215*a* may be a wireless communication hardware interface layer corresponding to the physical SIM 213*a*. Another device may access and obtain, through the local RIL 215*a*, first information in the SIM card information that is of the physical SIM card 2 and that is stored in the physical SIM 213*a* in the device 20A, and use a communication capability of the physical SIM card 2 corresponding to the physical SIM 213*a*.

For the modem 216*a*, refer to the descriptions of the modem 115*a*. Details are not described herein again.

For the Bluetooth communication element 217*a*, refer to the descriptions of the Bluetooth communication element 116*a*. Details are not described herein again.

For the WLAN communication element 218*a*, refer to the descriptions of the WLAN communication element 117*a*. Details are not described herein again.

It may be understood that the device 20A may include more or fewer modules or elements. This is not limited in embodiments of this application.

The device 20B may include an application layer, a service layer, and a HAL.

The application layer in the device 20B may include a series of application packages.

As shown in FIG. 2, the application packages may include applications (which may also be referred to as application programs) such as Camera 200*b*, Calendar 201*b*, Maps 202*b*, WLAN 203*b*, Gallery 204*b*, Phone 205*b*, and Bluetooth 206*b*.

The service layer may provide an interface and a system service that are related to cellular wireless communication for the applications at the application layer.

As shown in FIG. 2, the service layer of the device 20B may include a communication interface 207*b*, card account management 208*b*, a cellular network service 209*b*, a phone service 210*b*, an SMS message service 211*b*, a virtual SIM 212*b*, and a virtual SIM 213*b*.

The communication interface 207*b* may provide a communication capability of the system for the applications at the application layer. For details, refer to the descriptions of the communication interface 107*a* shown in FIG. 1. Details are not described herein again.

The card account management 208*b* may be configured to manage SIM card account information in the device 20B, and manage SIM card account information of another device (namely, a device that is near the device 20B and that establishes a communication connection to the device 20B) in secure near field transmission.

The cellular network service 209*b* may be configured to provide a cellular network communication capability for the device 20B. The cellular network service 209*b* supports the device 20B in transmitting network data through a cellular network.

The phone service 210*b* may be configured to provide a phone communication capability for the device 20B. The phone service 210*a* may support the device 20A in using the phone communication capability to make and answer calls.

The SMS message service 211*b* may be configured to provide an SMS message communication capability for the device 20B. The SMS message service 211*b* may support the device 20B in using an SMS message communication capability to send and receive SMS messages.

The virtual SIM 212*b* may be configured to store first information in SIM card information of a physical SIM card 1 actually used in the another device (for example, the device 20A) that establishes the communication connection to the device 20B. The virtual SIM 212*b* maps the first information in the SIM card information in the another device to this device, and presents the first information to the outside in a form of SIM card information of this device. When the application in the device 20B accesses a communication interface (for example, the communication interface 207*b*) related to the SIM card, the SIM card information in the virtual SIM may be returned to the application based on a current service requirement. To be specific, the first information in the SIM card information that is of the SIM card 1 and that is stored in the physical SIM 212*a* in the device 20A may be mapped to the virtual SIM 212*b*.

The virtual SIM 213*b* may be configured to store first information in SIM card information of a physical SIM card 2 actually used in the another device (for example, the device 20A) that establishes the communication connection to the device 20B. The virtual SIM 213*b* maps the first information in the SIM card information in the another device to this device, and presents the first information to the outside in a form of SIM card information of this device. When the application in the device 20B accesses a communication interface (for example, the communication interface 207*b*) related to the SIM card, virtual SIM card information (namely, the first information in the SIM card information of the SIM card 2) in the virtual SIM may be returned to the application based on a current service requirement. To be specific, the SIM card information that is of the SIM card 2 and that is stored in the physical SIM 213*a* in the device 20A may be mapped to the virtual SIM 213*b*.

For related descriptions of the modules at the service layer, refer to the descriptions of the modules at the service layer of the device 10B. Details are not described herein again.

The HAL may include a distributed RIL 214*b*, a distributed RIL 215*b*, a Bluetooth communication element 216*b*, a WLAN communication element 217*b*, and the like.

The distributed RIL 214*b* may map first information in SIM card information of a physical SIM card corresponding to one of the physical SIM 212*a* and the physical SIM 213*a* in the device 20A to the virtual SIM 212*b*, and map a communication capability corresponding to the physical SIM card to the device 20B. For example, as shown in FIG. 2, the distributed RIL 214*b* maps the first information in the SIM card information in the physical SIM 213*a* in the device 20A to the virtual SIM 212*b*, and maps the communication capability of the physical SIM 2 corresponding to the physical SIM 213*a* to the device 20B.

The distributed RIL 215*b* may map first information in SIM card information of a physical SIM card corresponding to the other physical SIM in the physical SIM 212*a* and the physical SIM 213*a* in the device 20A to the virtual SIM 213*b*, and map a communication capability corresponding to the physical SIM card to the device 20B. For example, as shown in FIG. 2, the distributed RIL 215*b* maps the SIM card information in the physical SIM 212*a* in the device 20A to the virtual SIM 213*b*, and maps the communication capability of the physical SIM 1 corresponding to the physical SIM 212*a* to the device 20B.

For the Bluetooth communication element 216*b*, refer to the descriptions of the Bluetooth communication element 116*a*. Details are not described herein again.

For the WLAN communication element 217*b*, refer to the descriptions of the WLAN communication element 117*a*. Details are not described herein again.

As shown in FIG. 2, the device 20B may access the local RIL 215*a* in the device 20A through the distributed RIL 214*b*, obtain the first information in the SIM card information of the physical SIM card 2 corresponding to the physical SIM 213*a* in the device 20A, and map the communication capability of the physical SIM card 2 in the device 20A to the device 20B. The device 20B may access the local RIL 214*a* in the device 20A through the distributed RIL 215*b*, obtain the first information in the SIM card information of the physical SIM card 1 corresponding to the physical SIM 212*a* in the device 20A, and map the communication capability of the physical SIM card 1 in the device 20A to the device 20B. In this way, when no SIM card is inserted into the device 20B, the communication capability of the physical SIM card in the device 20A may still be shared with the device 20B without removing and inserting the SIM card of the device 20A into the device 10B. In addition, the device 20B may have two virtual SIM cards, and may dynamically switch a to-be-used SIM card like the device 20A having two physical SIM cards.

Scenario 3: Two SIM cards are inserted into a device 30A, a single SIM card is inserted into a device 30B, and the device 30A maps a first SIM card in the two SIM cards to the device 30B.

Figure 3:
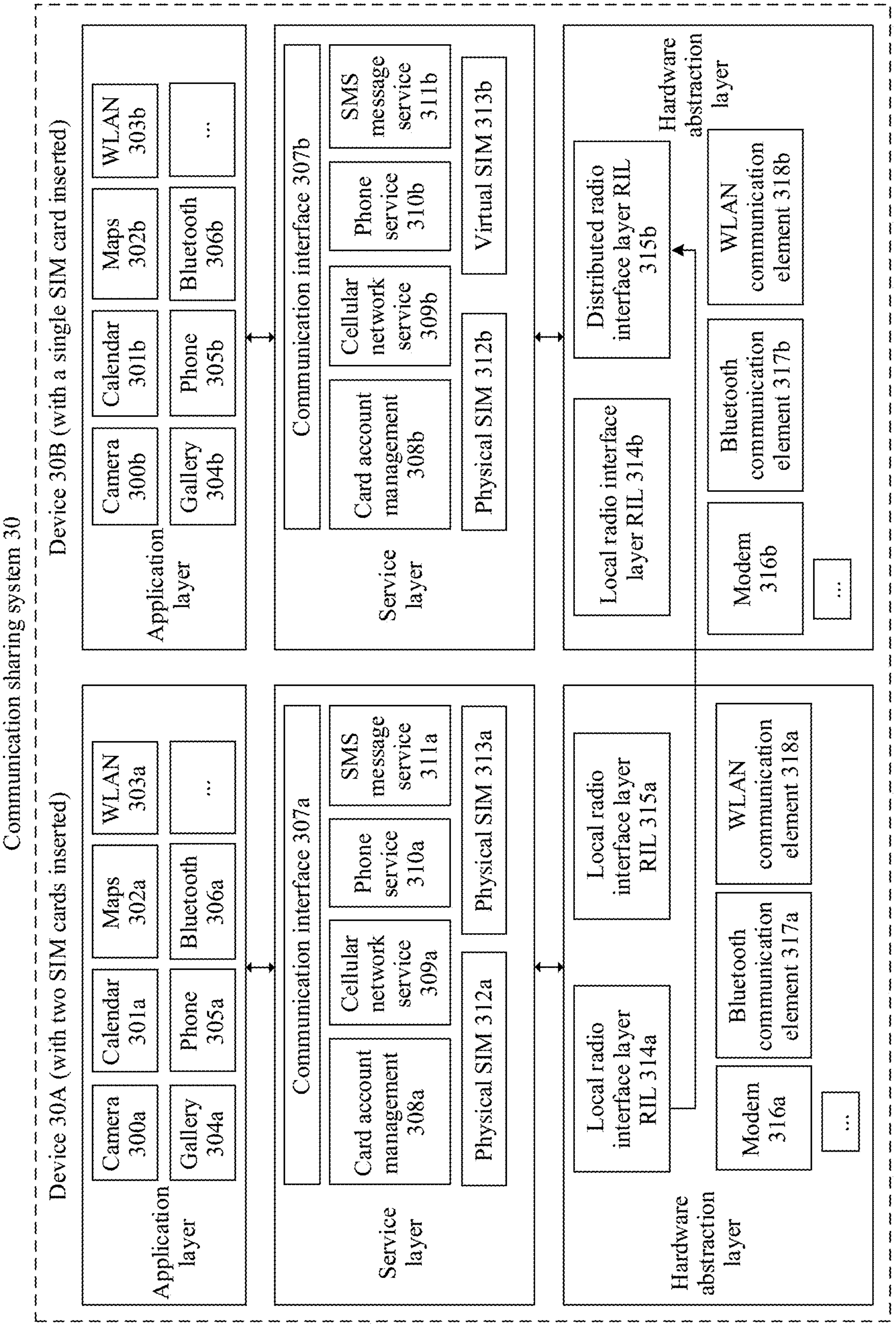
FIG. 3 is a diagram of an architecture of a communication sharing system 30 according to an embodiment of this application.

FIG. 3 is a system structural diagram of a communication sharing system 30. As shown in FIG. 3, the communication sharing system 30 may include the device 30A and the device 30B. The two SIM cards are inserted into the device 30A, the single SIM card is inserted into the device 30B, and the device 30A may map either of the two SIM cards to the device 30B.

The device 30A may include an application layer, a service layer, and a HAL.

The application layer in the device 30A may include a series of application packages.

As shown in FIG. 3, the application packages may include applications (which may also be referred to as application programs) such as Camera 300*a*, Calendar 301*a*, Maps 302*a*, WLAN 303*a*, Gallery 304*a*, Phone 305*a*, and Bluetooth 306*a*.

The service layer may provide an interface and a system service that are related to cellular wireless communication for the applications at the application layer.

As shown in FIG. 3, the service layer of the device 30A may include a communication interface 307*a*, card account management 308*a*, a cellular network service 309*a*, a phone service 310*a*, an SMS message service 311*a*, a physical SIM 312*a*, and a physical SIM 313*a*.

The communication interface 307*a* may provide a communication capability of the system for the applications at the application layer. For details, refer to the descriptions of the communication interface 107*a*. Details are not described herein again.

The card account management 308*a* may be configured to manage SIM card account information in the device 30A.

The cellular network service 309*a* may be configured to provide a cellular network communication capability for the device 30A and another device in a near field (namely, a device that is near the device 10A and that establishes a communication connection to the device 10A). The cellular network service 309*a* supports the device 30A or the another device in the near field in transmitting network data through a cellular network.

The phone service 310*a* may be configured to provide a phone communication capability for the device 30A and the another device in the near field. The phone service 310*a* may support the device 30A and the another device in the near field in using the phone communication capability to make and answer calls.

The SMS message service 311*a* may be configured to provide an SMS message communication capability for the device 30A and the another device in the near field. The SMS message service 311*a* may support the device 30A and the another device in the near field in using the SMS message communication capability to send and receive SMS messages.

The physical SIM 312*a* is SIM card information of one SIM card (which may be referred to as a physical SIM card 1) in two physical SIM cards actually used in the device 30A. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 30A may obtain information about the physical SIM card 1 through the communication interface 307*a*.

The physical SIM 313*a* is SIM card information of the other SIM card (which may be referred to as a physical SIM card 2) in the two physical SIM cards actually used in the device 30A. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 30A may obtain information about the physical SIM card 2 through the communication interface 307*a*.

The HAL may include a local RIL 314*a*, a local RIL 315*a*, a modem 316*a*, a Bluetooth communication element 317*a*, a WLAN communication element 318*a*, and the like.

The local RIL 314*a* may be a wireless communication hardware interface layer corresponding to the physical SIM 312*a*. Another device may access and obtain, through the local RIL 314*a*, first information in the SIM card information that is of the physical SIM card 1 and that is stored in the physical SIM 312*a* in the device 30A, and use a communication capability of the physical SIM card 1 corresponding to the physical SIM 312*a*.

The local RIL 315*a* may be a wireless communication hardware interface layer corresponding to the physical SIM 313*a*. Another device may access and obtain, through the local RIL 315*a*, first information in the SIM card information that is of the physical SIM card 2 and that is stored in the physical SIM 313*a* in the device 30A, and use a communication capability of the physical SIM card 2 corresponding to the physical SIM 313*a*.

For the modem 316*a*, refer to the descriptions of the modem 115*a*. Details are not described herein again.

For the Bluetooth communication element 317*a*, refer to the descriptions of the Bluetooth communication element 116*a*. Details are not described herein again.

For the WLAN communication element 318*a*, refer to the descriptions of the WLAN communication element 117*a*. Details are not described herein again.

It may be understood that the device 30A may include more or fewer modules or elements. This is not limited in embodiments of this application.

The device 30B may include an application layer, a service layer, and a HAL.

The application layer in the device 30B may include a series of application packages.

As shown in FIG. 3, the application packages may include applications (which may also be referred to as application programs) such as Camera 300*b*, Calendar 301*b*, Maps 302*b*, WLAN 303*b*, Gallery 304*b*, Phone 305*b*, and Bluetooth 306*b*.

The service layer may provide an interface and a system service that are related to cellular wireless communication for the applications at the application layer.

As shown in FIG. 3, the service layer of the device 30B may include a communication interface 307*b*, card account management 308*b*, a cellular network service 309*b*, a phone service 310*b*, an SMS message service 311*b*, a physical SIM 312*b*, and a virtual SIM 313*b*.

The communication interface 307*b* may provide a communication capability of the system for the applications at the application layer. For details, refer to the descriptions of the communication interface 107*a* shown in FIG. 1. Details are not described herein again.

The card account management 308*b* may be configured to manage SIM card account information in the device 30B, and manage SIM card account information of another device (namely, a device that is near the device 30B and that establishes a communication connection to the device 30B) in secure near field transmission.

The cellular network service 309*b* may be configured to provide a cellular network communication capability for the device 30B. The cellular network service 309*b* supports the device 30B in transmitting network data through a cellular network.

The phone service 310*b* may be configured to provide a phone communication capability for the device 30B. The phone service 310*b* may support the device 30B in using the phone communication capability to make and answer calls.

The SMS message service 311*b* may be configured to provide an SMS message communication capability for the device 30B. The SMS message service 311*b* may support the device 30B in using an SMS message communication capability to send and receive SMS messages.

The physical SIM 312*b* may be configured to store SIM card information of a physical SIM card actually used in the device 30B. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 30B may obtain information about the physical SIM card through the communication interface 307*b*.

The virtual SIM 313*b* may be configured to store first information in SIM card information of a physical SIM card actually used in the another device (for example, the device 20A) that establishes the communication connection to the device 30B. The virtual SIM 313*b* may map the first information in the SIM card information in the another device to this device, and presents the first information to the outside in a form of SIM card information of this device. When the application in the device 30B accesses a communication interface (for example, the communication interface 307*b*) related to the SIM card, virtual SIM card information (namely, the first information in the SIM card information in the another device) in the virtual SIM may be returned to the application based on a current service requirement. For example, the first information in the SIM card information that is of the SIM card 1 or the SIM card 2 and that is stored in the physical SIM 313*a* in the device 30A may be mapped to the virtual SIM 313*b*.

For related descriptions of the modules at the service layer, refer to the descriptions of the modules at the service layer of the device 10B. Details are not described herein again.

The HAL may include a local RIL 314*b*, a distributed RIL 315*b*, a Bluetooth communication element 316*b*, a WLAN communication element 317*b*, and the like.

The local RIL 314*b* may be a wireless communication hardware interface layer corresponding to the physical SIM 312*b*. Another device may access and obtain, through the local RIL 314*b*, the SIM card information that is of the physical SIM card and that is stored in the physical SIM 312*b* in the device 30B, and use the communication capability of the physical SIM card corresponding to the physical SIM 312*b*.

The distributed RIL 315*b* may map first information in SIM card information of a physical SIM card corresponding to either the physical SIM 312*a* or the physical SIM 313*a* in the device 30A to the virtual SIM 313*b*, and map a communication capability corresponding to the physical SIM card to the device 30B. For example, as shown in FIG. 3, the distributed RIL 315*b* maps the first information in the SIM card information in the physical SIM 312*a* in the device 30A to the virtual SIM 313*b*, and maps the communication capability of the physical SIM 1 corresponding to the physical SIM 312*a* to the device 30B.

For the Bluetooth communication element 316*b*, refer to the descriptions of the Bluetooth communication element 116*a*. Details are not described herein again.

For the WLAN communication element 317*b*, refer to the descriptions of the WLAN communication element 117*a*. Details are not described herein again.

As shown in FIG. 3, the device 30B may access the local RIL 314*a* in the device 30A through the distributed RIL 315*b*, obtain the first information in the SIM card information of the physical SIM card 1 corresponding to the physical SIM 312*a* in the device 30A, and map the communication capability of the physical SIM card 1 in the device 30A to the device 30B. In this way, the device 30B may become a dual-card device having one physical SIM card and one virtual SIM card. The device 30B may dynamically switch a to-be-used SIM card based on a network condition, like the device 30A having two physical SIM cards. For example, in some scenarios, the physical SIM card in the device 30B has no network service, but the physical SIM card in the device 30A has a network service. In this case, the device 30B may switch from a network service using the physical SIM card to a network service using the virtual SIM card. It may be understood that an operator corresponding to the physical SIM card in the device 30A is different from an operator corresponding to the physical SIM card in the device 30B.

Scenario 4: A single SIM card is inserted into a device 40A, a single SIM card is inserted into a device 40B, the device 40A maps the single SIM card to the device 40B, and the device 40B maps the single SIM card to the device 40A.

Figure 4:
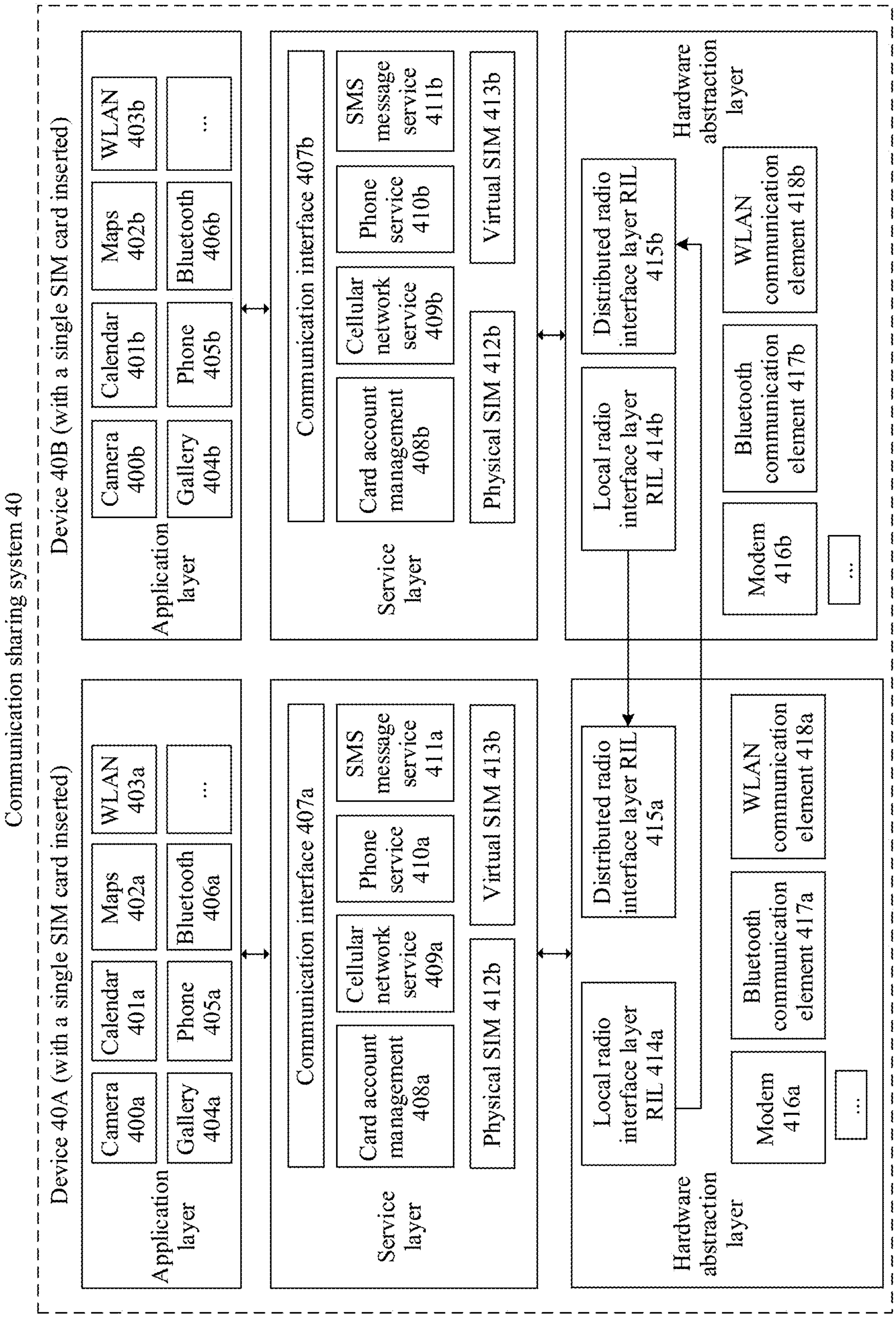
FIG. 4 is a diagram of a structure of a communication sharing system 40 according to an embodiment of this application.

FIG. 4 is a diagram of a system architecture of a communication sharing system 40. As shown in FIG. 4, the communication sharing system 40 may include the device 40A and the device 40B. The single SIM card is inserted into the device 40A, the single SIM card is inserted into the device 40B, the device 40A may map the single SIM card to the device 40B, and the device 40B may also map the single SIM card to the device 40A.

The device 40A may include an application layer, a service layer, and a HAL.

The application layer in the device 40A may include a series of application packages.

As shown in FIG. 4, the application packages may include applications (which may also be referred to as application programs) such as Camera 400*a*, Calendar 401*a*, Maps 402*a*, WLAN 403*a*, Gallery 404*a*, Phone 405*a*, and Bluetooth 406*a*.

The service layer may provide an interface and a system service that are related to cellular wireless communication for the applications at the application layer.

As shown in FIG. 4, the service layer of the device 40A may include a communication interface 407*a*, card account management 408*a*, a cellular network service 409*a*, a phone service 410*a*, an SMS message service 411*a*, a physical SIM 412*a*, and a virtual SIM 413*a*.

The communication interface 407*a* may provide a communication capability of the system for the applications at the application layer. For details, refer to the descriptions of the communication interface 107*a*. Details are not described herein again.

The card account management 408*a* may be configured to manage SIM card account information in the device 40A, and manage SIM card account information of another device (namely, a device that is near the device 40A and that establishes a communication connection to the device 40A) in secure near field transmission.

The cellular network service 409*a* may be configured to provide a cellular network communication capability for the device 40A and the another device in a near field (namely, the device that is near the device 40A and that establishes the communication connection to the device 40A). The cellular network service 409*a* supports the device 40A or the another device in the near field in transmitting network data through a cellular network.

The phone service 410*a* may be configured to provide a phone communication capability for the device 40A and the another device in the near field. The phone service 410*a* may support the device 40A and the another device in the near field in using the phone communication capability to make and answer calls.

The SMS message service 411*a* may be configured to provide an SMS message communication capability for the device 40A and the another device in the near field. The SMS message service 411*a* may support the device 40A and the another device in the near field in using the SMS message communication capability to send and receive SMS messages.

The physical SIM 412*a* is SIM card information of a physical SIM card actually used in the device 40A. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 40A may obtain information about the physical SIM card through the communication interface 407*a*.

The virtual SIM 413*a* may be configured to store first information in SIM card information of a physical SIM card actually used in the another device (for example, the device 40B) that establishes the communication connection to the device 40A. The virtual SIM 413*a* may map the first information in the SIM card information in the another device to this device, and presents the first information to the outside in a form of SIM card information of this device. When the application in the device 40A accesses a communication interface (for example, the communication interface 307*b*) related to the SIM card, virtual SIM card information (the first information in the SIM card information in the another device) in the virtual SIM may be returned to the application based on a current service requirement. For example, the first information in the SIM card information that is of the physical SIM card and that is stored in the device 40B may be mapped to the virtual SIM 413*a*.

The HAL may include a local RIL 414*a*, a distributed RIL 415*a*, a modem 416*a*, a Bluetooth communication element 417*a*, a WLAN communication element 418*a*, and the like.

The local RIL 414*a* may be a wireless communication hardware interface layer corresponding to the physical SIM 412*a*. Another device may access and obtain, through the local RIL 414*a*, first information in SIM card information that is of the physical SIM card and that is stored in the physical SIM 412*a* in the device 40A, and use a communication capability of the physical SIM card corresponding to the physical SIM 412*a*.

The distributed RIL 415*a* may map the first information in the SIM card information stored in a physical SIM corresponding to the physical SIM card in the another device to the virtual SIM 413*a* in the device 40A, and map a communication capability corresponding to the physical SIM card to the device 40A.

For the modem 416*a*, refer to the descriptions of the modem 115*a*. Details are not described herein again.

For the Bluetooth communication element 417*a*, refer to the descriptions of the Bluetooth communication element 116*a*. Details are not described herein again.

For the WLAN communication element 418*a*, refer to the descriptions of the WLAN communication element 117*a*. Details are not described herein again.

It may be understood that the device 40A may include more or fewer modules or elements. This is not limited in embodiments of this application.

The device 40B may include an application layer, a service layer, and a HAL.

The application layer in the device 40B may include a series of application packages.

As shown in FIG. 4, the application packages may include applications (which may also be referred to as application programs) such as Camera 400*b*, Calendar 401*b*, Maps 402*b*, WLAN 403*b*, Gallery 404*b*, Phone 405*b*, and Bluetooth 406*b*.

The service layer may provide an interface and a system service that are related to cellular wireless communication for the applications at the application layer.

As shown in FIG. 4, the service layer of the device 30B may include a communication interface 407*b*, card account management 408*b*, a cellular network service 409*b*, a phone service 410*b*, an SMS message service 411*b*, a physical SIM 412*b*, and a virtual SIM 413*b*.

The communication interface 407*b* may provide a communication capability of the system for the applications at the application layer. For details, refer to the descriptions of the communication interface 107*a* shown in FIG. 1. Details are not described herein again.

The card account management 408*b* may be configured to manage SIM card account information in the device 40B, and manage SIM card account information of another device (namely, a device that is near the device 40B and that establishes a communication connection to the device 40B) in secure near field transmission.

The cellular network service 409*b* may be configured to provide a cellular network communication capability for the device 40B. The cellular network service 409*b* supports the device 40B in transmitting network data through a cellular network.

The phone service 410*b* may be configured to provide a phone communication capability for the device 40B. The phone service 410*b* may support the device 40B in using the phone communication capability to make and answer calls.

The SMS message service 411*b* may be configured to provide an SMS message communication capability for the device 40B. The SMS message service 411*b* may support the device 40B in using an SMS message communication capability to send and receive SMS messages.

The physical SIM 412*b* may be configured to store SIM card information of a physical SIM card actually used in the device 30B. For example, the SIM card information may include at least one of the following items: an ICCID, an IMSI, an MSISDN, a contact phone number and a contact name stored in the SIM card, and information such as an authentication key, an operator root key, and an authentication algorithm that are used for authentication with a network device (for example, a base station). The application in the device 40B may obtain information about the physical SIM card through the communication interface 407*b*.

The virtual SIM 413*b* may be configured to store first information in SIM card information of a physical SIM card actually used in the another device (for example, the device 20A) that establishes the communication connection to the device 40B. The virtual SIM 413*b* may map the first information in the SIM card information in the another device to this device, and presents the first information to the outside in a form of SIM card information of this device. When the application in the device 40B accesses a communication interface (for example, the communication interface 407*b*) related to the SIM card, virtual SIM card information (namely, the first information in the SIM card information in the another device) in the virtual SIM may be returned to the application based on a current service requirement. For example, the first information in the SIM card information that is of the SIM card and that is stored in the physical SIM 412*a* in the device 30A may be mapped to the virtual SIM 413*b*.

For related descriptions of the modules at the service layer, refer to the descriptions of the modules at the service layer of the device 10B. Details are not described herein again.

The HAL may include a local RIL 414*b*, a distributed RIL 415*b*, a Bluetooth communication element 416*b*, a WLAN communication element 417*b*, and the like.

The local RIL 414*b* may be a wireless communication hardware interface layer corresponding to the physical SIM 412*b*. Another device may access and obtain, through the local RIL 414*b*, the first information in the SIM card information that is of the physical SIM card and that is stored in the physical SIM 412*b* in the device 40B, and use the communication capability of the physical SIM card corresponding to the physical SIM 412*b*.

The distributed RIL 415*b* may map the first information in the SIM card information of the physical SIM card corresponding to the physical SIM 312*a* in the device 40A to the virtual SIM 413*b*, and map the communication capability corresponding to the physical SIM card to the device 40B.

For the Bluetooth communication element 416*b*, refer to the descriptions of the Bluetooth communication element 116*a*. Details are not described herein again.

For the WLAN communication element 417*b*, refer to the descriptions of the WLAN communication element 117*a*. Details are not described herein again.

As shown in FIG. 4, the device 40B may access the local RIL 414*a* in the device 40A through the distributed RIL 415*b*, obtain the first information in the SIM card information of the physical SIM card corresponding to the physical SIM 412*a* in the device 40A, and map the communication capability of the physical SIM card in the device 40A to the device 40B. The device 40A may access the local RIL 414*b* in the device 40B through the distributed RIL 415*a*, obtain the first information in the SIM card information of the physical SIM card corresponding to the physical SIM 412*b* in the device 40B, and map the communication capability of the physical SIM card in the device 40B to the device 40A. In this way, the device 40A may become a dual-card device having one physical SIM card and one virtual SIM card. The device 40B may also become a dual-card device having one physical SIM card and one virtual SIM card. The device 40A and the device 40B dynamically switch to-be-used SIM cards based on a network condition. For example, when the physical SIM card in the device 40A has no network service, and the SIM card in the device 40B has a network service, the device 40A may switch to a cellular network using the virtual SIM card.

With reference to the accompanying drawings, the following describes schematic diagrams of related user interfaces for sharing a communication capability of a SIM card in one device with another device.

The following uses an example in which a mobile phone 40 shares a communication capability of a SIM card in the mobile phone 40 with a tablet 50 for description. For example, no SIM card is inserted into the tablet 50, and one SIM card is inserted into the mobile phone 40.

FIG. 5 to FIG. 37 are examples of schematic diagrams of user interfaces of the mobile phone 40 and the tablet 50 in a process of sharing the communication capability of the SIM card in the mobile phone 40 with the tablet 50.

The following first describes in detail how the tablet 50 specifically obtains the communication capability of the SIM card in the mobile phone 40 by using a received user operation.

FIG. 5 to FIG. 21 are examples of schematic diagrams of related user interfaces of the tablet 50 in a process in which the tablet 50 obtains the communication capability of the SIM card shared by the mobile phone 40.

In this embodiment of this application, the user may enable, in two manners, the tablet 50 to obtain the communication capability of the SIM card shared by the mobile phone 40.

Manner 1: As shown in FIG. 5 to FIG. 11, the user enables, through a super device card on the tablet 50, the tablet 50 to obtain the communication capability of the SIM card shared by the mobile phone 40.

Figure 5:
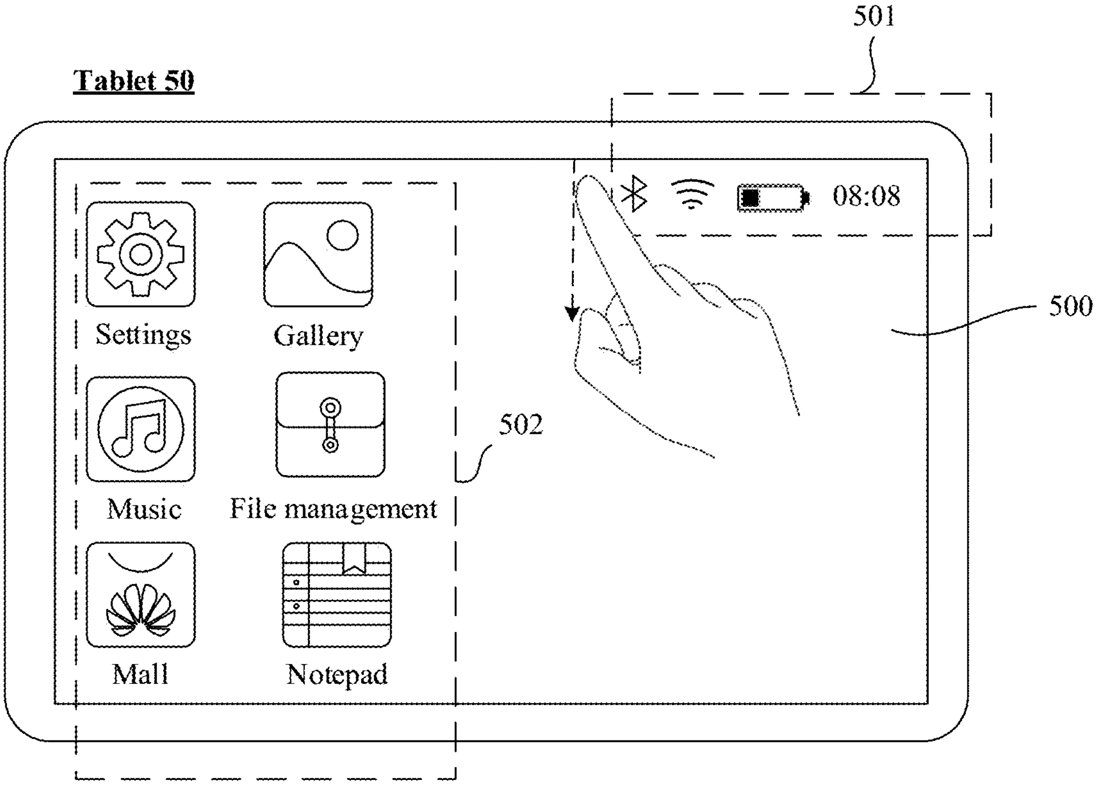
FIG. 5 to FIG. 21 are schematic diagrams of a group of user interfaces of a tablet 50 according to an embodiment of this application.

FIG. 5 shows an example of a user interface 500 of the tablet 50. As shown in FIG. 5, the user interface 500 is a home screen that is on the tablet 50 and that is used to display installed applications. The user interface 500 may include a status bar 501 and an application icon 502. The status bar 501 may include a Bluetooth indicator, one or more signal strength indicators of a wireless fidelity (Wi-Fi) signal, a battery status indicator, and a time indicator. The application icon 502 may include icons of a plurality of applications, for example, an icon of Settings, an icon of Gallery, and an icon of Music. Types and a quantity of application icons specifically included in the application icon 502 are not limited in embodiments of this application.

As shown in FIG. 5, the tablet 50 may receive a downward sliding operation of the user from the upper right edge of the tablet 50, and in response to the sliding operation of the user, the tablet 50 may display a user interface 600.

Figure 6:
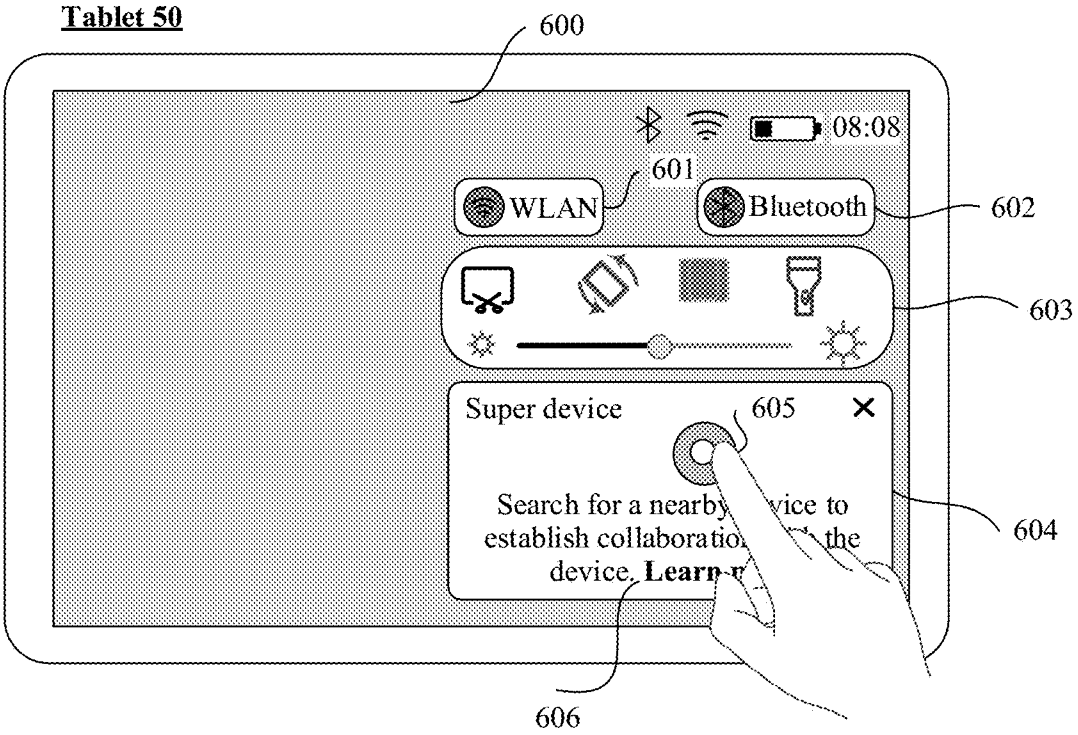

FIG. 6 shows an example of the user interface 600 of the tablet 50. As shown in FIG. 6, the user interface 600 may include a WLAN icon 601, a Bluetooth icon 602, and shortcut icons 603 of a plurality of functions (for example, a screenshot icon, an auto-rotation icon, a projection icon, a flashlight icon, and a brightness adjustment bar).

As shown in FIG. 6, the user interface 600 may further include a super device card 604. A control 605 and prompt information 606 are displayed in the card 604. The prompt information 606 may prompt the user to tap the control 605 to search for a nearby device that can establish a collaborative connection. The user may tap the control 605, and in response to the user operation, the tablet 50 may display a user interface 700.

Figure 7:
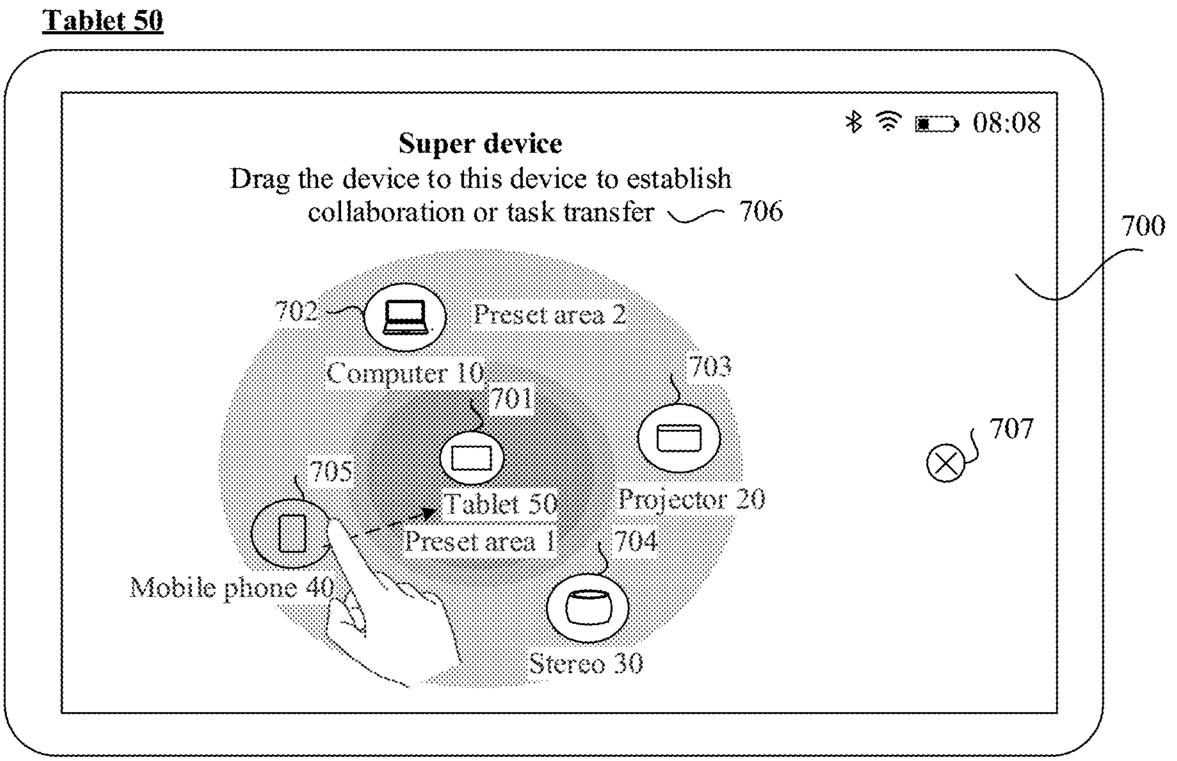

FIG. 7 shows an example of the user interface 700 of the tablet 50. As shown in FIG. 7, the user interface 700 may include an icon 701 of the tablet 50. Optionally, the user interface 700 may further include a name "tablet 50" of the tablet 50. The user interface 700 may further include icons of candidate devices that can be detected by the tablet 50 and that can establish a collaborative connection to the tablet 50. Optionally, the user interface 700 may further include names and/or models of the candidate devices, for example, an icon 702 and a name "computer 10" of a computer 10, an icon 703 and a name "projector 20" of a projector, an icon 704 and a name "stereo 30" of a stereo, and an icon 705 and a name "mobile phone 40" of the mobile phone 40. It may be understood that a shape of the icon of the tablet 50 and the name of the tablet 50, and shapes of the icons of the candidate devices and the names of the candidate devices are not limited in embodiments of this application.

Optionally, as shown in FIG. 7, the user interface 700 may further include a control 707 used to close the user interface 700.

For example, the icon and the name of the tablet 50 may be located in a preset area 1 (a circular area shown in FIG. 7) of the user interface 700. The icons of the candidate devices may be located in a preset area 2 (for example, an annular area shown in FIG. 7) surrounding the icon of the tablet 50. Shapes and locations of the preset area 1 and the preset area 2 are not limited in embodiments of this application.

As shown in FIG. 7, the user may slide the icon 705 of the mobile phone 40 to the preset area 1 or to be close to the icon 701 of the tablet 50. In response to the user operation, the tablet 50 may display a user interface 800.

Figure 8:
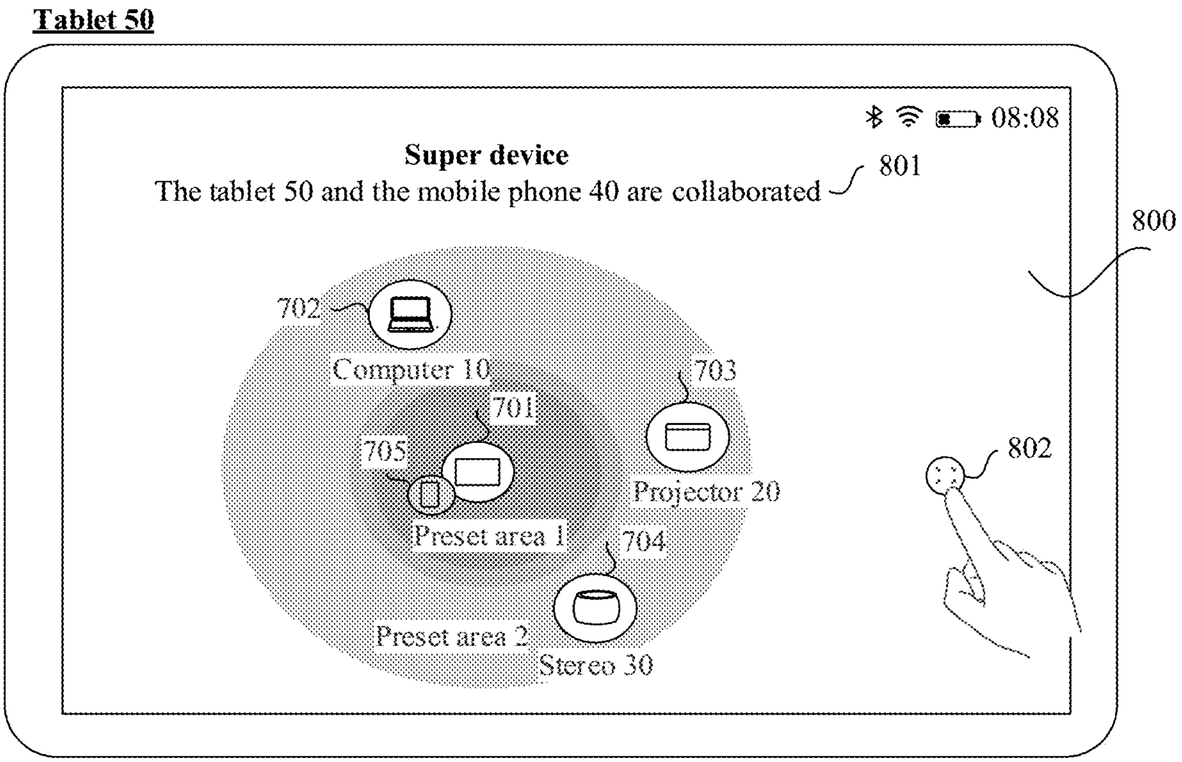

FIG. 8 shows an example of the user interface 800 of the tablet 50. As shown in FIG. 8, that the icon 705 of the mobile phone 40 is attached to the icon 701 of the tablet 50 is displayed on the user interface 800. The user interface 800 may include prompt information 801 and a control 802. The prompt information 801 may prompt the user that the tablet 50 and the mobile phone 40 are collaborated. The user may tap the control 802, and in response to the user operation, the tablet 50 may display a user interface 900.

Figure 9:
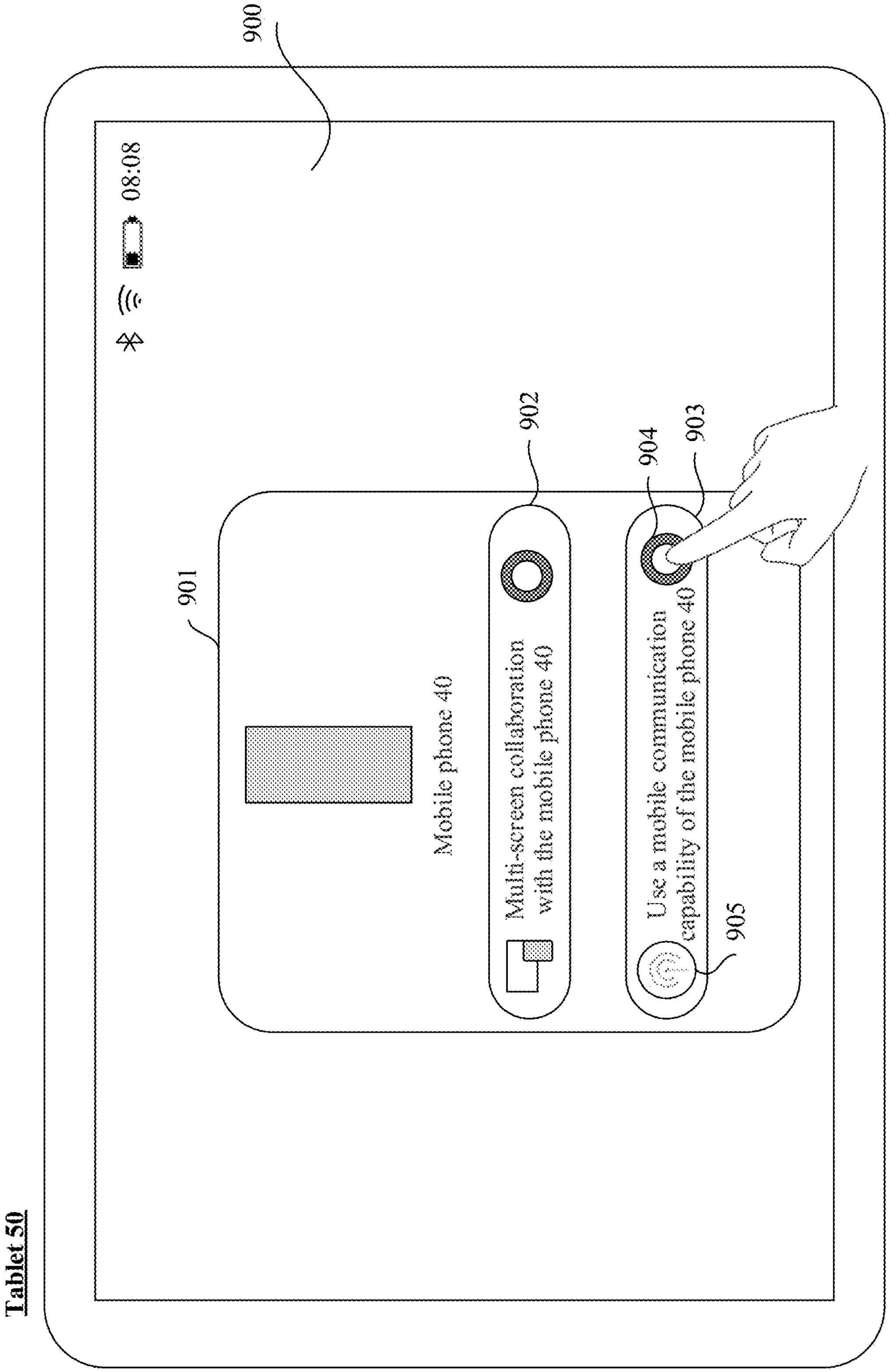

FIG. 9 shows an example of the user interface 900 of the tablet 50. As shown in FIG. 9, the user interface 900 may include an option box 901, and an option bar 902 and an option bar 903 may be displayed in the option box 901. The option bar 902 may be used to select whether the tablet 50 performs multi-screen collaboration with the mobile phone 40. The option bar 903 may be used to select whether the tablet 50 uses a mobile communication capability of the mobile phone 40. A control 904 and a mobile communication sharing icon 905 may be displayed in the option bar 903. The user may select, by using the control 904, the tablet 50 to use the mobile communication capability of the mobile phone 40.

In a feasible example, after the user taps the control 904, if the mobile communication capability of the mobile phone 40 is successfully shared with the tablet 50, the tablet 50 may display a user interface 1000.

Figure 10:
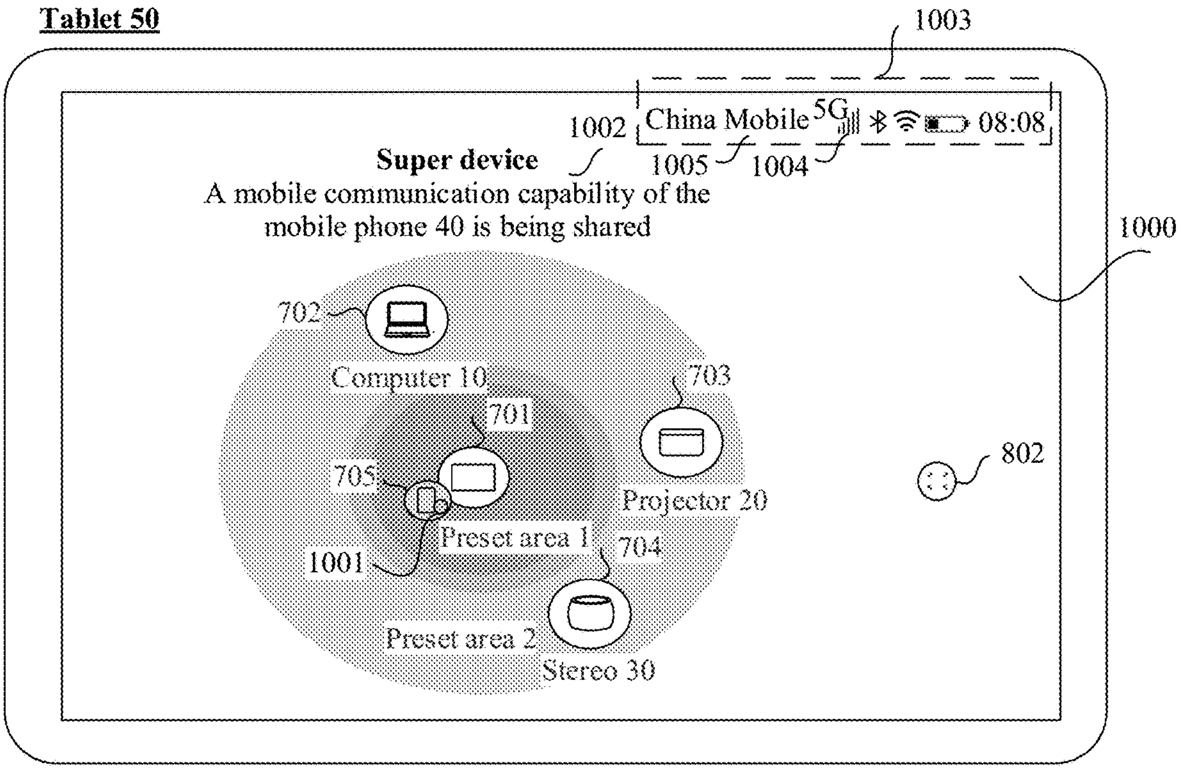

FIG. 10 shows an example of the user interface 1000 of the tablet 50. As shown in FIG. 10, the user interface 1000 may include an icon 1001, prompt information 1002, and a status bar 1003. A shape of the icon 1001 is the same as that of the mobile communication sharing icon 905 on the user interface 900, and indicates that the mobile phone 40 shares the mobile communication capability with the tablet 50. The prompt information 1002 may prompt the user that the mobile communication capability of the mobile phone 40 is shared with or used by the tablet 50. The status bar 1003 may include a signal strength indicator 1004 or an operator name "China Mobile" 1005, and a network standard (for example, 5G) of a mobile communication signal (which may also be referred to as a cellular signal or a cellular network signal).

Optionally, the user interface 1000 may further include an icon indicating that the mobile communication capability is shared. For example, the icon may be the same as an icon 2702 shown in FIG. 27. For details, refer to the descriptions in FIG. 27. Details are not described herein again.

Optionally, in another feasible example, after the user taps the control 904, if the mobile communication capability of the mobile phone 40 fails to be shared with the tablet 50, the tablet 50 may display a user interface 1100.

Figure 11:
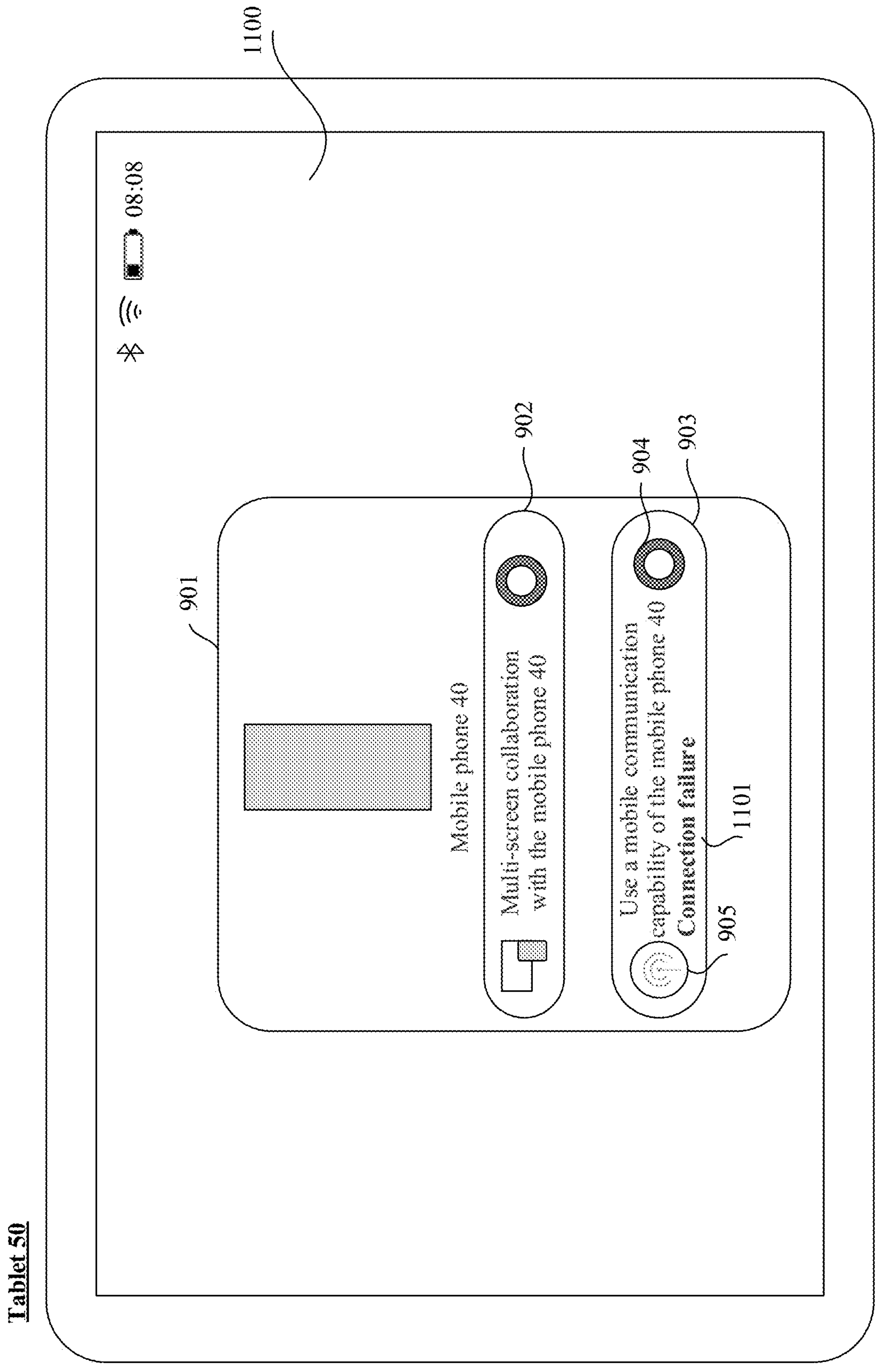

FIG. 11 shows an example of the user interface 1100 of the tablet 50. As shown in FIG. 11, the user interface 1100 may include an option box 901, and prompt information 1101 may be displayed in the option box 901. The prompt information 1101 may prompt the user that the mobile communication capability of the mobile phone 40 fails to be shared with the tablet 50. For example, content of the prompt information 1101 may be specifically "unable to connect". It may be understood that the content of the prompt information 1101 is not limited in embodiments of this application. For specific descriptions of the option box 901, refer to the descriptions of FIG. 9. Details are not described herein again.

Manner 2: As shown in FIG. 12 to FIG. 15, a user enables, through a setting interface on the tablet 50, the tablet 50 to obtain the communication capability of the SIM card shared by the mobile phone 40.

Figure 12:
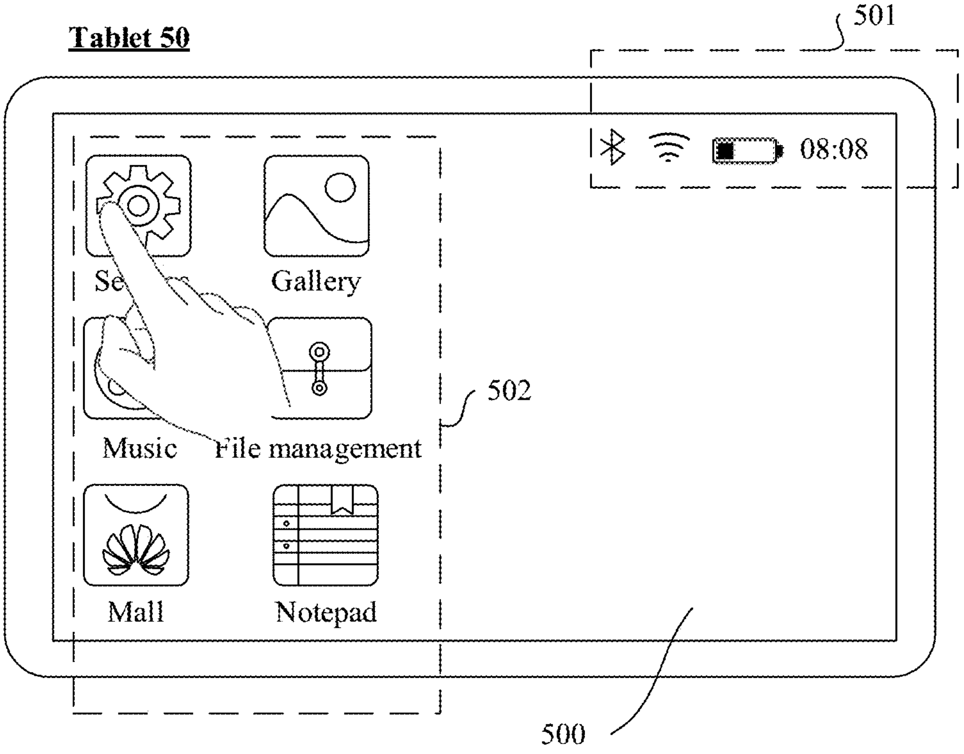

FIG. 12 shows an example of a user interface 500 of the tablet 50. For details of the user interface 500, refer to the descriptions in FIG. 5. Details are not described herein again. As shown in FIG. 12, the user may tap an icon of a setting application on the user interface 500, and in response to the user operation, the tablet 50 may display a user interface 1300.

Figure 13:
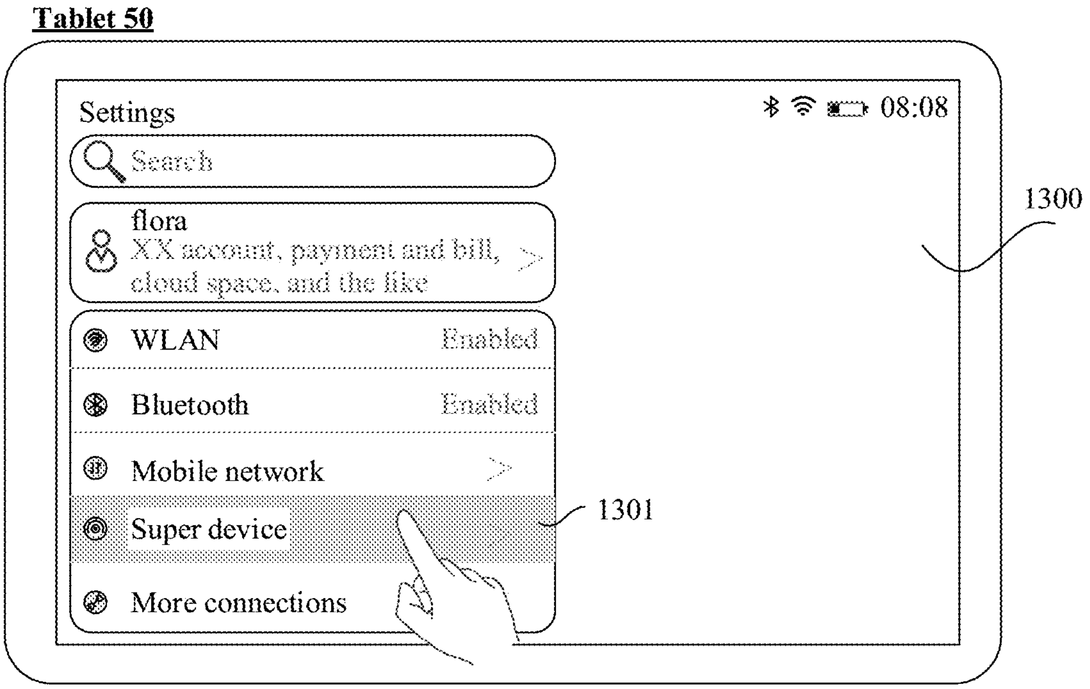

FIG. 13 shows an example of the user interface 1300 of the tablet 50. The user interface 1300 may be the setting interface of the tablet 50. The user interface 1300 may include a setting bar used to set a WLAN, Bluetooth, a mobile network, a super device, and the like. The user may tap a setting bar 1301 used to set the super device, and in response to the user operation, the tablet 50 may display a user interface 1400.

It may be understood that the user may tap the icon of the setting application, so that the tablet 50 enters the setting interface; and the user may alternatively tap another control or icon that is on the tablet 50 and that is used to enter the setting interface. The tablet 50 may display the setting interface, for example, the user interface 1300 shown in FIG. 13, in response to the user operation.

Figure 14:
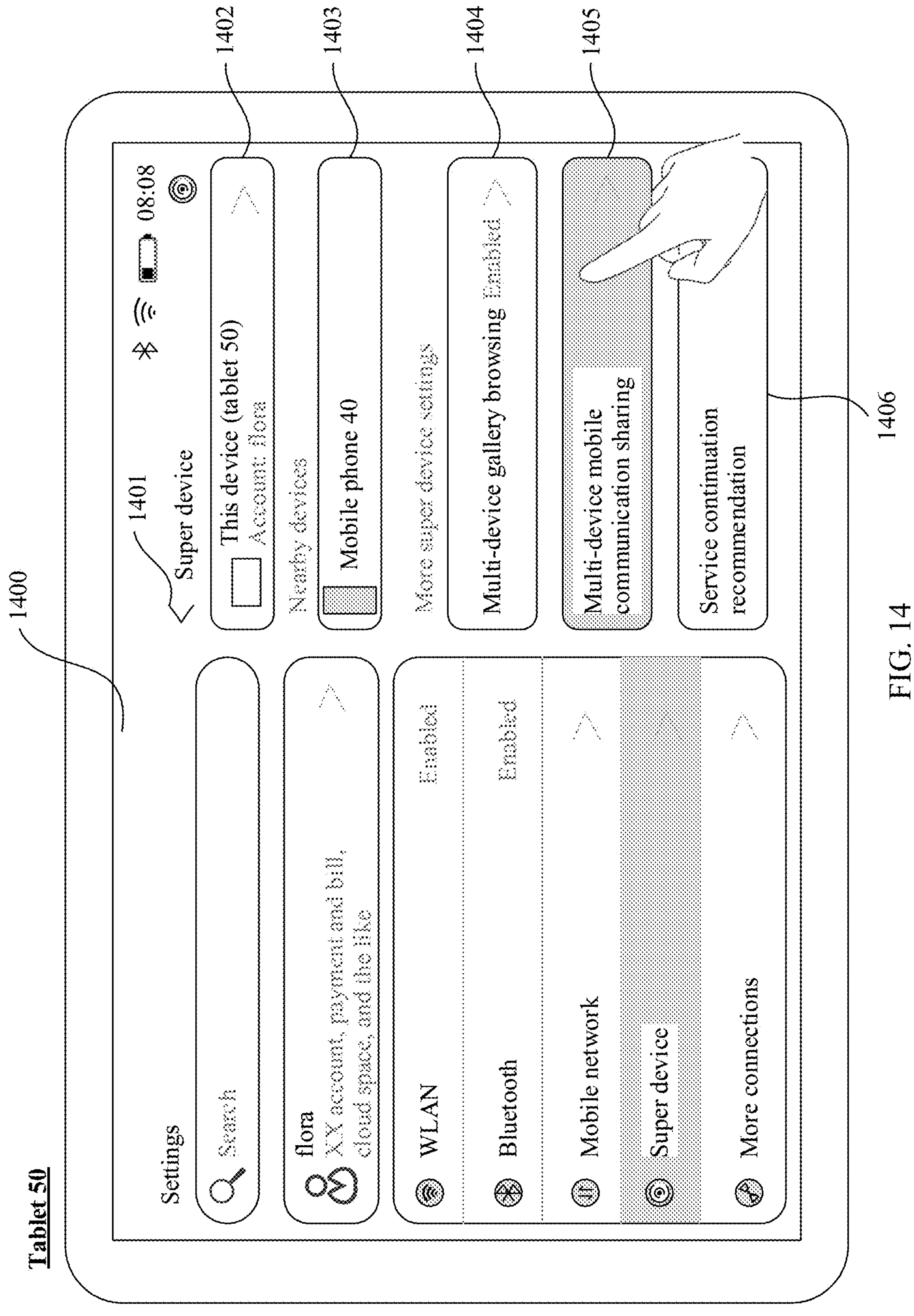

FIG. 14 shows an example of the user interface 1400 of the tablet 50. As shown in FIG. 14, the user interface 1400 may include a control 1401 and a plurality of setting items, such as a setting item 1402, a setting item 1403, a setting item 1404, a setting item 1405, and a setting item 1406. The control 1401 may be used to return to a previous-level page. The setting item 1402 may be used to display related information of the local device, namely, the tablet 50. The setting item 1403 is used to display related information of a device that is near the tablet 50 and that can establish a collaborative connection, for example, the mobile phone 40. The setting item 1404 may be used to enable or disable a multi-device gallery browsing function. The setting item 1405 may be used to set multi-device mobile communication sharing. The setting item 1406 may be used to enable or disable a service continuation recommendation function. The user may tap the setting item 1405, and in response to the user operation, the tablet 50 may display a user interface 1500.

It may be understood that, when related information of a plurality of devices that can establish a collaborative connection to the tablet 50 is displayed in the setting item 1403, the user may select one device from the plurality of devices that can establish a collaborative connection to the tablet 50 to establish the collaborative connection to the tablet 50.

In some feasible examples, if the mobile phone 40 previously establishes a collaborative connection to the tablet 50, the tablet 50 may select, by default, to establish a collaborative connection to the mobile phone 40 this time. Optionally, the user may further change, in the setting item 1403, a device that establishes a collaborative connection to the tablet 50.

Figure 15:
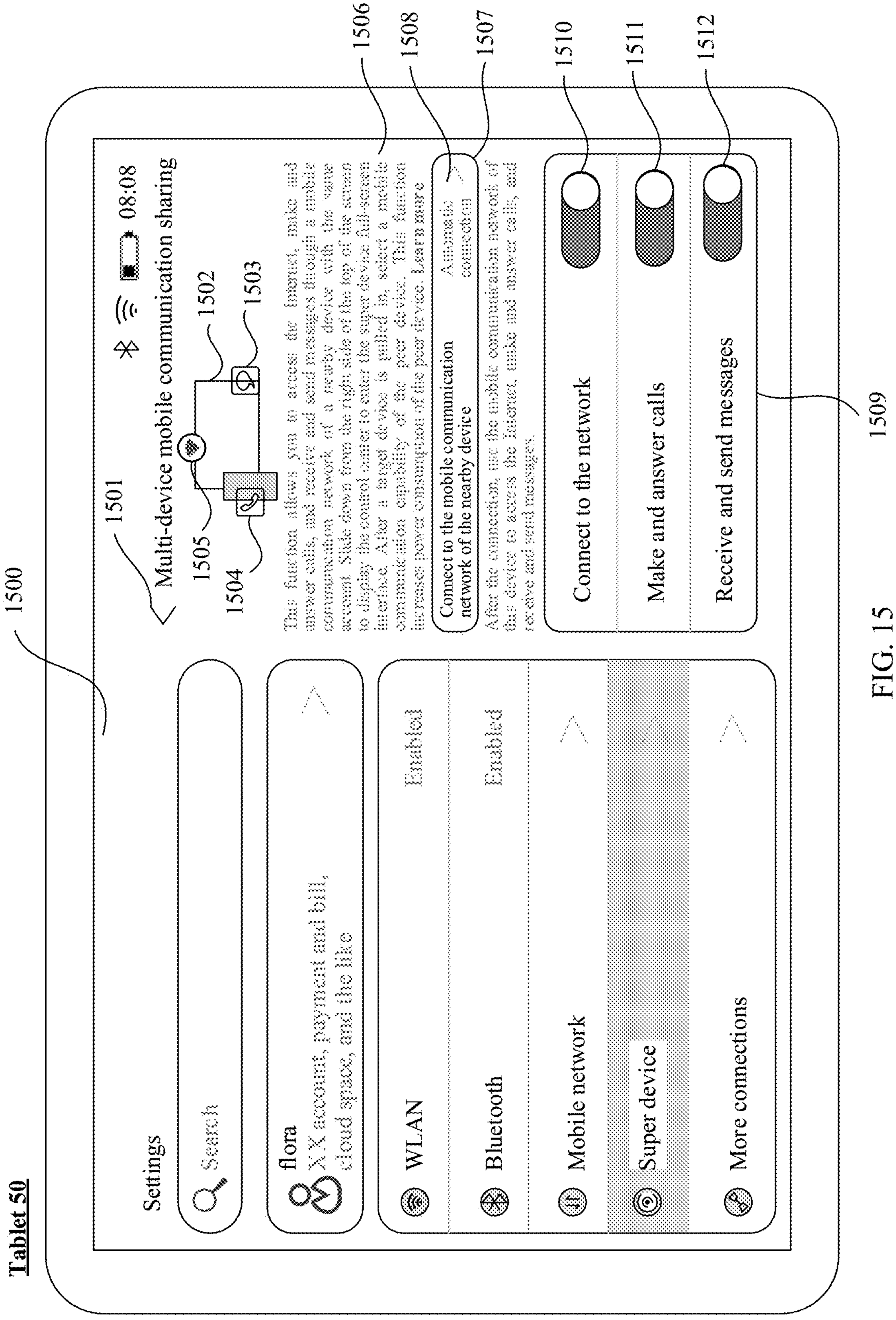

FIG. 15 shows an example of the user interface 1500 of the tablet 50. As shown in FIG. 15, the user interface 1500 may include a control 1501, an icon 1502, an icon 1503, an icon 1504, an icon 1505, prompt information 1506, an option bar 1507, and an option box 1509. The icon 1502 may be used to show that the mobile phone 40 and the tablet 50 perform mobile communication sharing. The icon 1503 may be used to show that the mobile phone 40 can share an SMS message communication capability with the tablet 50. The icon 1504 may be used to show that the mobile phone 40 can share a phone communication capability with the tablet 50. The icon 1505 may be used to show that the mobile phone 40 can share a cellular network communication capability with the tablet 50. The prompt information 1506 may prompt the user of a functionality of a multi-device mobile communication sharing function, how to operate to implement the mobile communication sharing function, and the like. Prompt content specifically included in the prompt information 1506 is not limited in embodiments of this application.

As shown in FIG. 15, a control 1508 may be displayed in the option bar 1507. The control 1508 may be used to select to automatically connect to a mobile communication network of a nearby device or not to automatically connect to a mobile communication network of a nearby device. After an automatic connection is selected, the tablet 50 may connect to a nearby device that has a same account as the tablet 50, and use a mobile communication network of the device to access the Internet, make a call, receive and send SMS messages, and the like.

As shown in FIG. 15, the option box 1509 may include a control 1510, a control 1511, and a control 1512. The control 1510 may be used to select whether to use a cellular network of the collaboration device, namely, the mobile phone 40. The control 1511 may be used to select whether to use a phone communication capability of the collaboration device, namely, the mobile phone 40. The control 1512 may be used to select whether to use an SMS message communication capability of the collaboration device, namely, the mobile phone 40. In other words, through the control 1510, the control 1511, and the control 1512, the user may select the tablet 50 for sharing one or more of the cellular network communication capability, the phone communication capability, and the SMS message communication capability of the mobile phone 40.

Further, in some feasible examples, after the mobile communication capability of the mobile phone 40 is successfully shared with the tablet 50, that the mobile communication capability of the mobile phone 40 is shared with the tablet 50 may be displayed in a super device card of the tablet 50, and a signal strength indicator and an operator name of a mobile communication signal appear in the status bar. For details, refer to a user interface 1600 of the tablet 50.

Figure 16:
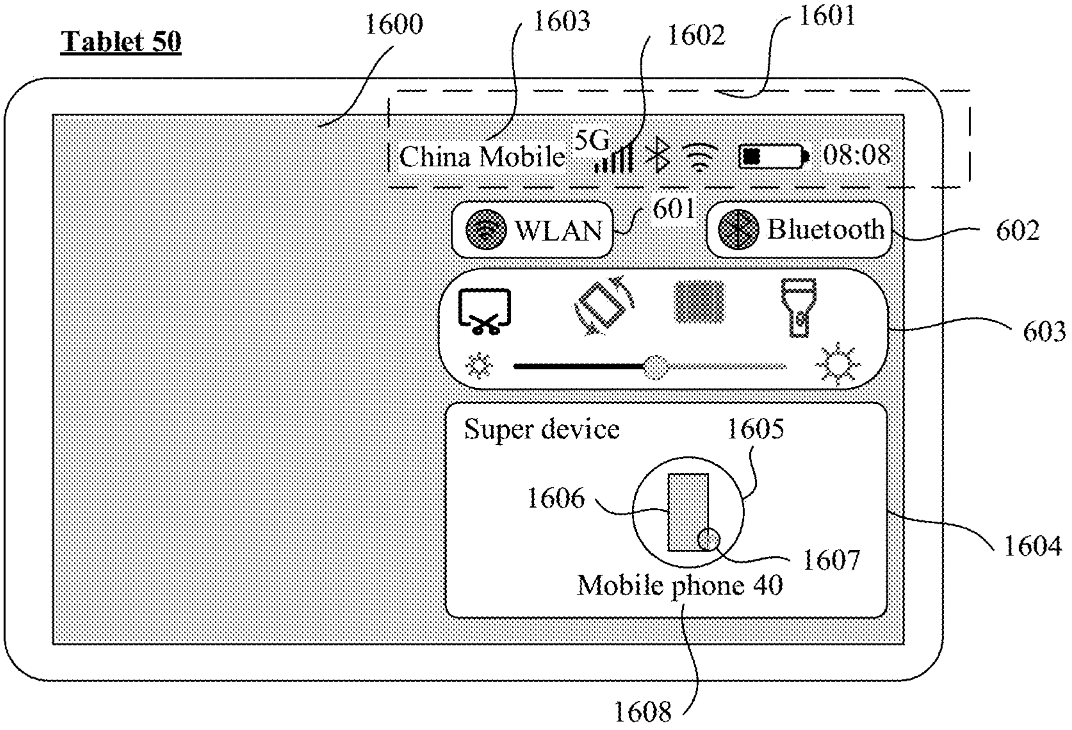

FIG. 16 shows an example of the user interface 1600 of the tablet 50. As shown in FIG. 16, the user interface 1600 may include a status bar 1601 and a super device card 1604. A signal strength indicator 1602, and/or an operator name "China Mobile" 1603, and a network standard of the mobile communication signal may be displayed in the status bar 1601. An icon 1605 and text information 1608 may be displayed in the super device card 1604. The icon 1605 may include an icon 1606 of the mobile phone 40 and an icon 1607 used to prompt that the mobile phone 40 performs mobile communication capability sharing. The text information 1608 is used to display the name "mobile phone 40" of the mobile phone 40.

After the mobile communication capability of the mobile phone 40 is successfully shared with the tablet 50, if a communication connection between the tablet 50 and the mobile phone 40 is disconnected (for example, a Bluetooth connection between the tablet 50 and the mobile phone 40 is disconnected because Bluetooth of the tablet 50 is disabled), the signal strength indicator, and/or the operator name, and the network standard that are originally displayed in the status bar of the user interface of the tablet 50 are no longer displayed. In addition, on the user interface of the tablet 50, a related icon that is originally displayed in the super device card and indicates that the mobile phone 40 shares the mobile communication capability with the tablet 50 is no longer displayed. For details, refer to a user interface 1700 of the tablet 50.

Figure 17:
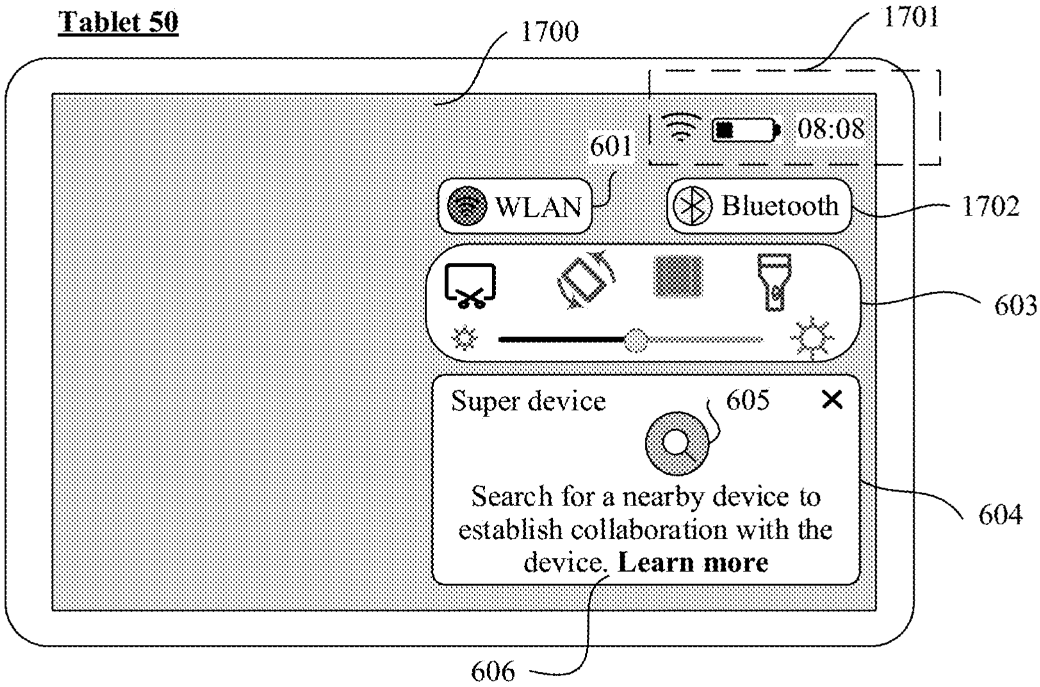

FIG. 17 shows an example of the user interface 1700 of the tablet 50. As shown in FIG. 17, the user interface 1700 may include a status bar 1701, a Bluetooth icon 1702, and a super device card 604. If no Bluetooth indicator is displayed in the status bar 1701, it indicates that the tablet 50 has disconnected the Bluetooth connection. The Bluetooth icon 1702 indicates that Bluetooth is not enabled on the tablet 50. The related icon indicating that the mobile phone 40 shares the mobile communication capability with the tablet 50 is no longer displayed in the super device card 604. For details about the super device card 604, refer to the descriptions of FIG. 6. Details are not described herein again.

Figure 18:
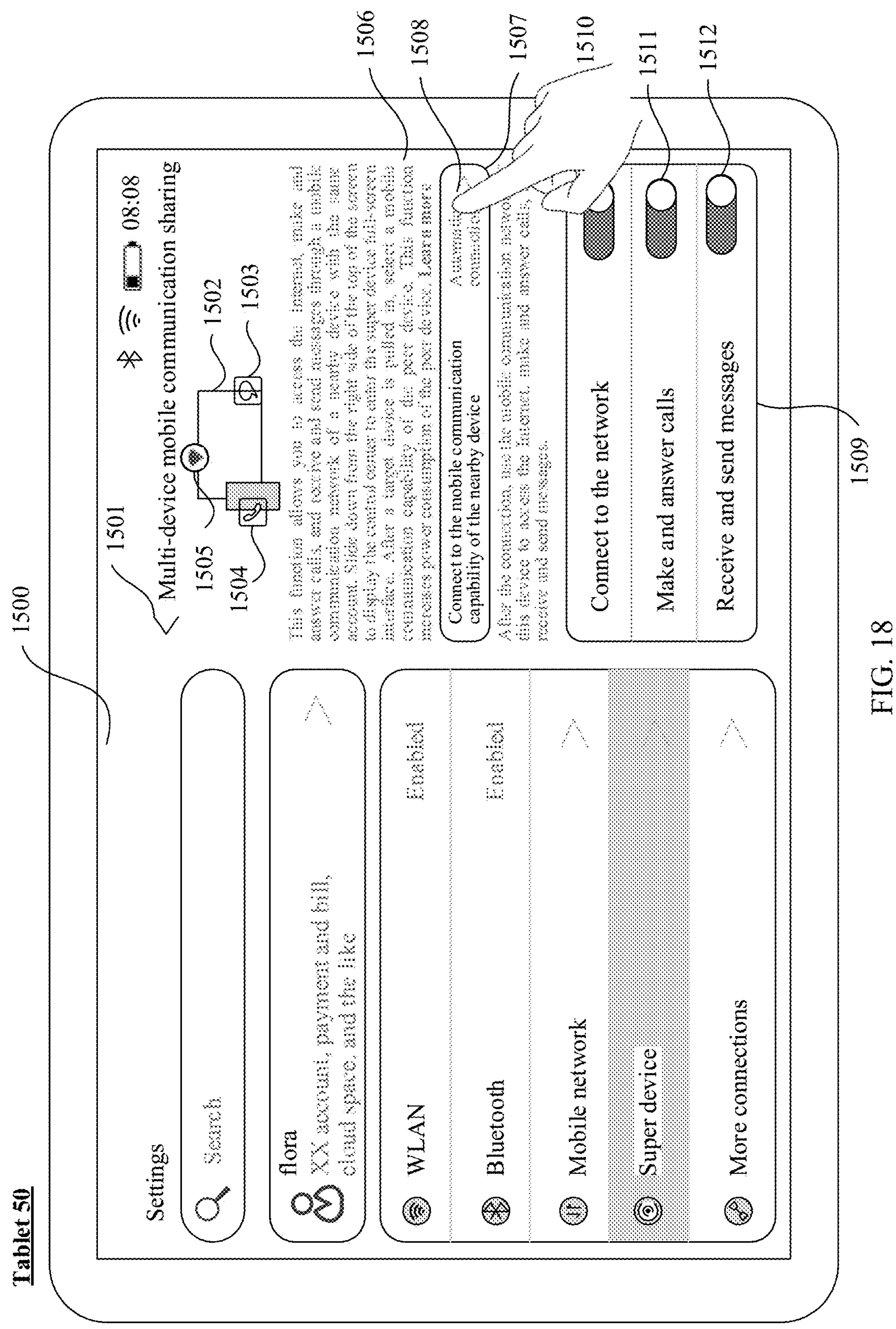

Optionally, in some feasible examples, the user may alternatively select a non-automatic connection on the user interface 1500 of the tablet 50. To be specific, the tablet 50 no longer automatically connects to a nearby collaborative device, and a mobile communication capability of the device is not shared. As shown in FIG. 18, the user may tap the control 1508 on the user interface 1500, and in response to the user operation, the tablet 50 may display a user interface 1900.

Figure 19:
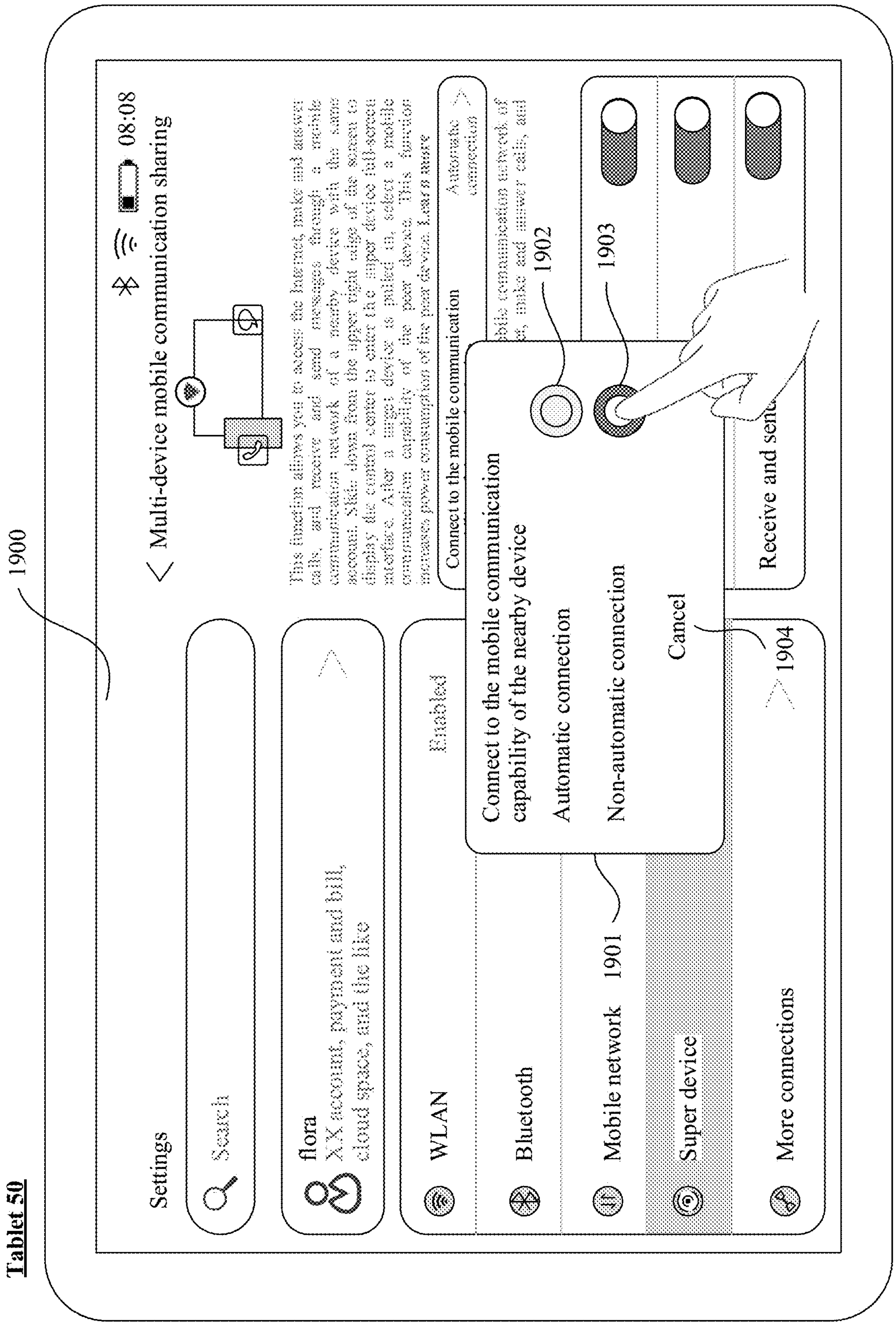

FIG. 19 shows an example of the user interface 1900 of the tablet 50. As shown in FIG. 19, the user interface 1900 may include an option box 1901, and a control 1902, a control 1903, and a control 1904 may be displayed in the option box 1901. The control 1902 may be used to select to automatically connect the tablet 50 to a collaborative device near the tablet 50, and automatically share a mobile communication capability of the device. The control 1903 may be used to select to not automatically connect the tablet 50 to a collaborative device near the tablet 50, and not automatically share a mobile communication capability of the device. The control 1904 is used to cancel the user-selected automatic connection or non-automatic connection.

After the user taps the control 1903 to select the non-automatic connection, if the tablet 50 is not connected to the WLAN, when the user opens an application that needs to use a network, the tablet 50 may display a prompt box, to prompt the user whether to connect to the mobile communication network of the mobile phone 40 to access the Internet, make and answer calls, and receive and send messages. For details, refer to a user interface 2000 of the tablet 50.

Figure 20:
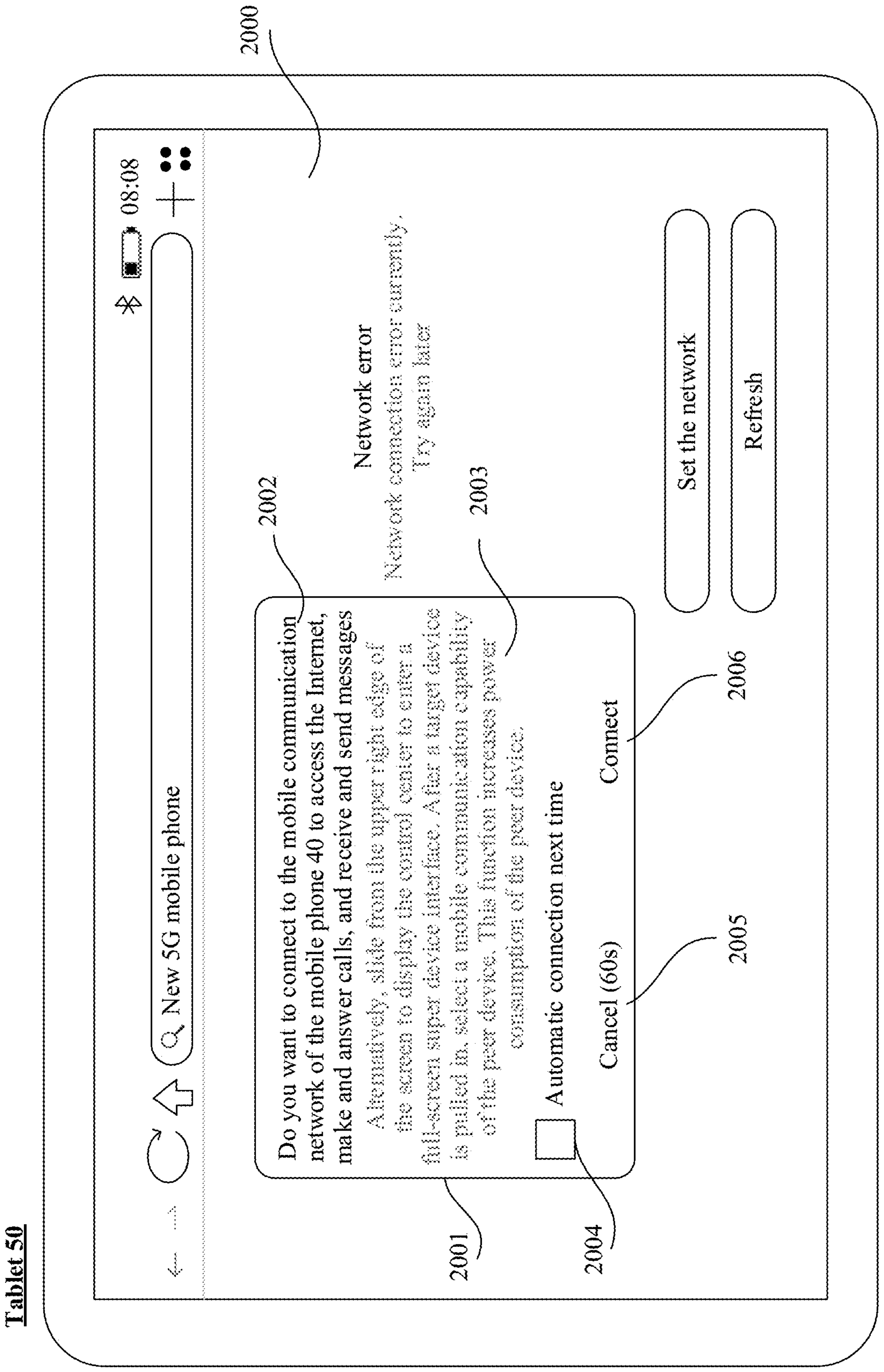

FIG. 20 shows an example of the user interface 2000 of the tablet 50. As shown in FIG. 20, the user interface 2000 may include a prompt box 2001. Prompt information 2002, prompt information 2003, a control 2004, a control 2005, and a control 2006 may be displayed in the prompt box 2001. The prompt information 2002 may prompt the user whether to connect to the mobile communication network of the mobile phone 40 to access the Internet, make and answer calls, and receive and send messages. The prompt information 2003 may prompt the user how to enter a super device interface and select to share the mobile communication capability of the mobile phone 40. The control 2004 may be used to select a next automatic connection. The control 2005 may be used to cancel displaying of the prompt box 2001. The control 2006 may be used to select to connect to the mobile communication network of the mobile phone 40 to access the Internet, make and answer calls, and receive and send messages.

In some feasible examples, after the user taps the control 2005 for cancellation, the tablet 50 no longer displays the prompt box 2001 within preset duration T1. For example, the preset duration T1 may be 24 hours or 12 hours. A value of the preset duration T1 is not limited in embodiments of this application.

Further, in some feasible examples, when the tablet 50 detects that a quantity of times that the user taps the control 2005 reaches a preset quantity of times, the tablet 50 no longer displays the prompt box 2001 in an entire life cycle. For example, the preset quantity of times may be 3 or 5. A value of the preset quantity of times is not limited in embodiments of this application.

Optionally, in some feasible examples, after the user taps the control 2006 for a connection or changes the setting to the "automatic connection" this time (for example, taps the control 1902 on the user interface 1900 to select to automatically connect to a collaborative device near the tablet 50, and automatically share a mobile communication capability of the device), if the setting is changed to the "non-automatic connection" next time, the tablet 50 may display the prompt box 2001 when there is no network.

Optionally, in some feasible examples, after the tablet 50 is reset (for example, the tablet 50 is restored to factory settings) or related setting data in the tablet 50 is cleared, the tablet 50 may display the prompt box 2001 when no network is connected.

Optionally, in some feasible examples, when the user does not tap any control in the prompt box 2001 due to timeout, the prompt box 2001 on the tablet 50 disappears. After preset duration T2, the tablet 50 displays the prompt box 2001 again. The preset duration T2 may be 5 minutes, 1 hour, 2 hours, or the like. A specific value of the preset duration T2 is not limited in embodiments of this application.

Optionally, in a feasible example, the tablet 50 may display the prompt box 2001 only once within preset duration T3. The preset duration T3 may be 12 hours, 24 hours, or the like. A specific value of the preset duration T3 is not limited in embodiments of this application.

Optionally, in a feasible example, in a process of displaying the prompt box 2001, the tablet 50 may switch between a dark-color mode and a light-color mode. After the switching, the prompt box 2001 restarts timing from preset countdown duration. The preset countdown duration may be 60 s, 90 s, or the like. A specific value of the preset countdown duration is not limited in embodiments of this application.

In some scenarios, the mobile communication capability of the mobile phone 40 is successfully shared with the tablet 50. When the tablet 50 uses the cellular network shared by the mobile phone 40, the tablet 50 may display a notification box, and the notification box may be used to prompt the user of mobile traffic that is of cellular network data shared by the mobile phone 40 and that is consumed by the tablet 50. For details, refer to a user interface 2100 of the tablet 50.

Figure 21:
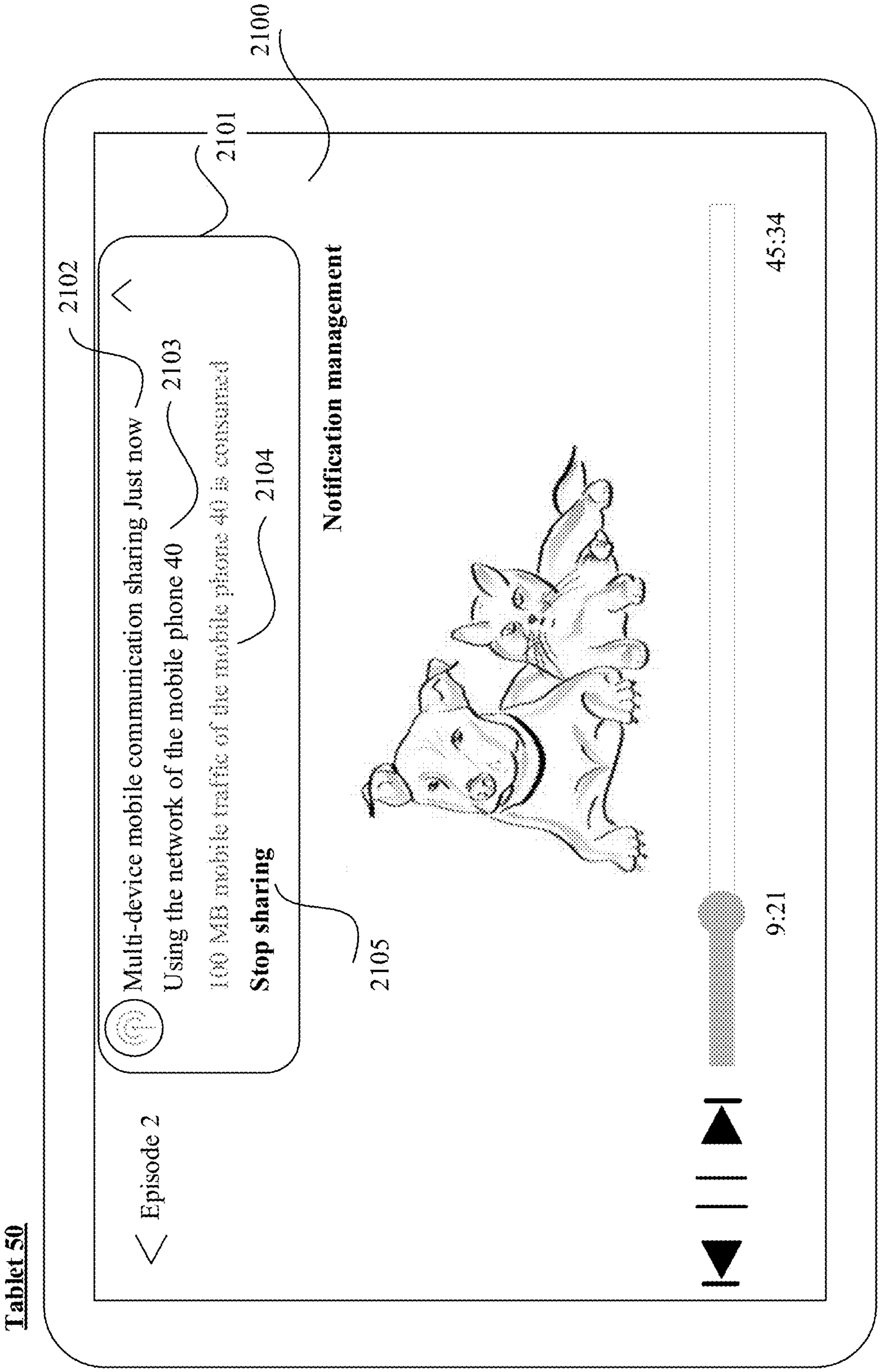

FIG. 21 shows an example of the user interface 2100 of the tablet 50. As shown in FIG. 21, a video that is being played and a notification box 2101 are displayed on the user interface 2100. Prompt information 2102, prompt information 2103, prompt information 2104, and a control 2105 may be displayed in the notification box 2101. The prompt information 2102 may prompt the user that the tablet 50 performs mobile communication sharing. The prompt information 2103 may prompt the user that the tablet 50 uses the network of the mobile phone 40. The prompt information 2104 may prompt the user of the mobile traffic that is of the cellular network data shared by the mobile phone 40 and that is consumed by the tablet 50, for example, "100 MB mobile traffic of the mobile phone 40 is consumed". The control 2105 may be used to enable the tablet 50 to stop sharing the cellular network provided by the mobile phone 40.

In this embodiment of this application, the user may perform settings on the tablet 50, so that the tablet 50 obtains the mobile communication capability provided by the mobile phone 40; and the user may alternatively perform settings on the mobile phone 40, so that the mobile phone 40 shares the mobile communication capability of the mobile phone 40 with the tablet 50.

The following describes in detail how the mobile phone 40 specifically shares the communication capability of the SIM card in the mobile phone 40 with the tablet 50 by using a received user operation.

FIG. 22 to FIG. 37 are examples of schematic diagrams of related user interfaces of the mobile phone 40 in a process in which the mobile phone 40 shares the communication capability of the SIM card with the tablet 50.

In this embodiment of this application, the user may set a super device card on the mobile phone 40, so that the mobile phone 40 shares the mobile communication capability with the tablet 50; and the user may alternatively set a setting interface on the mobile phone 40, so that the mobile phone 40 shares the mobile communication capability with the tablet 50.

Manner 1: As shown in FIG. 22 to FIG. 28, the user enables the mobile phone 400 to share the mobile communication capability with the tablet 50 through the super device card in the mobile phone 40.

Figure 22:
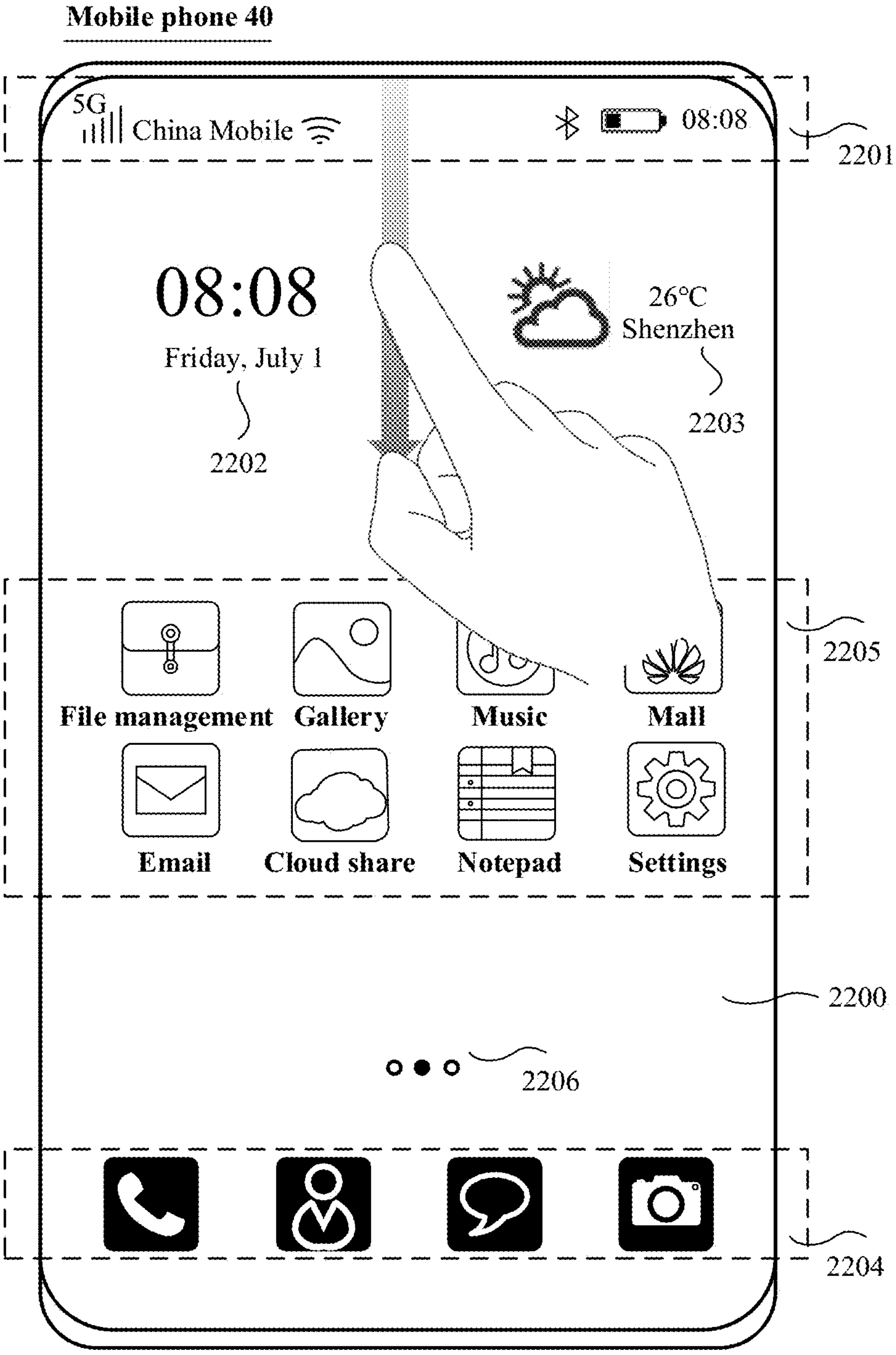
FIG. 22 to FIG. 25 are schematic diagrams of a group of user interfaces of a mobile phone 40 according to an embodiment of this application.

FIG. 22 shows an example of a user interface 2200 of the mobile phone 40. As shown in FIG. 22, a user interface 2200 is a home screen that is on the mobile phone 40 and that is used to display installed applications. The user interface 2200 may include a status bar 2201, a calendar indicator 2202, a weather indicator 2203, a tray 2204 with icons of frequently used applications, and other application icons 2205.

The status bar 2201 may include one or more signal strength indicators and an operator name (for example, "China Mobile") of a mobile communication signal, one or more signal strength indicators of a Wi-Fi signal, a battery status indicator, and a time indicator.

The user interface 2200 may further include a page indicator 2206. The other application icons may be distributed on a plurality of pages, and the page indicator 2206 may indicate a specific page on which an application is currently viewed by the user. The user may slide leftward or rightward in an area including the other application icons, to view an application icon on another page.

As shown in FIG. 22, the mobile phone 40 may receive a sliding operation performed by the user on the status bar 2201, and in response to the sliding operation, the mobile phone 40 may display a user interface 2300.

Figure 23:
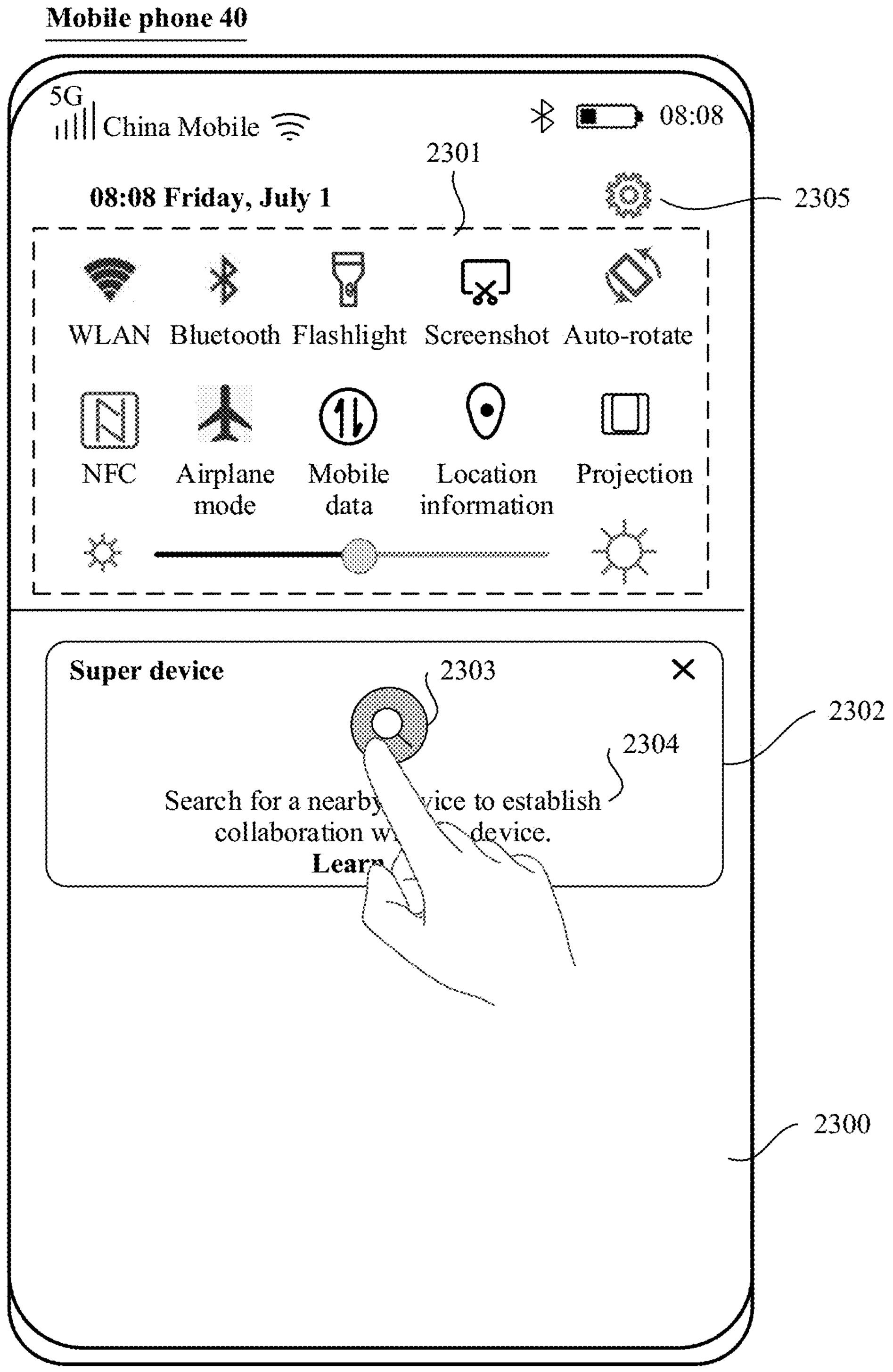

FIG. 23 shows an example of the user interface 2300 of the mobile phone 40. As shown in FIG. 23, the user interface 2300 may include shortcut icons 2301 of a plurality of frequently used functions (for example, a WLAN icon, a Bluetooth icon, a flashlight icon, an NFC icon, and a brightness adjustment bar).

As shown in FIG. 23, the user interface 2300 may include a super device card 2302 and a control 2305. The control 2305 may be used to enter the setting interface of the mobile phone 40. Prompt information 2304 and a control 2303 may be displayed in the super device card 2302. The prompt information 2304 may indicate the user to tap the control 2303 to search for a nearby device that can establish a collaborative connection. The user may tap the control 2303, and in response to the user operation, the mobile phone 40 may display a user interface 2400.

Figure 24:
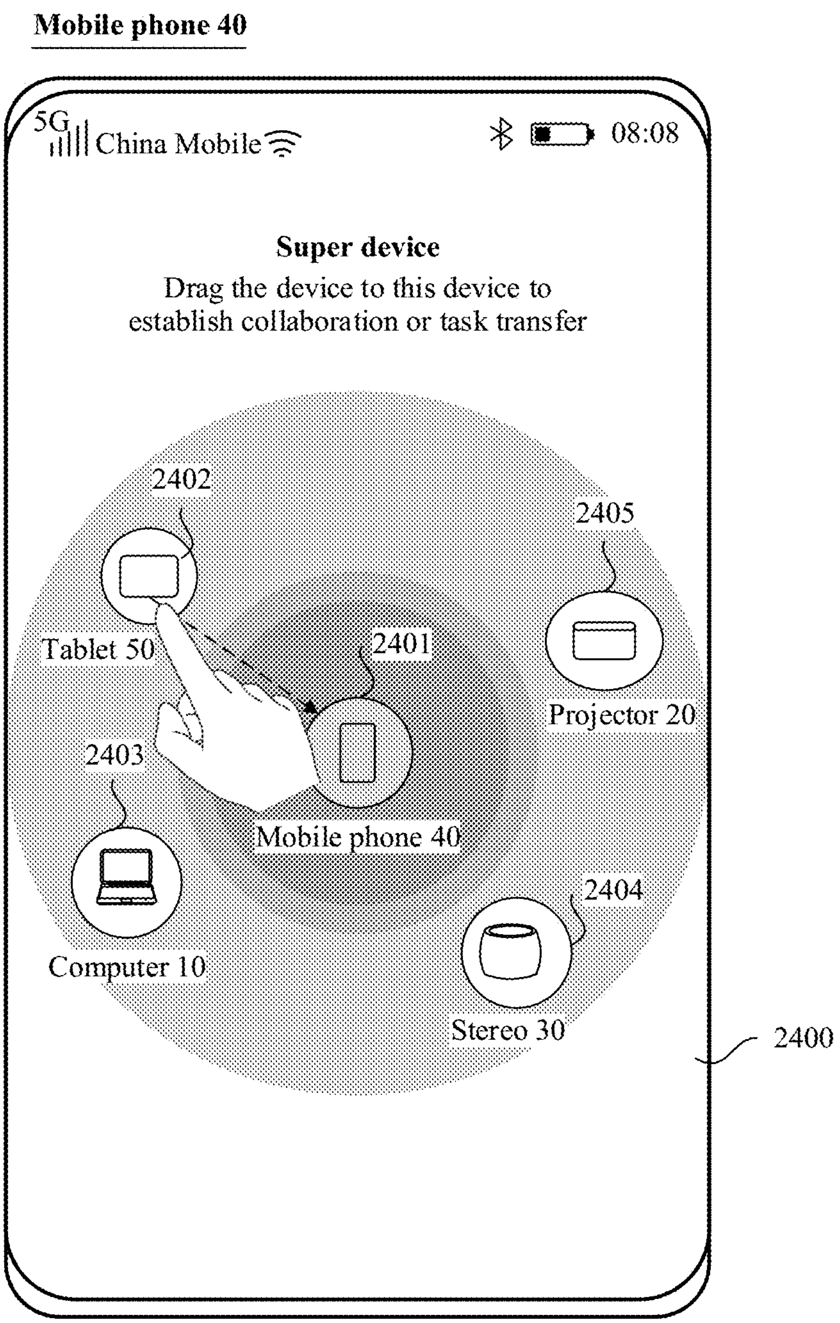

FIG. 24 shows an example of the user interface 2400 of the mobile phone 40. As shown in FIG. 24, the user interface 2400 may include an icon 2401 and a name "mobile phone 40" of the mobile phone 40. The user interface 2400 may further include icons of candidate devices that can be detected by the mobile phone 40 and that can establish a collaborative connection to the mobile phone 40, and names and/or models of the candidate devices, for example, an icon 2402 and a name "tablet 50" of the tablet 50, an icon 2403 and a name "computer 10" of a computer 10, an icon 2404 and a name "stereo 30" of a stereo, and an icon 2405 and a name "projector 20" of a projector. It may be understood that a shape of the icon of the mobile phone 40 and the name of the mobile phone 40, and shapes of the icons of the candidate devices and the names of the candidate devices are not limited in embodiments of this application.

It may be understood that, for the user interface 2400, refer to the descriptions of the user interface 700. Details are not described herein again.

As shown in FIG. 24, the user may slide the icon of the tablet 50 to a circular area in which the icon of the mobile phone 40 is located or to be close to the icon of the mobile phone 40. In response to the user operation, the mobile phone 40 may display a user interface 2500.

Figure 25:
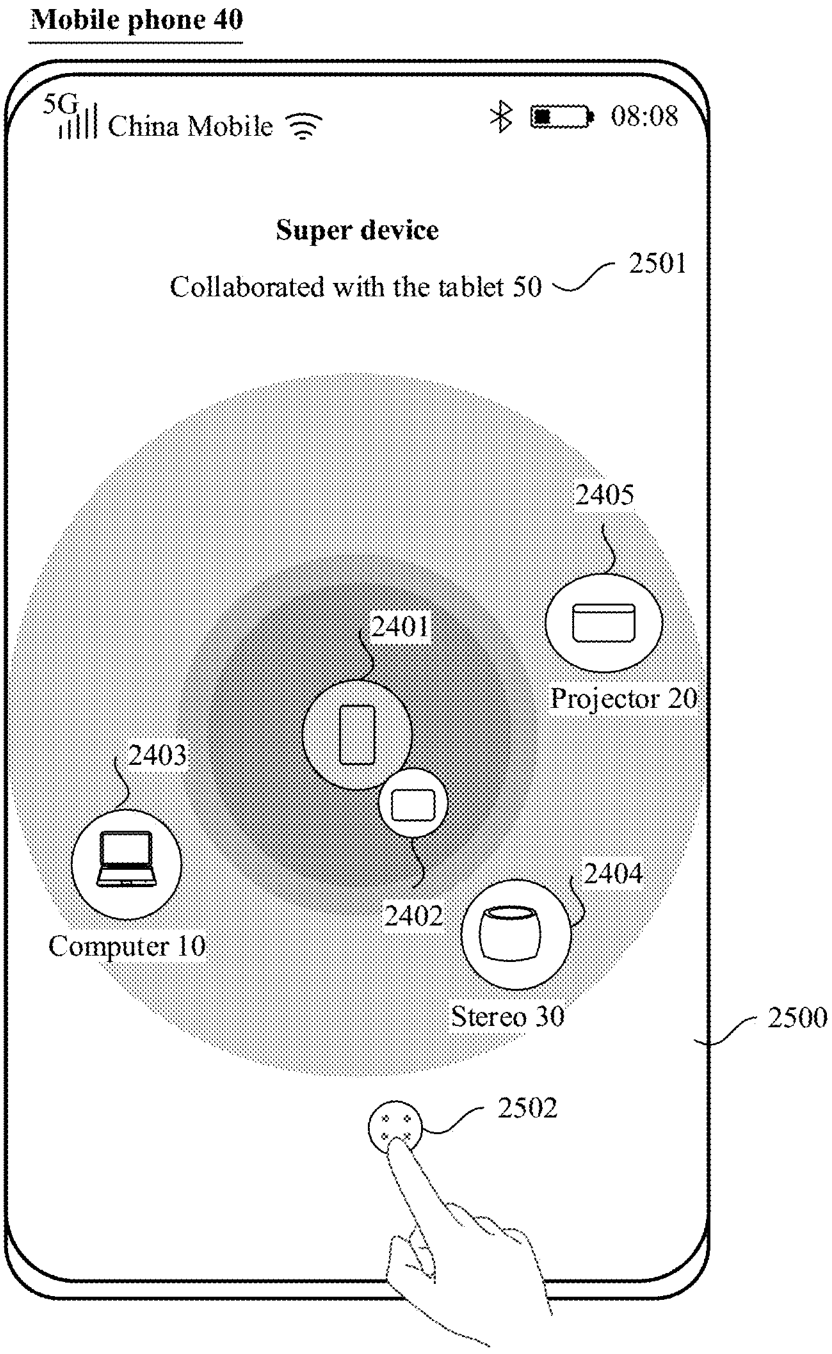

FIG. 25 shows an example of the user interface 2500 of the mobile phone 40. As shown in FIG. 25, that the icon 2402 of the tablet 50 is attached to the icon 2401 of the mobile phone 40 is displayed on the user interface 2500. The user interface 2500 may include prompt information 2501 and a control 2502. The prompt information 2501 may prompt that the mobile phone 40 and the tablet 50 are collaborated. The user may tap the control 2502, and in response to the user operation, the mobile phone 40 may display a user interface 2600A.

Figure 26A:
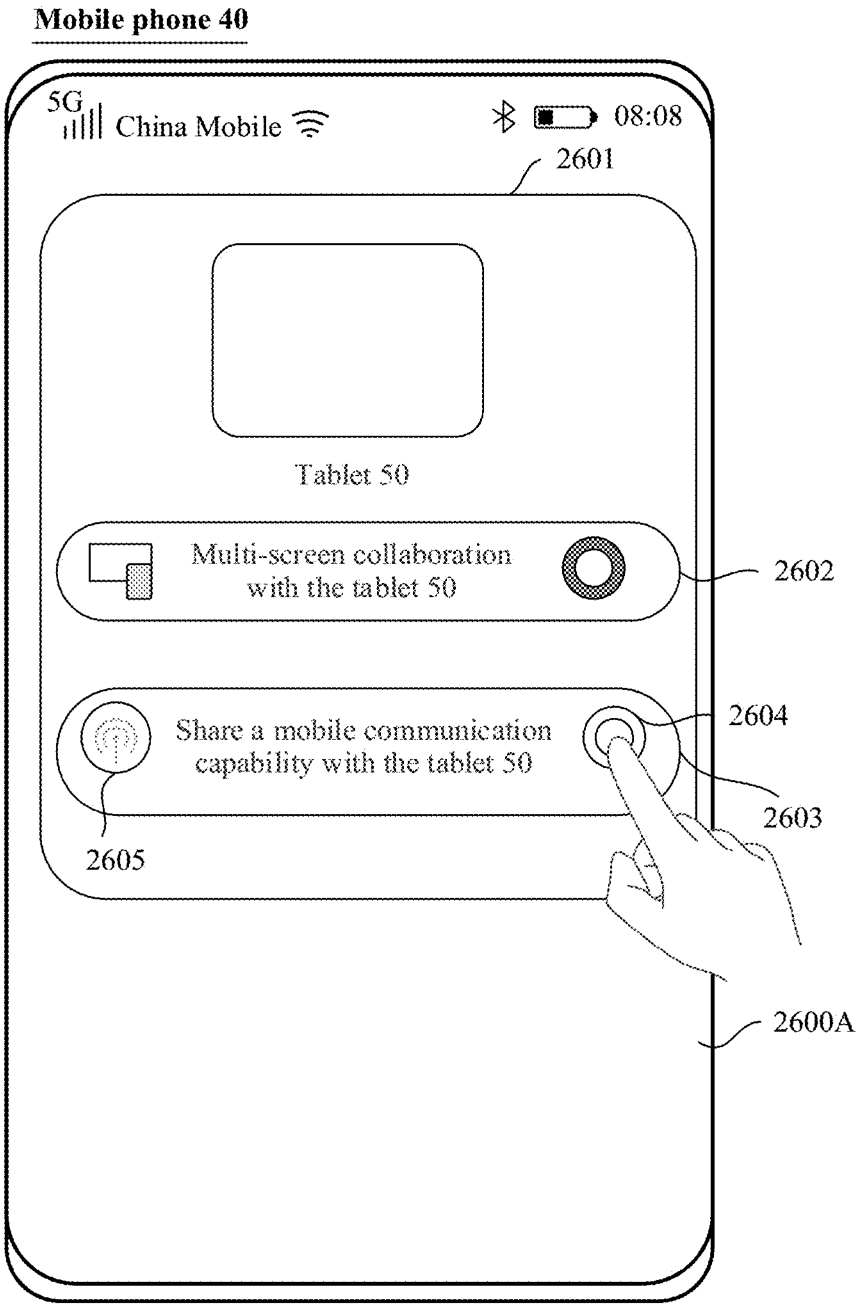
FIG. 26A is a schematic diagram of a user interface of a mobile phone 40 according to an embodiment of this application.

FIG. 26A shows an example of the user interface 2600A of the mobile phone 40. As shown in FIG. 26A, the user interface 2600A may include an option box 2601, and an option bar 2602 and an option bar 2603 may be displayed in the option box 2601. The option bar 2602 may be used to select the mobile phone 40 to perform multi-screen collaboration with the tablet 50. The option bar 2603 may be used to select whether the mobile phone 40 shares the mobile communication capability with the tablet 50. A control 2604 and a mobile communication sharing icon 2605 may be displayed in the option bar 2603. The user may select, by using the control 2604, the mobile phone 40 to share the mobile communication capability with the tablet 50. The user may tap the control 2604, and in response to the user operation, the mobile phone 40 may display a user interface 2600B.

Figure 26B:
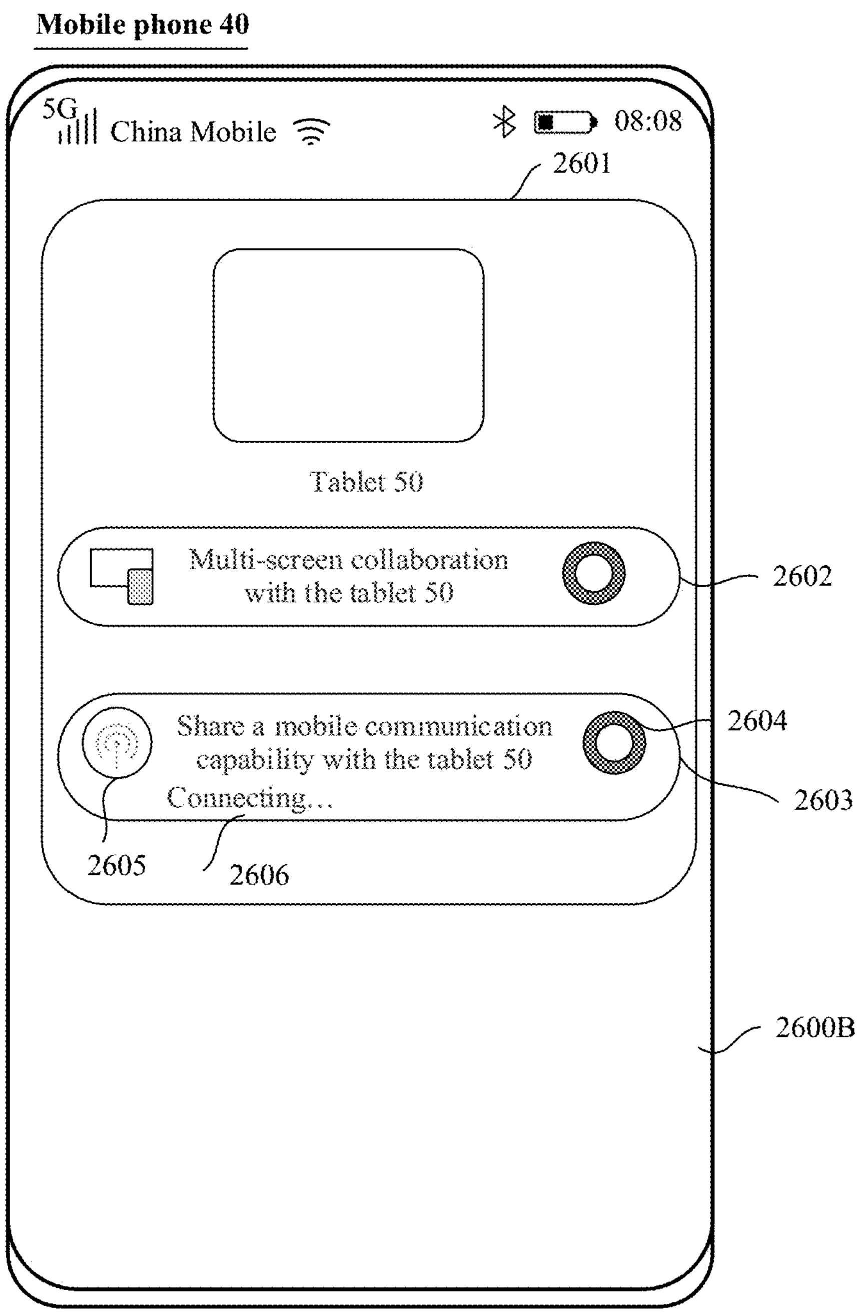
FIG. 26B is a schematic diagram of a user interface of a mobile phone 40 according to an embodiment of this application.

FIG. 26B shows an example of the user interface 2600B of the mobile phone 40. As shown in FIG. 26B, the user interface 2600B may include prompt information 2606. The prompt information 2606 may prompt the user that the mobile phone 40 establishes a connection to the tablet 50.

In a feasible example, when the mobile phone 40 successfully establishes the connection to the tablet 50, the mobile phone 40 may display a user interface 2700.

Figure 27:
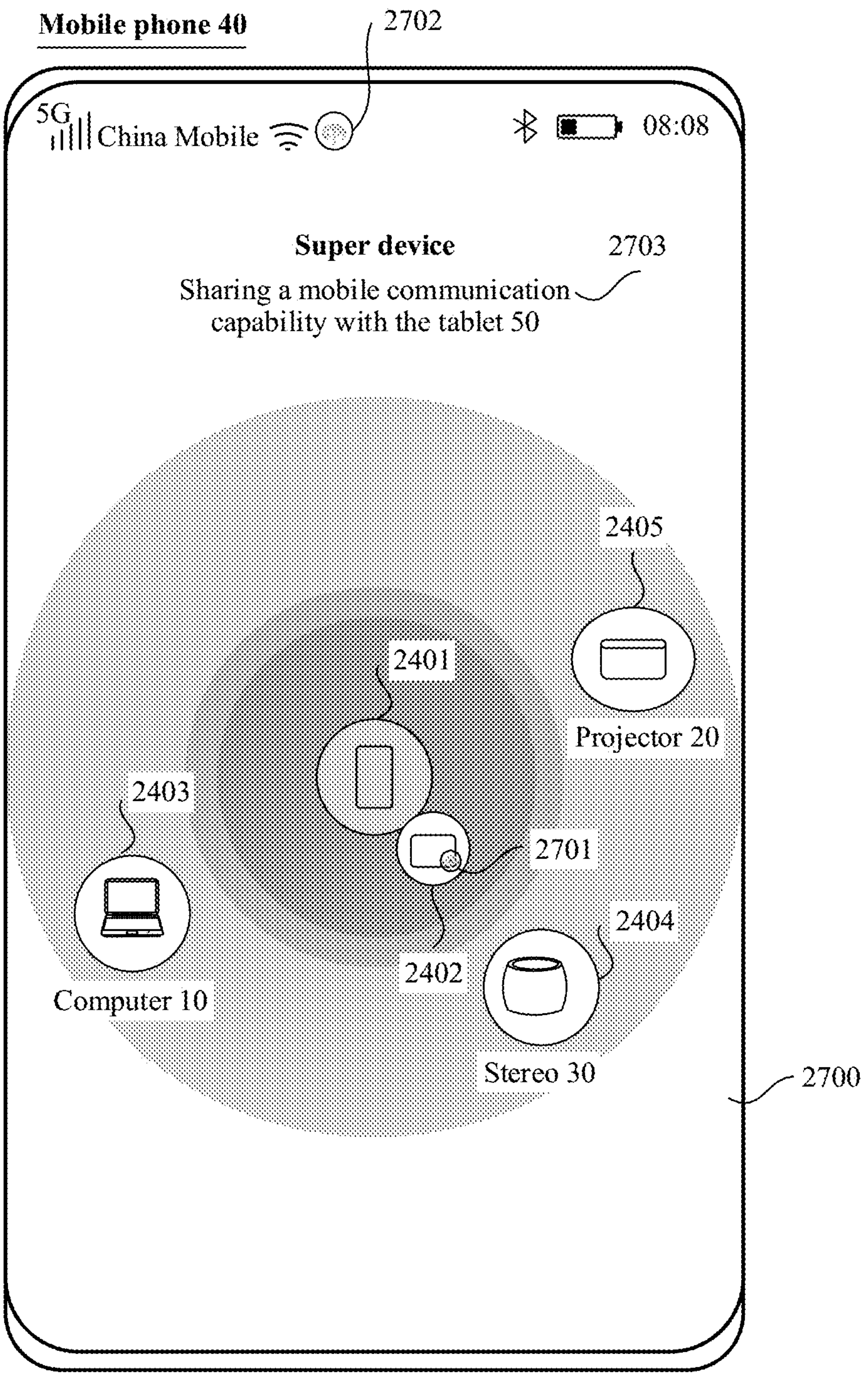
FIG. 27 to FIG. 37 are schematic diagrams of a group of user interfaces of a mobile phone 40 according to an embodiment of this application.

FIG. 27 shows an example of the user interface 2700 of the mobile phone 40. As shown in FIG. 27, the user interface 2700 may include an icon 2701, an icon 2702, and prompt information 2703. The icon 2701 may be located in the icon 2402, and the icon 2701 may indicate that the mobile phone 40 shares the mobile communication capability with the tablet 50. The icon 2702 may be located in the status bar, and may indicate that the mobile phone 40 shares the mobile communication capability. The prompt information 2703 may prompt the user that the mobile phone 40 shares the mobile communication capability with the tablet 50.

Optionally, a shape of the icon 2701 may be the same as a shape of the icon 2702, and a size of the icon 2701 may be different from or the same as a size of the icon 2702. This is not limited in embodiments of this application.

Further, in some feasible examples, the shape of the icon 2701 and the shape of the icon 2702 may be the same as a shape of the mobile communication sharing icon 905 and a shape of the mobile communication sharing icon 2605.

Optionally, in another feasible example, after the user taps the control 2604, when the mobile phone 40 fails to establish the connection to the tablet 50, that is, the mobile phone 40 fails to share the communication capability with the tablet 50, the mobile phone 40 may display a user interface 2800.

Figure 28:
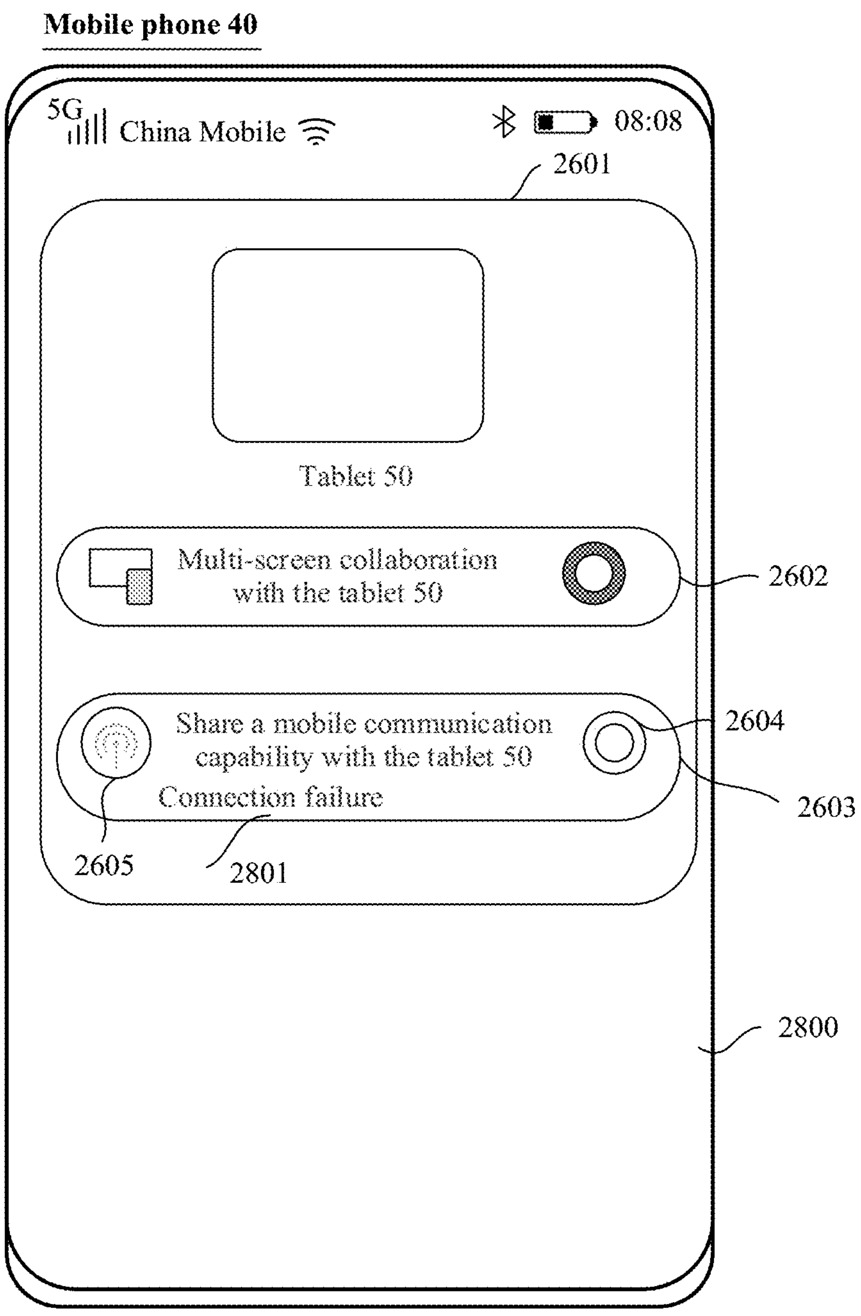

FIG. 28 shows an example of the user interface 2800 of the mobile phone 40. As shown in FIG. 28, the user interface 2800 may include an option box 2601, and prompt information 2801 may be displayed in the option box 2601. The prompt information 2801 may prompt the user that the mobile phone 40 fails to share the mobile communication capability with the tablet 50. For example, content of the prompt information 2801 may be specifically "unable to connect". It may be understood that the content of the prompt information 2801 is not limited in embodiments of this application. For specific descriptions of the option box 2801, refer to the descriptions of FIG. 26A. Details are not described herein again.

Manner 2: As shown in FIG. 29 to FIG. 34, the user enables the mobile phone 40 to share the mobile communication capability with the tablet 50 by using the setting interface of the mobile phone 40.

Figure 29:
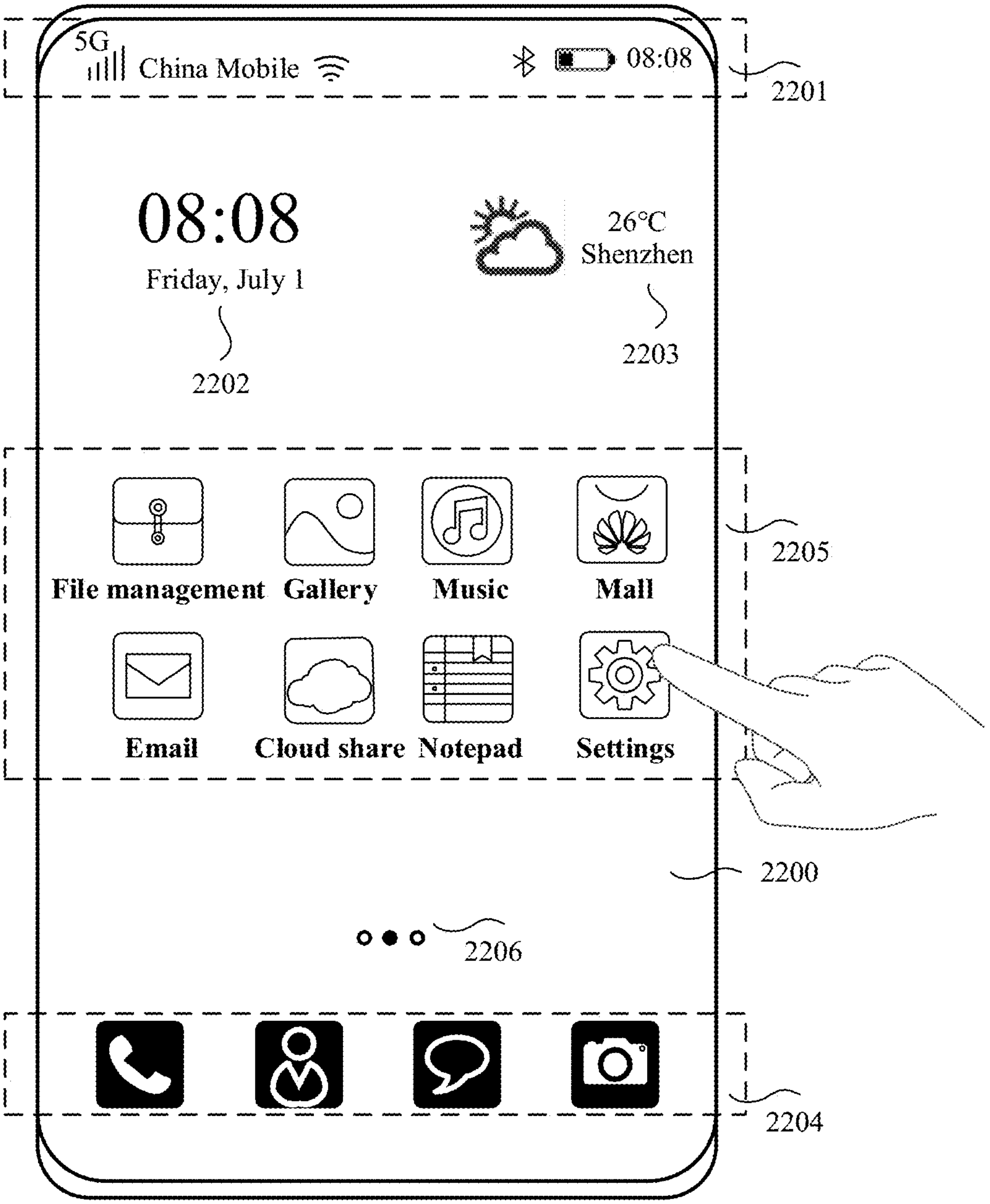

FIG. 29 shows an example of a user interface 2200 of the mobile phone 40. For the user interface 2200, refer to the descriptions in FIG. 22. Details are not described herein again. As shown in FIG. 29, the user may tap an icon of a setting application on the user interface 2200, and in response to the user operation, the mobile phone 40 may display a user interface 3000.

Figure 30:
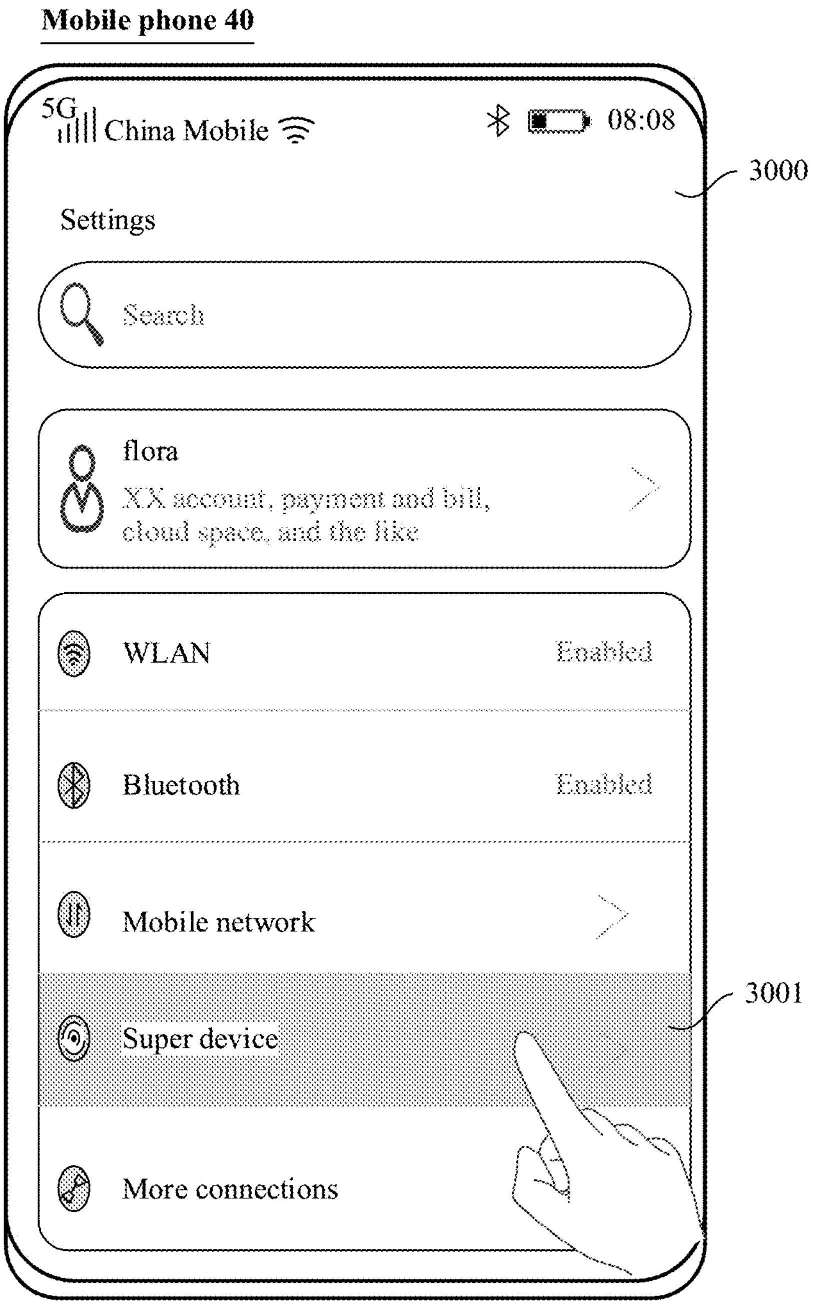

FIG. 30 shows an example of the user interface 3000 of the mobile phone 40. The user interface 3000 may be the setting interface of the mobile phone 40. The user interface 3000 may include a setting bar used to set a WLAN, Bluetooth, a mobile network, a super device, and the like. The user may tap a setting bar 3001 used to set the super device, and in response to the user operation, the mobile phone 40 may display a user interface 3100.

It may be understood that the user may tap the icon of the setting application, so that the mobile phone 40 enters the setting interface; and the user may alternatively tap another control (for example, the control 2305 shown in FIG. 23) or icon that is on the mobile phone 40 and that is used to enter the setting interface. The mobile phone 40 may display the setting interface, for example, the user interface 3000 shown in FIG. 30, in response to the user operation.

Figure 31:
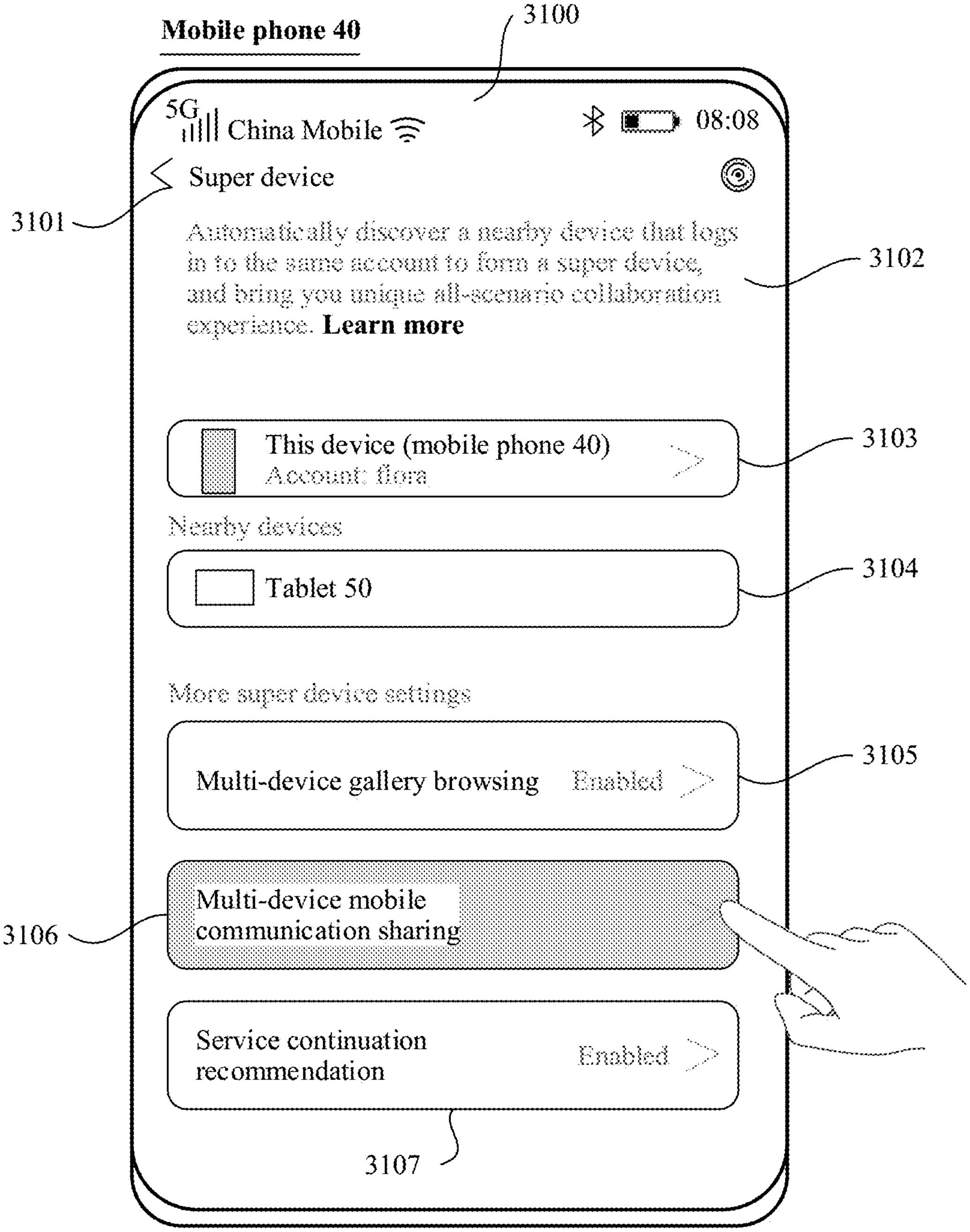

FIG. 31 shows an example of the user interface 3100 of the mobile phone 40. As shown in FIG. 31, the user interface 3100 may include a control 3101 and a plurality of setting items, such as a setting item 3103, a setting item 3104, a setting item 3105, a setting item 3106, and a setting item 3107. The control 3101 may be used to return to a previous-level page. The setting item 3103 may be used to display related information of the local device, namely, the mobile phone 40. The setting item 3104 is used to display related information of a device that is near the mobile phone 40 and that can establish a collaborative connection, for example, the tablet 50. The setting item 3105 may be used to enable or disable a multi-device gallery browsing function. The setting item 3106 may be used to set multi-device mobile communication sharing. The setting item 3107 may be used to enable or disable a service continuation recommendation function.

Optionally, the user interface 3100 may further include prompt information 3102. The prompt information 3102 may prompt the user that the mobile phone 40 may form a super device with a nearby device.

Specifically, for the user interface 3100, refer to the descriptions of the user interface 1400. Details are not described herein again.

As shown in FIG. 31, the user may tap the setting item 3106, and in response to the user operation, the mobile phone 40 may display a user interface 3200.

Figure 32:
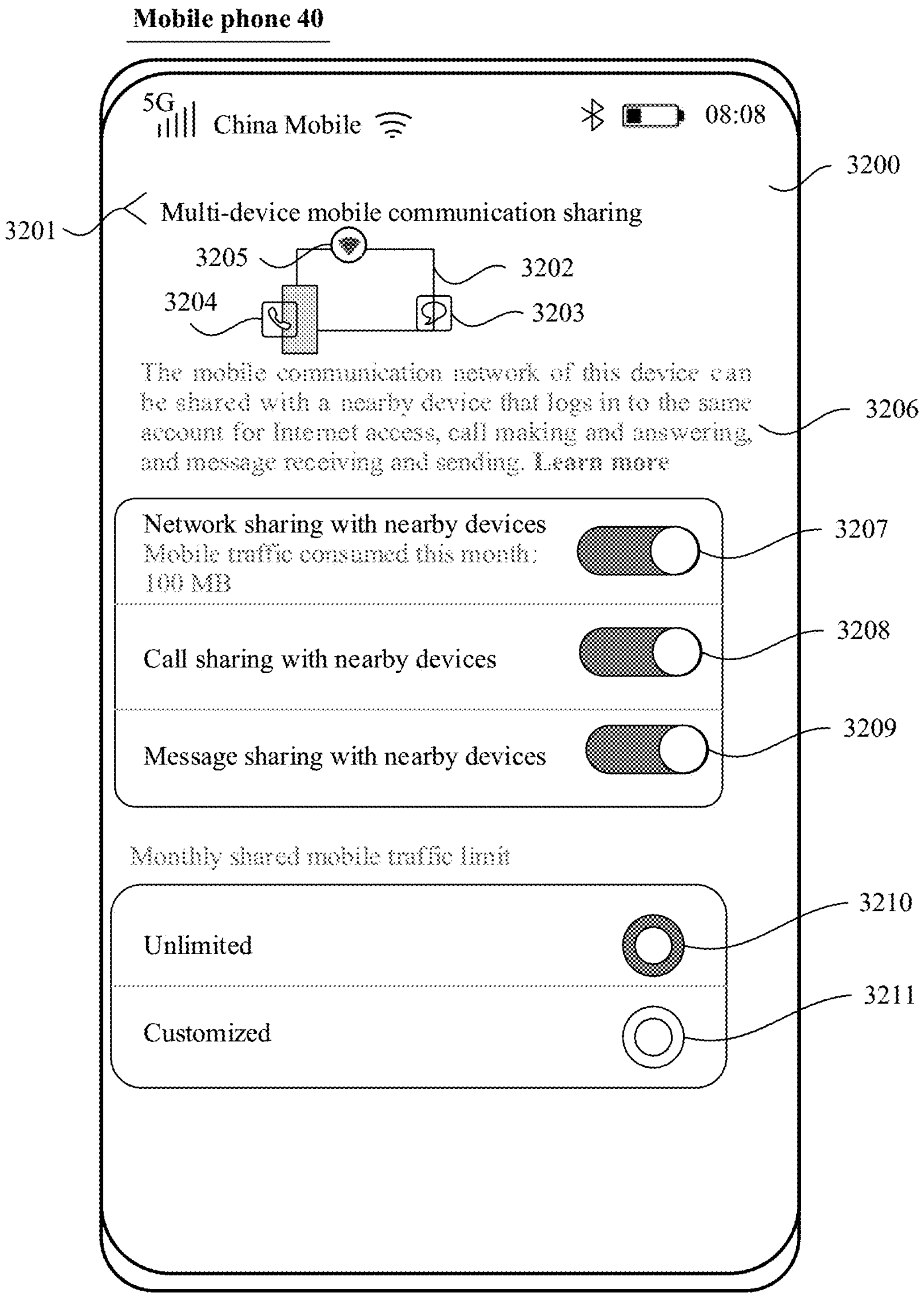

FIG. 32 shows an example of the user interface 3200 of the mobile phone 40. As shown in FIG. 32, the user interface 3200 may include a control 3201, an icon 3202, an icon 3203, an icon 3204, an icon 3205, prompt information 3206, an option bar 3207, an option bar 3208, an option bar 3209, an option bar 3210, and an option bar 3211. The icon 3202 may be used to show that the mobile phone 40 and the tablet 50 perform mobile communication sharing. The icon 3203 may be used to show that the mobile phone 40 can share an SMS message communication capability with the tablet 50. The icon 3204 may be used to show that the mobile phone 40 can share a phone communication capability with the tablet 50. The icon 3205 may be used to show that the mobile phone 40 can share a cellular network communication capability with the tablet 50. The prompt information 3206 may prompt the user that a mobile communication network of the mobile phone 40 may be shared with another device that logs in to a same account as the mobile phone 40, to access the Internet, make and answer calls, receive and send messages, and the like. Prompt content specifically included in the prompt information 3206 is not limited in embodiments of this application.

As shown in FIG. 32, the option bar 3207 is used to select the mobile phone 40 to share a network with a nearby device that establishes a collaborative connection, for example, the tablet 50. Optionally, the option bar 3207 may further display mobile traffic, for example, 100 MB, that is of the mobile phone 40 and that is consumed by the nearby device in a current month. The option bar 3208 may be used to select the mobile phone 40 to share the phone communication capability with a nearby device that establishes a collaborative connection, for example, the tablet 50. The option bar 3209 may be used to select the mobile phone 40 to share the SMS message communication capability with a nearby device that establishes a collaborative connection, for example, the tablet 50.

Optionally, the user may further set, on the mobile phone 40, mobile traffic that can be shared by the mobile phone 40 each month. As shown in FIG. 32, the option bar 3210 is used to set the mobile traffic that can be shared by the mobile phone 40 each month to be unlimited. The option bar 3211 may be used to customize the mobile traffic that can be shared by the mobile phone 40 each month.

After the user completes a setting on the user interface 3200, the mobile phone 40 may display a notification box, where the notification box may be used to prompt that the mobile phone 40 shares the mobile communication capability. For details, refer to a user interface 3300 shown in FIG. 33.

Figure 33:
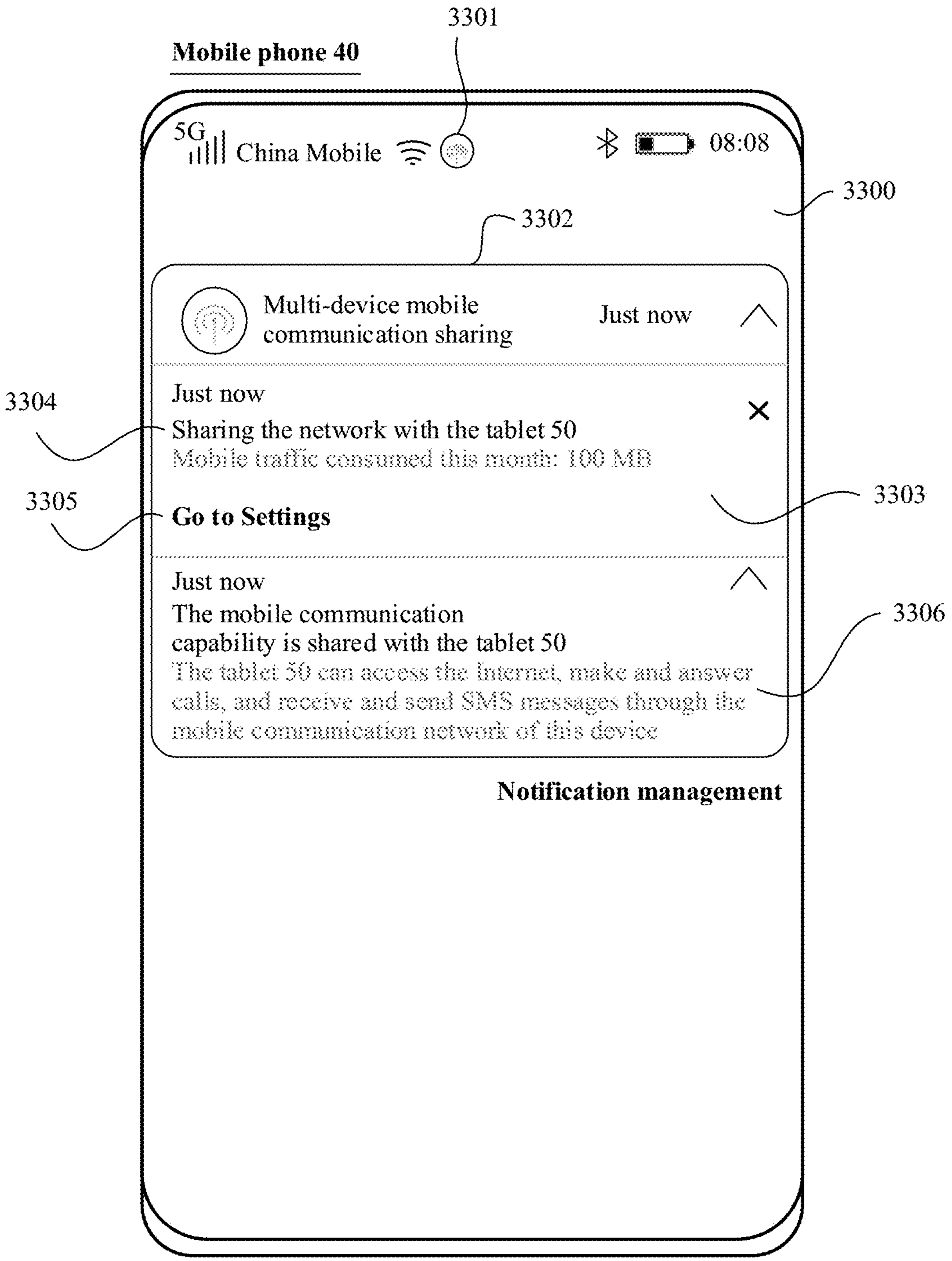

FIG. 33 shows an example of the user interface 3300 of the mobile phone 40. As shown in FIG. 33, the user interface 3300 may include an icon 3301 and a notification box 3302. The icon 3301 may be located in the status bar of the mobile phone 40, and the icon 3301 may indicate that the mobile phone 40 shares the mobile communication capability.

As shown in FIG. 33, the notification box 3302 may include a notification bar 3303 and a notification bar 3306. The notification bar 3303 may include prompt information 3304 and a control 3305. The prompt information 3304 may prompt the user that the mobile phone 40 shares the network with the tablet 50. Optionally, the prompt information 3304 may further prompt that the tablet 50 consumes 100 MB mobile traffic shared by the mobile phone 40 in the current month. The user may tap the control 3305 to set mobile traffic that can be shared by the mobile phone 40 with the tablet 50. The notification bar 3306 may be used to prompt the user that the mobile phone 40 shares the mobile communication capability with the tablet 50 at a time point TO (for example, "just now" shown in FIG. 33), and the tablet 50 may use the mobile communication network of the mobile phone 40 to access the Internet, make and answer calls, and receive and send SMS messages.

In a feasible example, the user may customize, on the user interface 3200 shown in FIG. 32, the mobile traffic that can be shared by the mobile phone 40 with the tablet 50 each month. After the user performs setting, the mobile phone 40 may display the mobile traffic set by the user. For details, refer to a user interface 3400 of the mobile phone 40.

Figure 34:
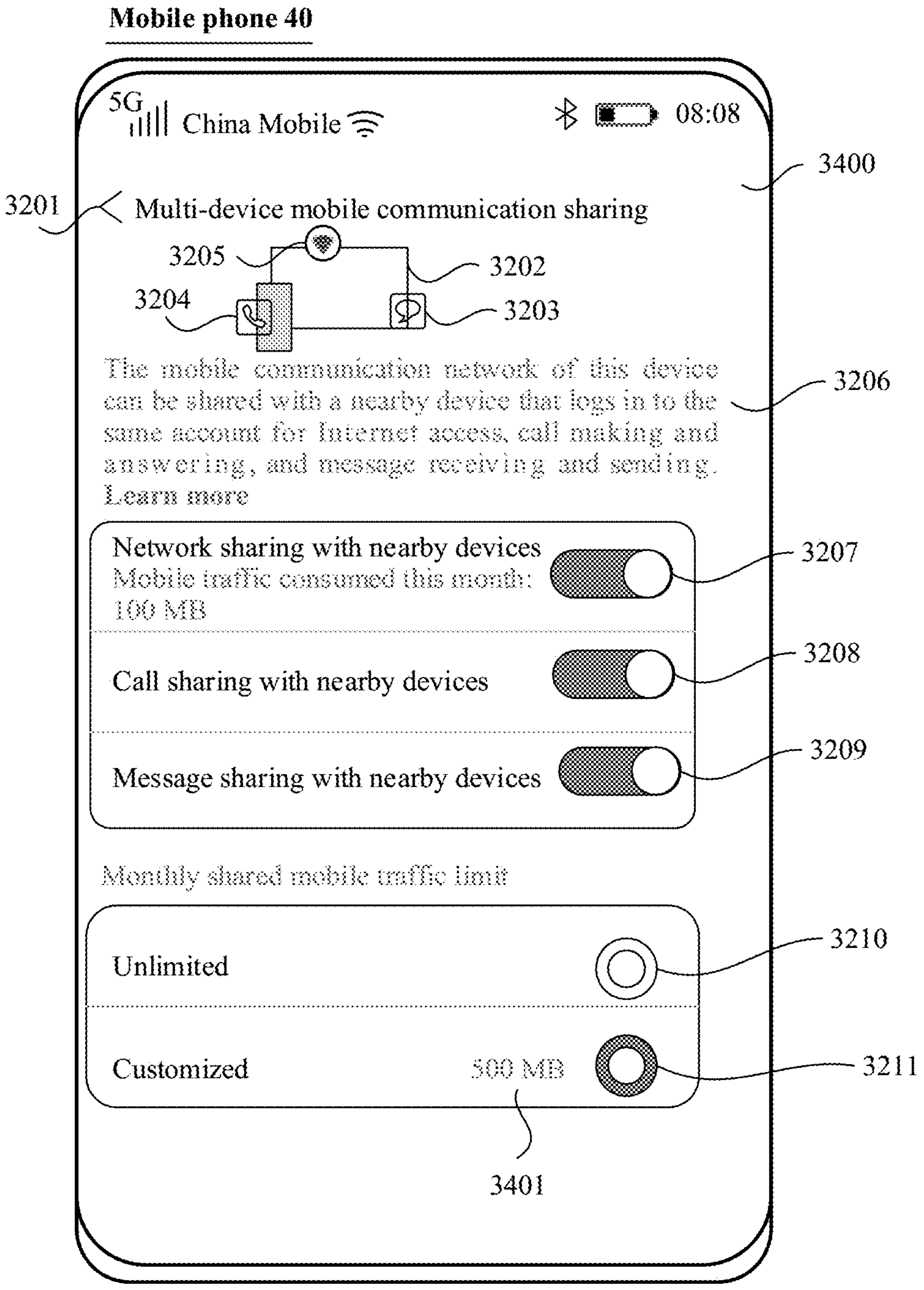

FIG. 34 shows an example of the user interface 3400 of the mobile phone 40. As shown in FIG. 34, prompt information 3401 may be displayed on the user interface 3400, and the prompt information 3401 is used to display the mobile traffic that is customized by the user and that can be shared by the mobile phone 40 with the tablet 50 each month, for example, 500 MB.

Further, when the mobile traffic shared by the mobile phone 40 with the tablet 50 reaches the mobile traffic that is customized by the user and that can be shared by the mobile phone 40 with the tablet 50 each month, the mobile phone 40 may stop sharing the cellular network with the tablet 50. For details, refer to a user interface 3500 of the mobile phone 40.

Figure 35:
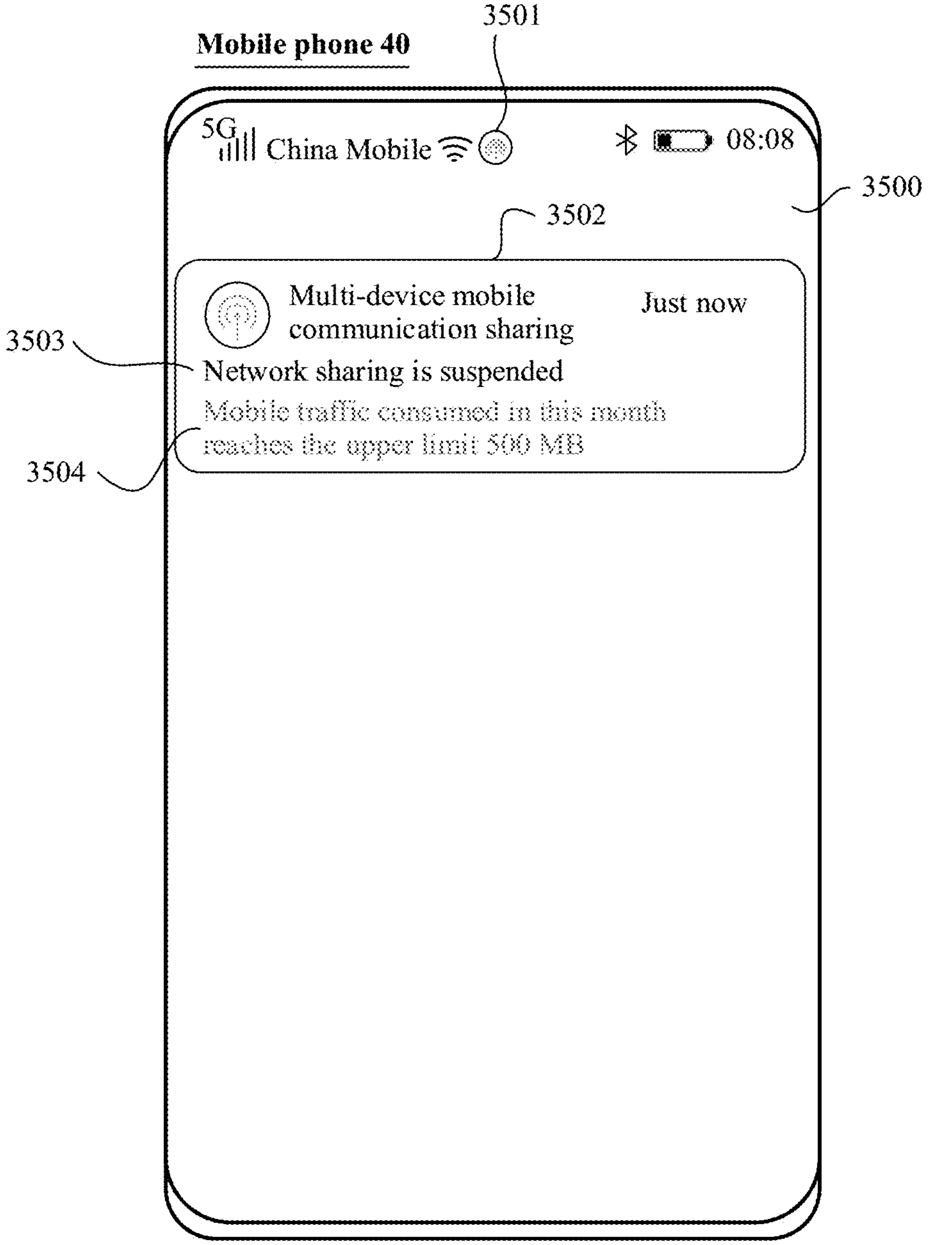

FIG. 35 shows an example of the user interface 3500 of the mobile phone 40. As shown in FIG. 35, the user interface 3500 may include a control 3501 and a notification box 3502. The control 3501 may indicate that the mobile phone 40 shares the mobile communication capability. The notification box 3502 may include prompt information 3503 and prompt information 3504. The prompt information 3503 may prompt the user that the mobile phone 40 stops sharing the cellular network with the tablet 50. The prompt information 3504 may prompt the user that the mobile traffic that is shared by the mobile phone 40 and consumed by the tablet 50 in the current month reaches the upper limit 500 MB.

It may be understood that when the mobile phone 40 stops sharing the cellular network with the tablet 50, the mobile phone 40 may still continue to share other mobile communication capabilities, for example, the phone communication capability and the SMS message communication capability, with the tablet 50. In other words, the tablet 50 may still make and answer calls and receive and send SMS messages through the mobile communication network of the mobile phone 40.

Optionally, in some feasible examples, after the user completes a setting on the user interface 3200, the mobile phone 40 may display, in a super device card of the mobile phone 40, that the mobile phone 40 shares the mobile communication capability with the tablet 50. For details, refer to a user interface 3600 of the mobile phone 40.

Figure 36:
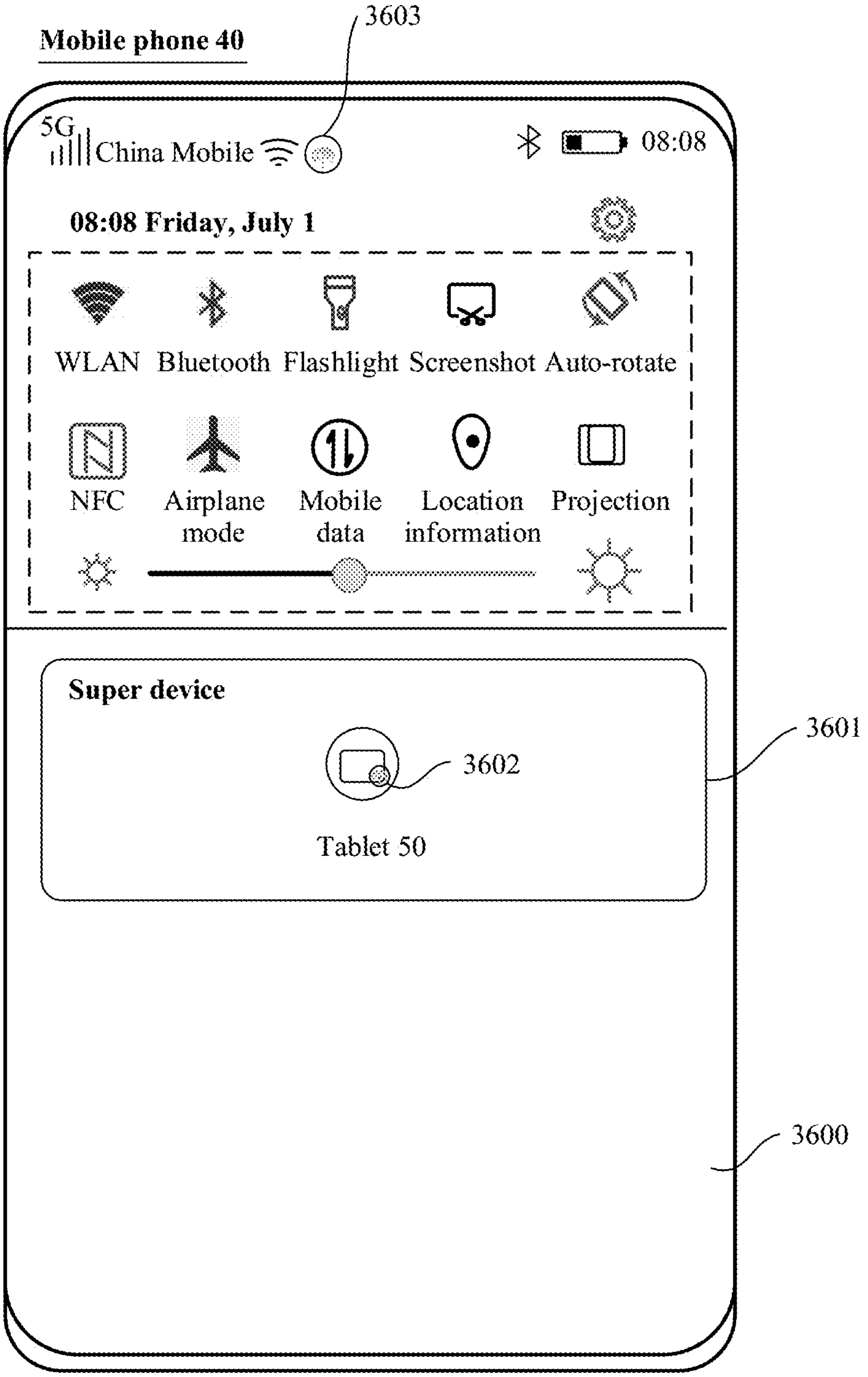

FIG. 36 shows an example of the user interface 3600 of the mobile phone 40. As shown in FIG. 36, the user interface 3600 may include a super device card 3601 and a control 3603. The super device card 3601 may include an icon 3602, and the icon 3602 may include the icon of the tablet 50 and an icon that indicates that the mobile communication capability is shared. The icon 3602 may be used to prompt the user that the mobile phone 40 shares the mobile communication capability with the tablet 50. The icon 3602 may be located in the status bar, and may indicate that the mobile phone 40 shares the mobile communication capability.

It may be understood that, after the user performs a setting on the mobile phone 40 or the tablet 50 to enable the mobile phone 40 to share the mobile communication capability with the tablet 50, a related icon or related prompt information indicating that the mobile phone 40 share the mobile communication capability with the tablet 50 is displayed on both the user interfaces of the mobile phone 40 and the tablet 50. For details, refer to the user interface 1000 of the tablet 50 shown in FIG. 10, the user interface 1600 of the tablet 50 shown in FIG. 16, the user interface 2700 of the mobile phone 40 shown in FIG. 27, and the user interface 3600 of the mobile phone 40 shown in FIG. 36. Details are not described herein again.

Similarly, after the mobile phone 40 and the tablet 50 change from a mobile communication capability sharing state to a stopped or disconnected mobile communication capability sharing state, icons that are previously displayed on the mobile phone 40 and the tablet 50 and that indicate that the mobile phone 40 and the tablet 50 perform mobile communication capability sharing are no longer displayed.

Optionally, in some feasible examples, when the mobile phone 40 is switched from the cellular network to a Wi-Fi network, the cellular network shared by the mobile phone 40 with the tablet 50 is disconnected. In other words, the mobile phone 40 may suspend sharing the cellular network with the tablet 50. The mobile phone 40 may display prompt information to prompt the user that sharing of the cellular network with the tablet 50 is suspended. For details, refer to a user interface 3700 of the mobile phone 40.

Figure 37:
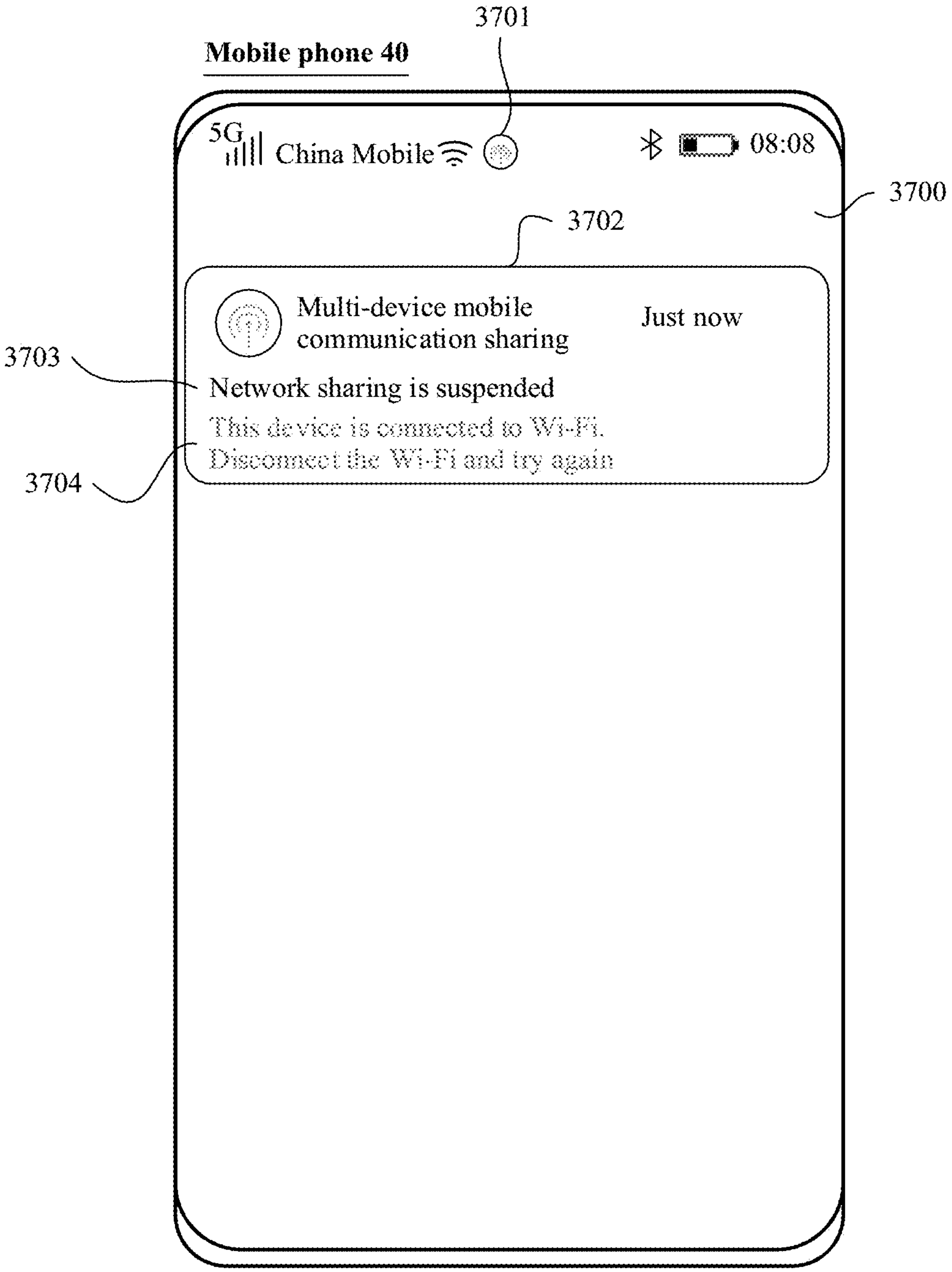

FIG. 37 shows an example of the user interface 3700 of the mobile phone 40. As shown in FIG. 37, the user interface 3700 may include a control 3701 and a notification box 3702. The control 3701 may indicate that the mobile phone 40 shares the mobile communication capability. The notification box 3702 may include prompt information 3703 and prompt information 3704. The prompt information 3703 may prompt the user that sharing of the cellular network with the tablet 50 is suspended by the mobile phone 40. The prompt information 3704 may prompt the user that the mobile phone 40 is connected to Wi-Fi. If the user wants to continue to share the cellular network with the tablet 50, the user may first disconnect the Wi-Fi connected to the mobile phone 40.

Optionally, in some other examples, when the mobile phone 40 is switched from the cellular network to the Wi-Fi network, the mobile phone 40 may continue to share the cellular network with the tablet 50.

In some scenarios, when an in-vehicle infotainment has no network, the in-vehicle infotainment may automatically connect to a device that is currently connected to the in-vehicle infotainment through Bluetooth, and obtain a mobile communication capability shared by the device.

FIG. 38 to FIG. 43 are examples of schematic diagrams of related interfaces of obtaining a cellular network of a mobile phone by the in-vehicle infotainment.

Figure 38:
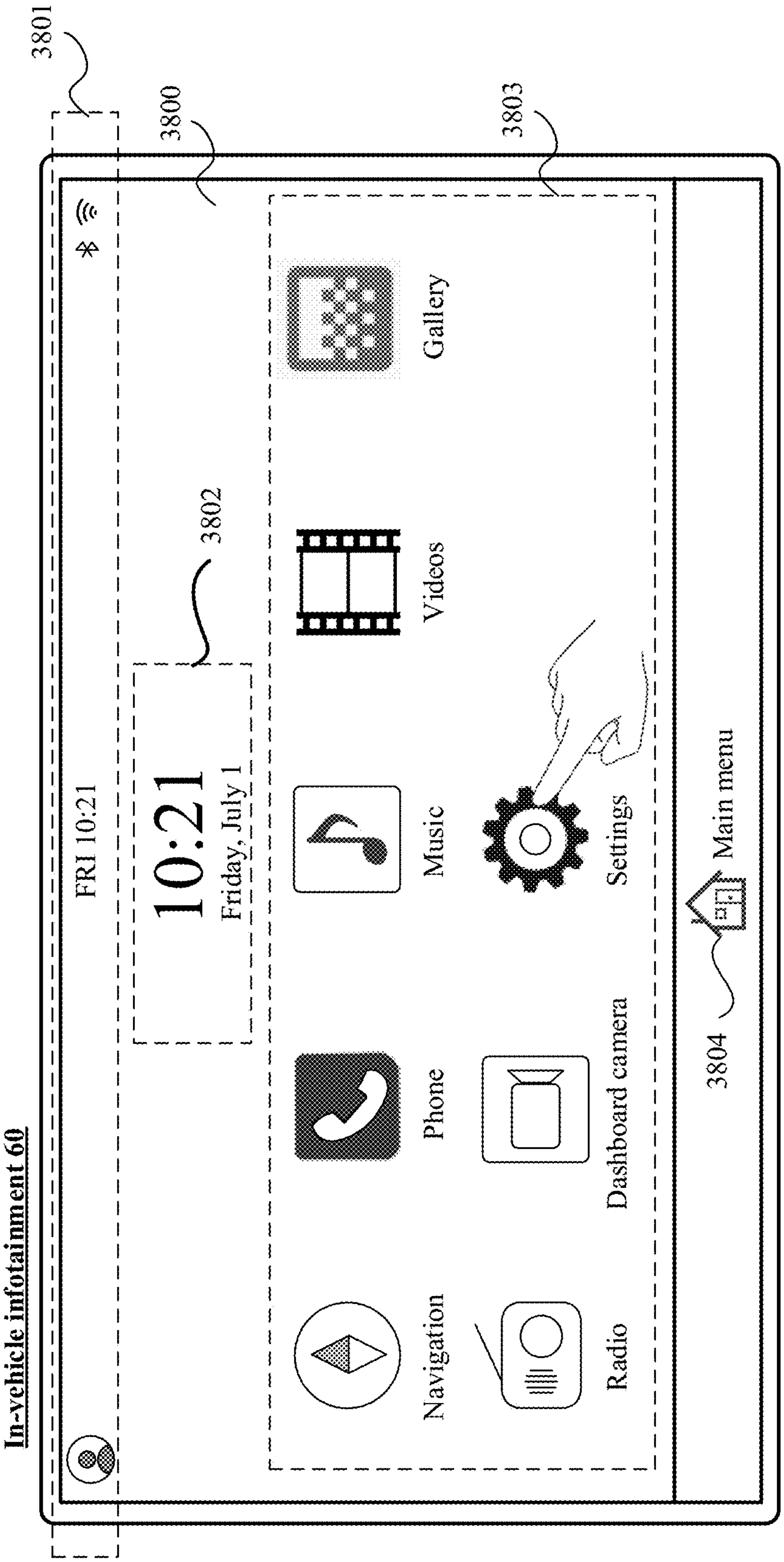
FIG. 38 to FIG. 43 are schematic diagrams of a group of user interfaces of an in-vehicle infotainment 60 according to an embodiment of this application.

FIG. 38 shows an example of a user interface 3800 of an in-vehicle infotainment 60. As shown in FIG. 38, the user interface 3800 may include a status bar 3801, a calendar indicator 3802, a plurality of application icons 3803, and a main menu control 3804. The status bar 3801 may include a Bluetooth indicator, one or more signal strength indicators of a Wi-Fi signal, a time indicator, a login account icon, and the like. The plurality of application icons 3803 may include an icon of a navigation application, an icon of a phone application, an icon of a music application, an icon of a video application, and the like. The main menu control 3804 is used to open a main menu.

As shown in FIG. 38, the user may tap an icon of a setting application, and in response to the user operation, the in-vehicle infotainment 60 may display a user interface 3900.

Figure 39:
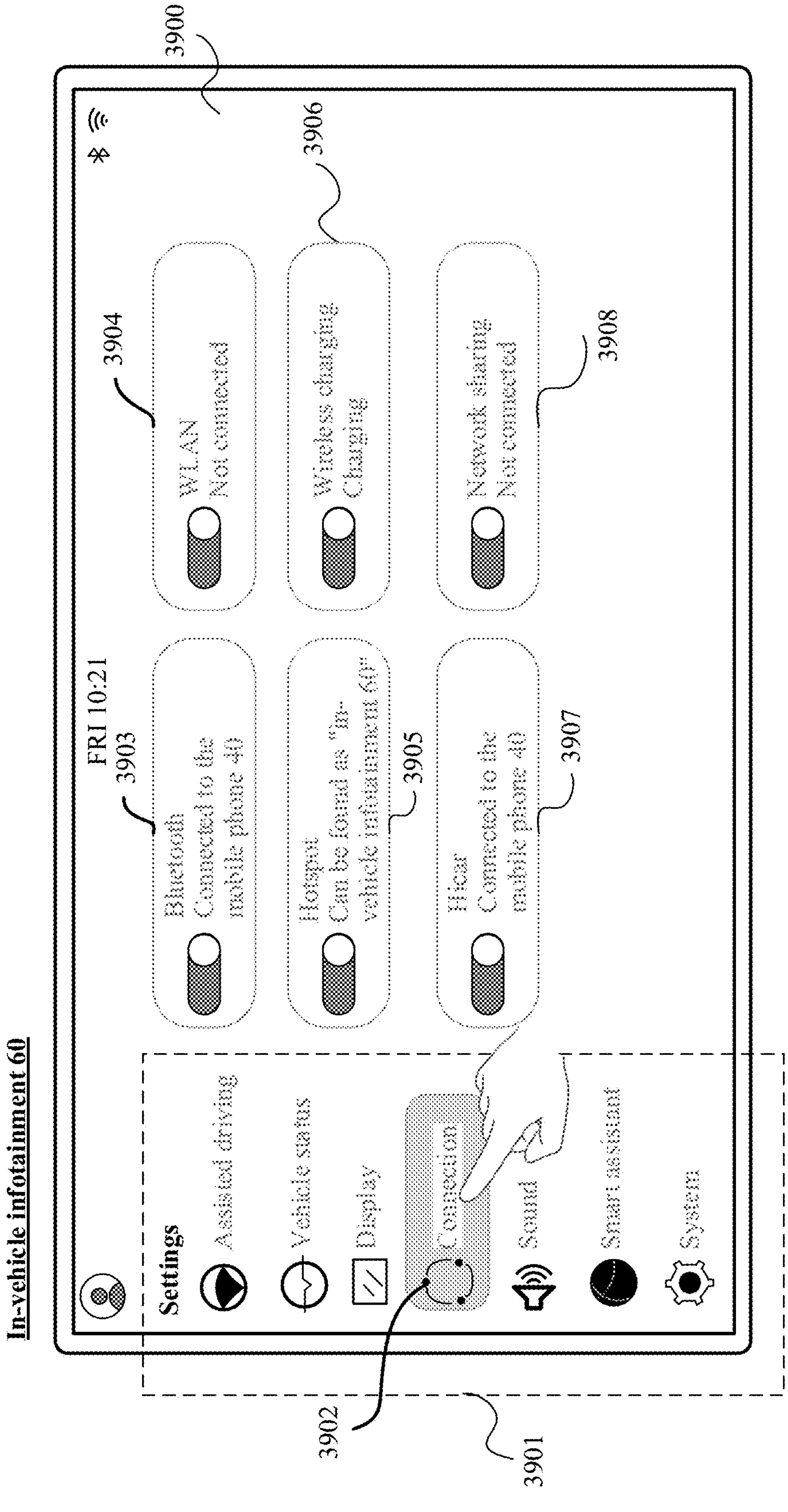

FIG. 39 shows an example of the user interface 3900 of the in-vehicle infotainment 60. As shown in FIG. 39, the user interface 3900 may include a setting menu bar 3901. When the user taps a setting item 3902 in the setting menu bar 3901, a setting item 3903, a setting item 3904, a setting item 3905, a setting item 3906, a setting item 3907, and a setting item 3908 may be displayed on the user interface 3900. The setting item 3903 may be used to set the in-vehicle infotainment 60 to connect to Bluetooth. As shown in FIG. 39, the in-vehicle infotainment 60 currently establishes a Bluetooth connection to the mobile phone 40. The setting item 3904 may be used to set the in-vehicle infotainment 60 to connect to a WLAN. As shown in FIG. 39, a WLAN function of the in-vehicle infotainment 60 is enabled, but the in-vehicle infotainment 60 is not connected to a WLAN provided by another device. The setting item 3905 may be used to set a hotspot of the in-vehicle infotainment 60. The setting item 3906 may be used to set the in-vehicle infotainment 60 to perform wireless charging. The setting item 3907 may be used to set the in-vehicle infotainment 60 to connect to the Hicar. The setting item 3908 may be used to set a network sharing function of the in-vehicle infotainment 60. As shown in FIG. 39, the network sharing function of the in-vehicle infotainment 60 is enabled, but the in-vehicle infotainment 60 does not perform network sharing with another device.

When there is no available network in the in-vehicle infotainment 60, and network sharing in the in-vehicle infotainment 60 is enabled, the in-vehicle infotainment 60 may automatically connect to a device that establishes a Bluetooth connection, and a cellular network of the device is shared. In addition, the in-vehicle infotainment 60 may display a notification box indicating that the cellular network is automatically connected and shared. For details, refer to a user interface 4000 of the in-vehicle infotainment 60.

Figure 40:
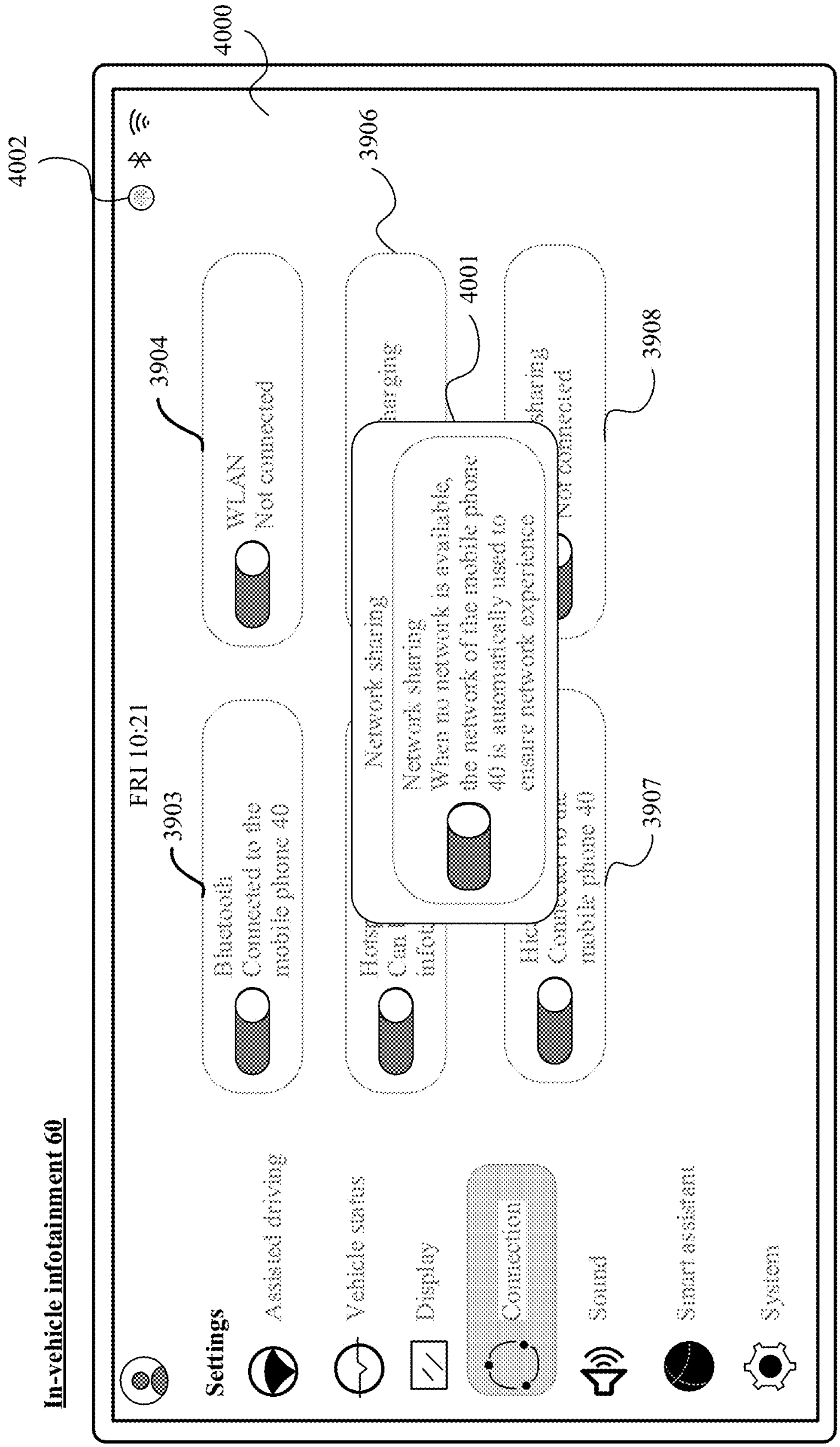

FIG. 40 shows an example of the user interface 4000 of the in-vehicle infotainment 60. As shown in FIG. 40, the user interface may include a notification box 4001 and an icon 4002. The notification box 4001 may be used to prompt the user that when there is no available network in the in-vehicle infotainment, the in-vehicle infotainment 60 may automatically use the network of the mobile phone 40. The icon 4002 may be located in a status bar of the in-vehicle infotainment 60, and indicates that the in-vehicle infotainment performs network sharing.

Optionally, in some feasible examples, the notification box 4001 may not be displayed after specific duration. After the in-vehicle infotainment no longer displays the notification box 4001, the in-vehicle infotainment 60 may display an icon indicating that the in-vehicle infotainment performs network sharing and other related prompt information. For details, refer to a user interface 4100 of the in-vehicle infotainment 60.

Figure 41:
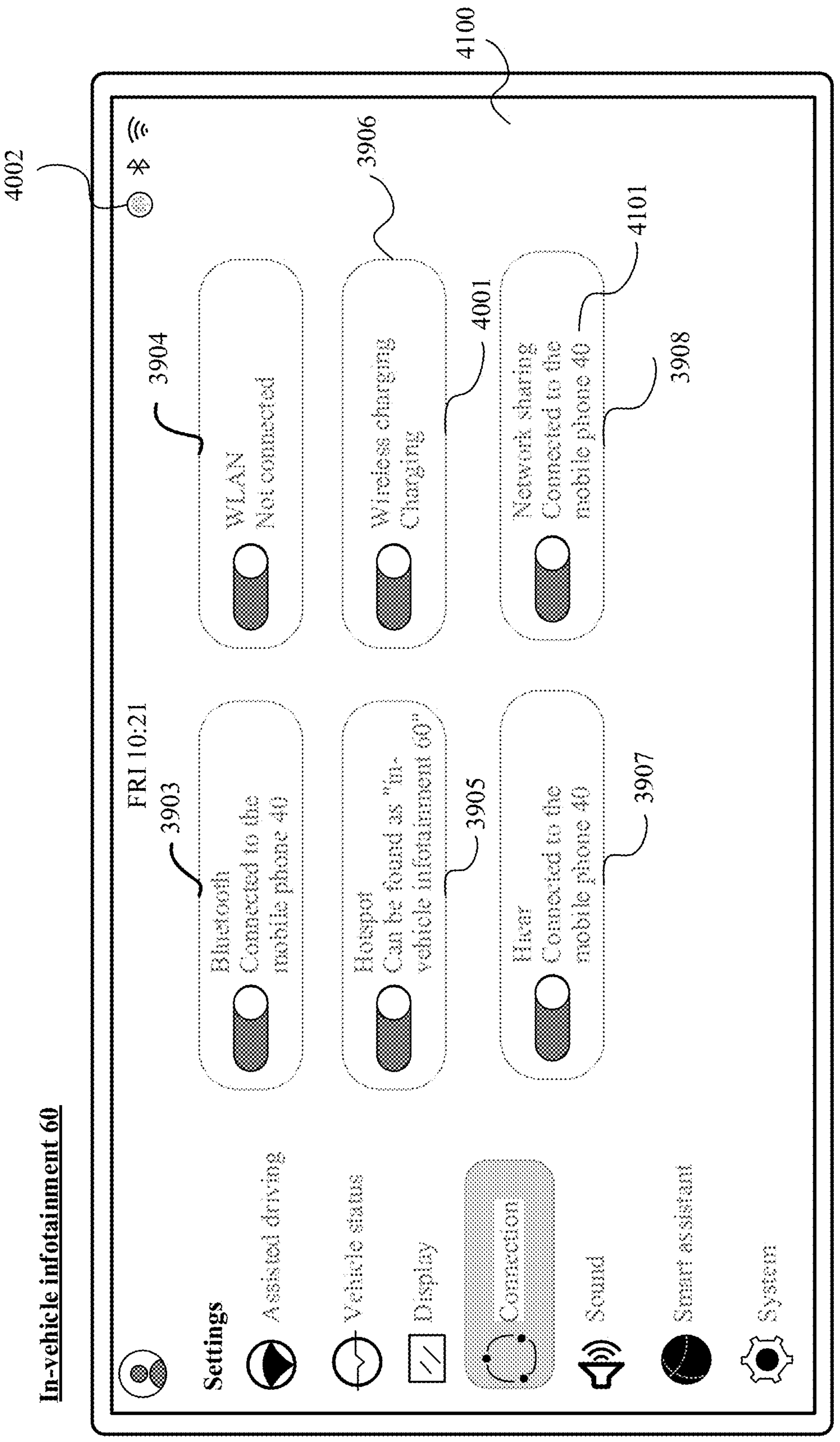

FIG. 41 shows an example of the user interface 4100 of the in-vehicle infotainment 60. As shown in FIG. 41, the user interface 4100 may include an icon 4002 and prompt information 4101. The icon 4002 may indicate that the in-vehicle infotainment 60 performs network sharing. The prompt information 4101 may prompt the user that the in-vehicle infotainment 60 is connected to the mobile phone 40, and the cellular network provided by the mobile phone 40 is shared.

Figure 42:
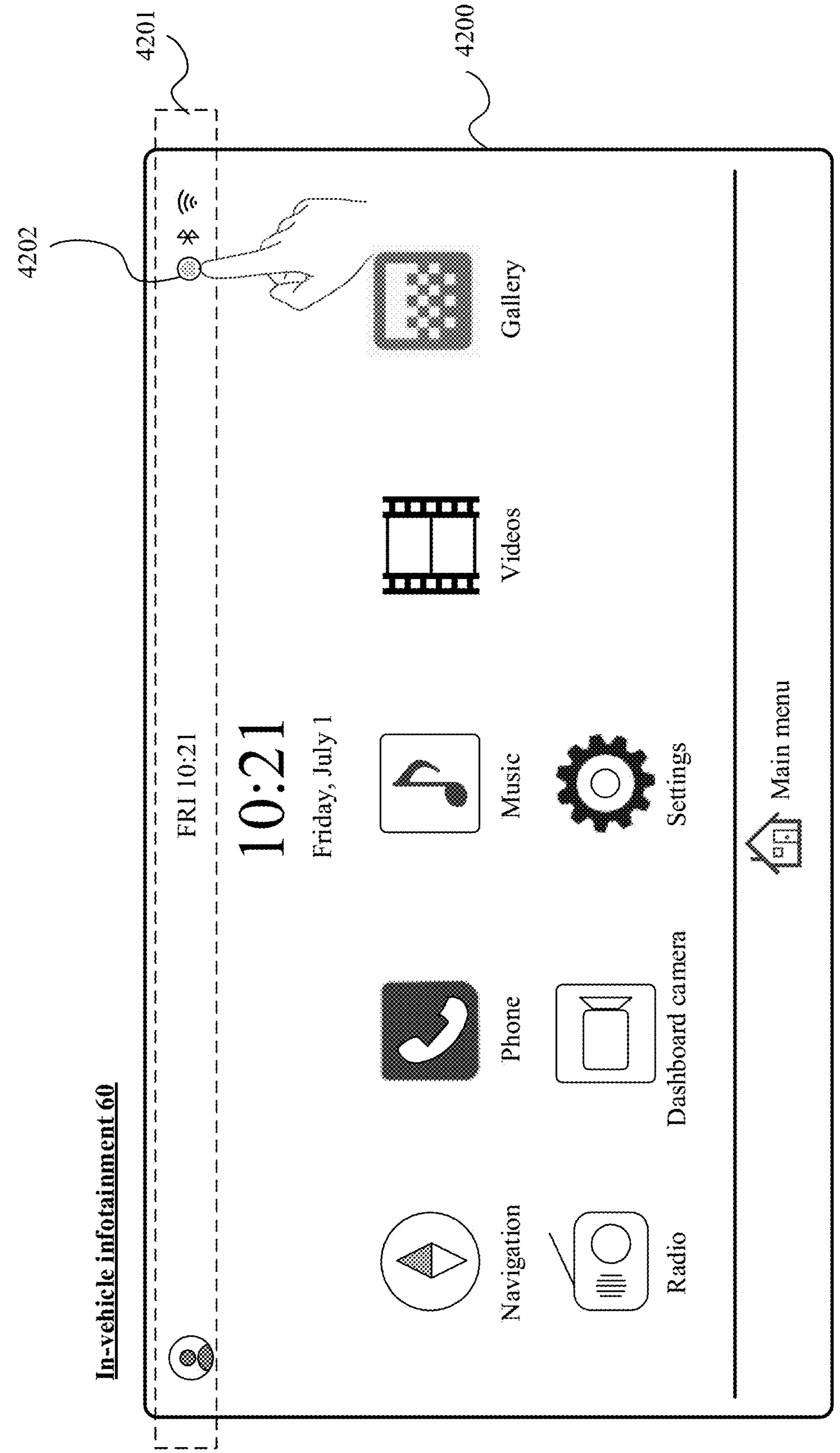

In a process in which the in-vehicle infotainment 60 performs network sharing, the in-vehicle infotainment 60 displays, in the status bar, the icon indicating that the in-vehicle infotainment 60 performs network sharing. As shown in FIG. 42, an icon 4202 is displayed in the status bar of the user interface 4200 shown in the in-vehicle infotainment 60, and the icon 4202 may indicate that the in-vehicle infotainment 60 performs network sharing.

In some feasible examples, the user may tap the icon 4202 to perform a setting related to network sharing. For example, as shown in FIG. 42, the user may tap the icon 4202, and in response to the user operation, the in-vehicle infotainment 60 may display a user interface 4300.

Figure 43:
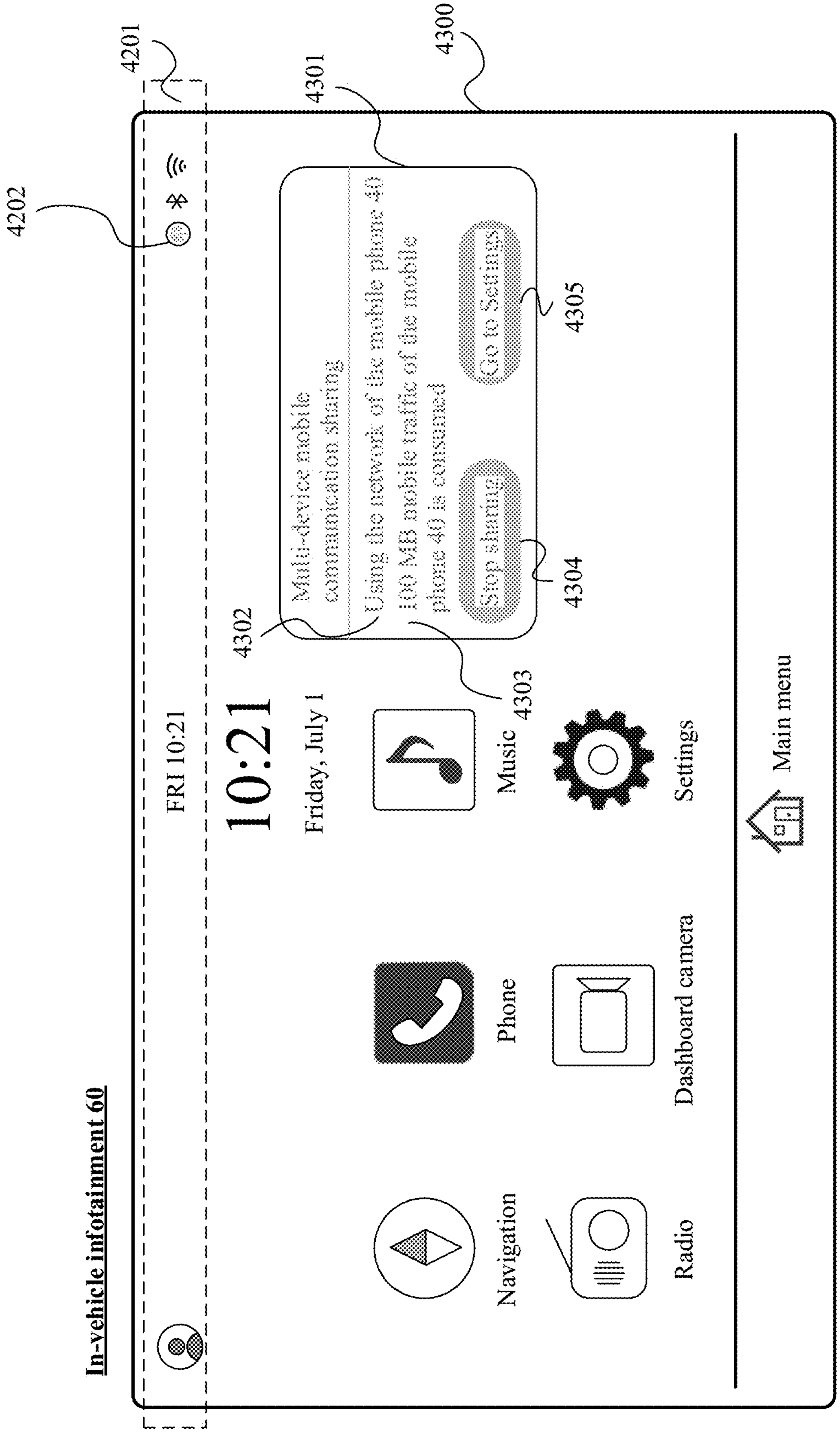

FIG. 43 shows an example of the user interface 4300 of the in-vehicle infotainment 60. As shown in FIG. 43, a setting box 4301 may be displayed on the user interface 4300. Prompt information 4302, prompt information 4303, a control 4304, and a control 4305 may be displayed in the setting box 4301. The prompt information 4302 may prompt the user that the in-vehicle infotainment 60 uses the network of the mobile phone 40. The prompt information 4303 may prompt the user of mobile traffic, for example, 100 MB, that is of the mobile phone 40 and that is consumed by the in-vehicle infotainment 60. The user may tap the control 4304 to stop sharing. The user may alternatively tap the control 4305 to perform a network sharing setting.

In some scenarios, when there is already a physical SIM card in a device 1, and SIM card information mapped from another device is obtained, a device having a physical SIM card and a virtual SIM card is formed. The user may select, in the device 1, a SIM card for making a call by default.

The mobile phone 40 is used as an example. There is a physical SIM card in the mobile phone 40, and a mobile phone 70 maps SIM card information of a physical SIM card in the mobile phone 70 to the mobile phone 40. The mobile phone 40 forms a virtual SIM card based on the mapped SIM card information of the physical SIM card in the mobile phone 70. Finally, the mobile phone 40 may become a dual-card device having one physical SIM card and one virtual SIM card. The mobile phone 40 may dynamically switch a SIM card based on a network status.

Figure 44:
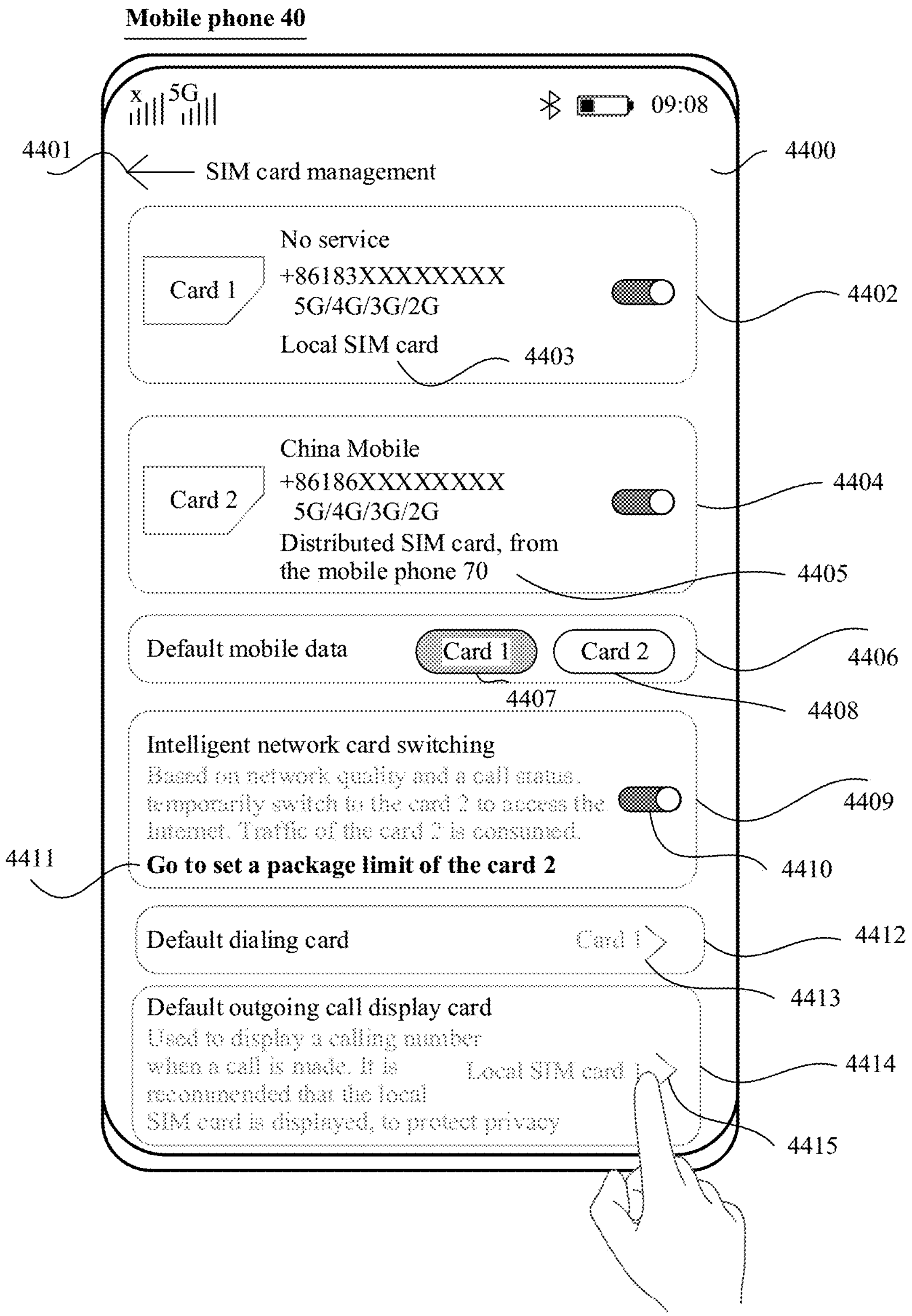
FIG. 44 and FIG. 45 are schematic diagrams of a group of user interfaces of a mobile phone 40 according to an embodiment of this application.
Figure 45:
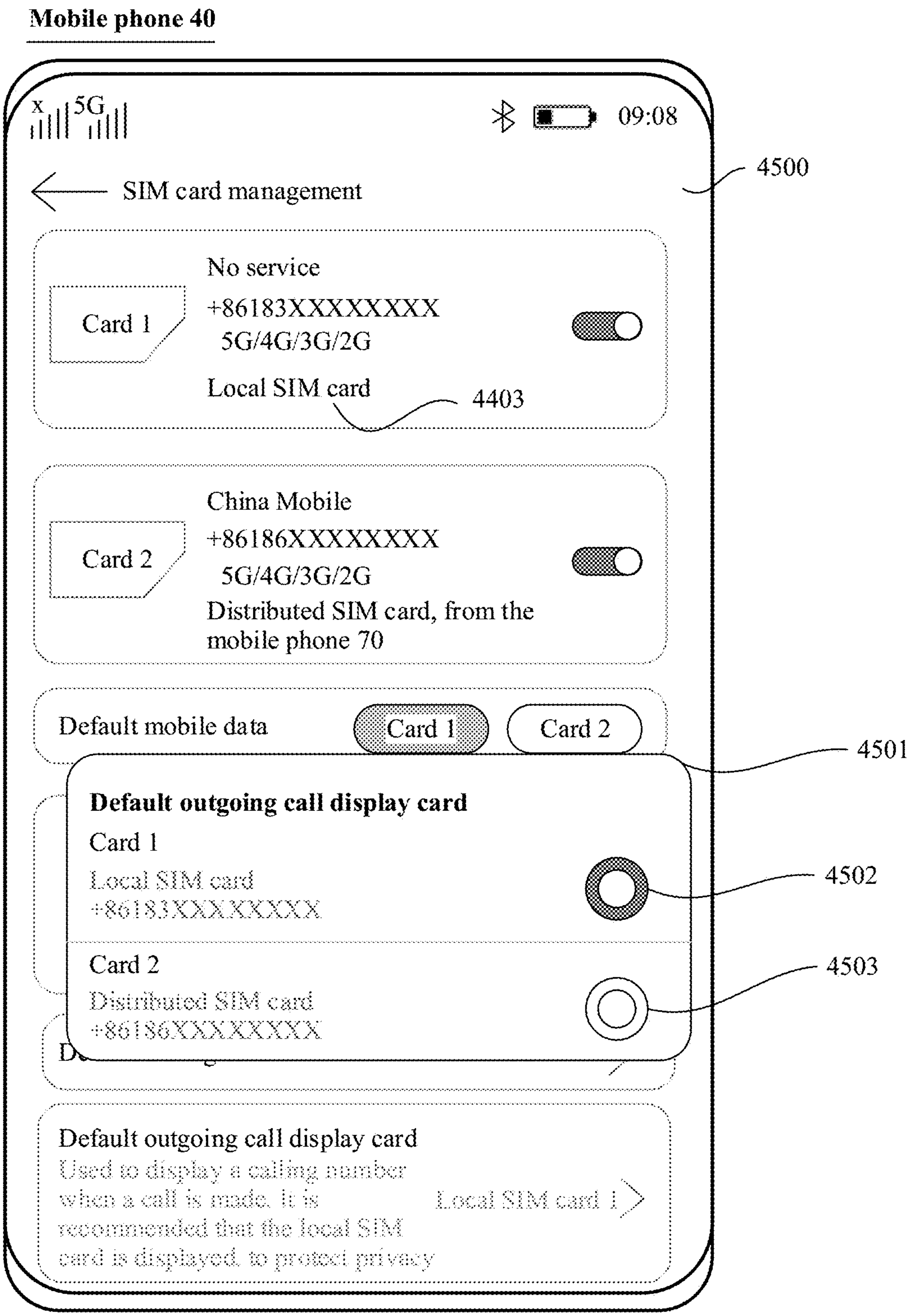

FIG. 44 and FIG. 45 show examples in which the user sets a default dialing card, a default outgoing call display SIM card, and the like in the mobile phone 40.

FIG. 44 shows an example of a user interface 4400 of the mobile phone 40. As shown in FIG. 44, the user interface 4400 may include a control 4401, a setting item 4402, a setting item 4404, a setting item 4406, a setting item 4409, a setting item 4412, and a setting item 4414. The control 4401 is used to return to a previous-level page.

As shown in FIG. 44, the setting item 4402 may be used to set related information of a SIM card 1, for example, a card name and a card number. The setting item 4402 may include prompt information 4403, and the prompt information 4403 may prompt the user that the SIM card is a local SIM card of the mobile phone 40.

As shown in FIG. 44, the setting item 4404 may be used to set related information of a SIM card 2. The setting item 4404 may include prompt information 4405, and the prompt information 4405 may prompt the user that the SIM card 2 is a distributed SIM card (which may also be referred to as a virtual SIM card in this embodiment of this application) and is from the mobile phone 70.

As shown in FIG. 44, the setting item 4406 may be used to set which SIM card provides mobile data by default. The setting item 4406 may include a control 4407 and a control 4408. The user may set, by using the control 4407, the SIM card 1 to provide mobile data by default. The user may set, by using the control 4408, the SIM card 2 to provide mobile data by default. In FIG. 44, the setting item 4406 is set as that the SIM card 1 provides mobile data by default.

As shown in FIG. 44, the setting item 4409 may be used to set whether the mobile phone 40 enables a smart data switch function. The setting item 4409 may include a control 4410 and a control 4411. The user may enable or disable the smart data switch function by using the control 4410. The smart data switch function is enabled in the setting item 4409 shown in FIG. 44. The user may set a package limit of the card 2 by using the control 4411, for example, an available traffic upper limit.

As shown in FIG. 44, the setting item 4412 may be used to set the default dialing card of the mobile phone 40. The setting item 4412 may include a control 4413, and the control 4413 may be used to set the SIM card 1 or the SIM card 2 as the default dialing card of the mobile phone 40. As shown in FIG. 44, the SIM card 1 is set as the default dialing card of the mobile phone 40.

As shown in FIG. 44, the setting item 4414 may be used to set the default outgoing call display card of the mobile phone 40. To be specific, when the mobile phone 40 makes a call, a device receiving the call displays a number of a SIM card that is in the mobile phone 40 and that is set as the default outgoing call display card. The setting item 4414 may include a control 4415, and the control 4415 may be used to set the SIM card 1 or the SIM card as the default outgoing call display card of the mobile phone 40. As shown in FIG. 44, the SIM card 1 is set as the default outgoing call display card of the mobile phone 40. To be specific, regardless of whether the user makes a call through the SIM card 1 or the SIM card 2, an incoming call number displayed on a call receiving party is a mobile phone number corresponding to the SIM card 1 in the mobile phone 40.

As shown in FIG. 44, the user may tap the control 4415, and in response to the user operation, the mobile phone 40 may display a user interface 4500.

FIG. 45 shows an example of the user interface 4500 of the mobile phone 40. As shown in FIG. 45, the user interface 4500 may include a setting box 4501. The setting box 4501 may include a control 4502 and a control 4503. The user may tap the control 4502 to set the SIM card 1 as the default outgoing call display card of the mobile phone 40. The user may tap the control 4503 to set the SIM card 2 as the default outgoing call display card of the mobile phone 40.

It may be understood that the user interface 500 to the user interface 4500 shown in FIG. 5 to FIG. 45 are merely examples. The user interface 500 to the user interface 4500 may include more or fewer interface elements. This is not limited in embodiments of this application.

Based on the related user interfaces described above, the device 1 (for example, the tablet 50 or the in-vehicle infotainment 60 described above) may obtain a mobile communication capability shared by a device 2 (for example, the mobile phone 40 described above). The following describes how the device 1 accesses the Internet, makes and answers calls, and receives and sends SMS messages by using the mobile communication capability shared by the device 2.

In this embodiment of this application, the device 1 establishes a communication connection to the device 2, SIM card information of the device 1 may be shared with the device 2, and the device 2 may access the Internet, make and answer calls, and receive and send SMS messages based on the SIM card information of the device 1.

With reference to the accompanying drawings, the following describes specifically how the SIM card information of the device 1 is shared with the device 2.

Figure 46A:
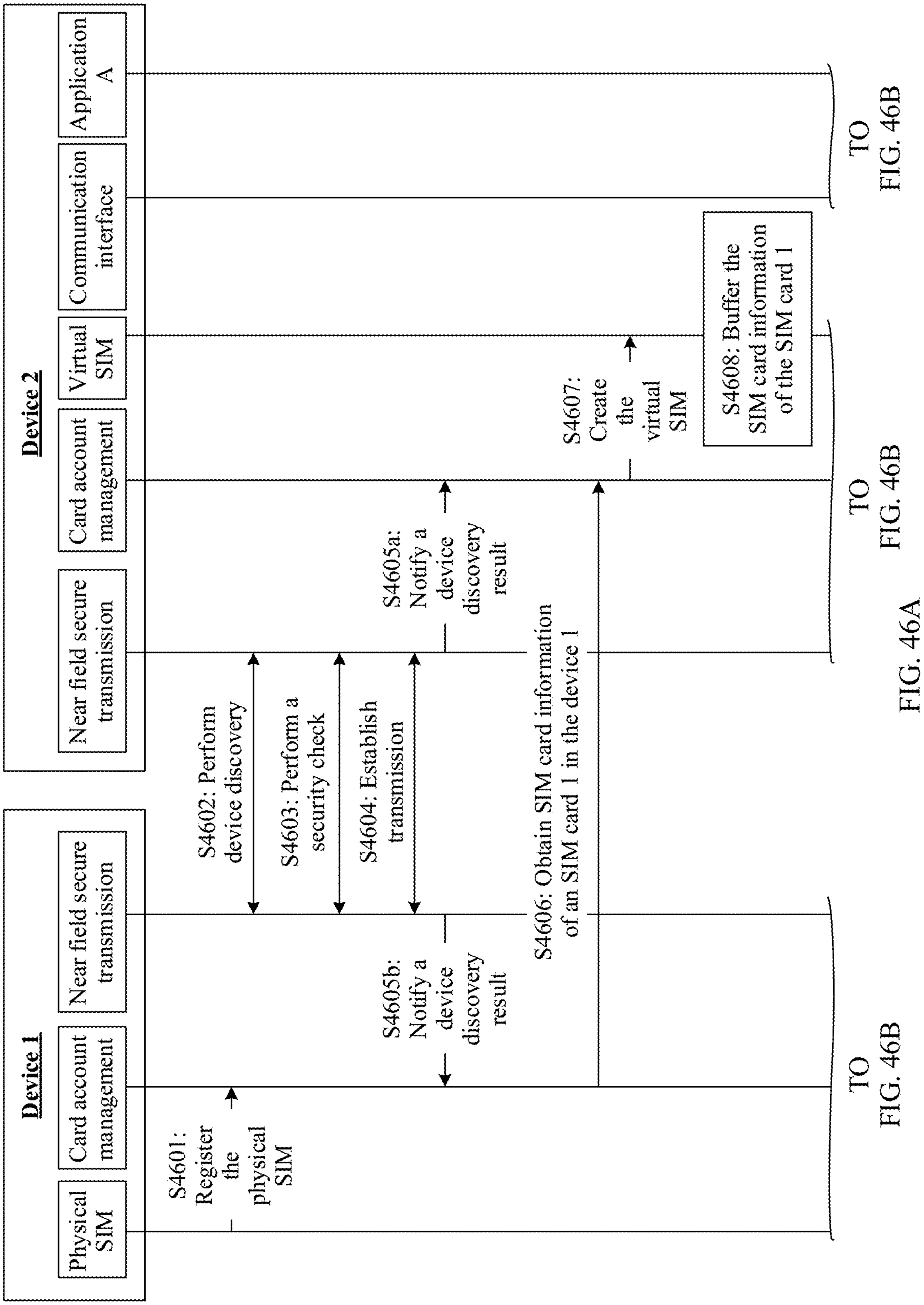
FIG. 46A and FIG. 46B are an interaction flowchart of sharing SIM card information of a device 1 by a device 2 according to an embodiment of this application.
Figure 46B:
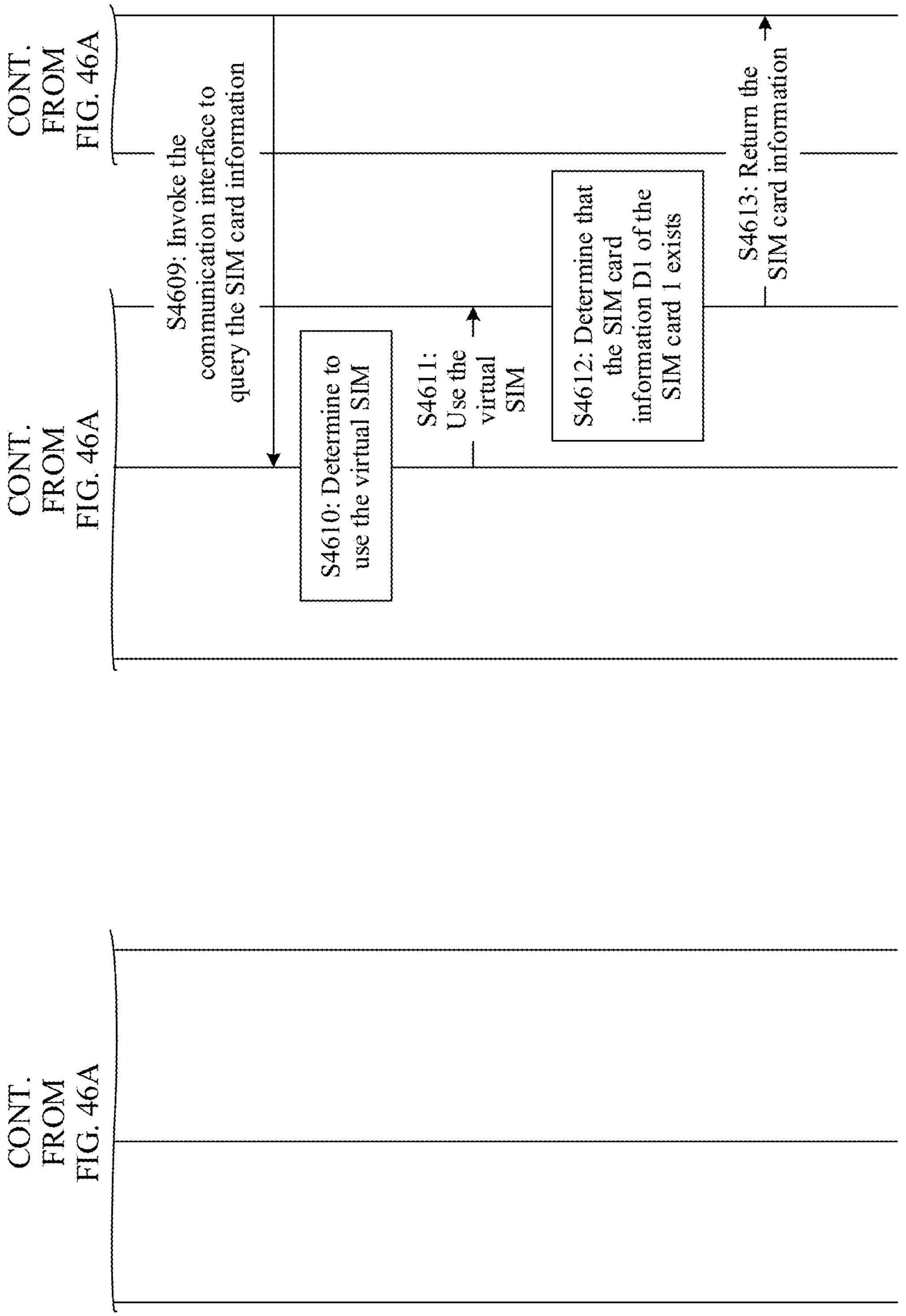

FIG. 46A and FIG. 46B are an example of an interaction diagram of a procedure in which the SIM card information of the device 1 is shared with the device 2. As shown in FIG. 46A and FIG. 46B, the SIM card information of the device 1 is shared with the device 2. Specifically, the following steps may be included.

S4601: A physical SIM in the device 1 may register SIM card information of the physical SIM in card account management.

After the physical SIM card 1 (which may be referred to as a SIM card 1 for short) is inserted into the device 1, the device 1 may store the SIM card information of the SIM card 1 into the physical SIM. The physical SIM card may register, in the card account management, the SIM card information stored in the physical SIM.

Step S4602 to Step S4604: The device 1 establishes the communication connection to the device 2.

The device 1 may establish the communication connection to the device 2. A manner in which the device 1 establishes the communication connection to the device 2 may include Wi-Fi, Bluetooth, a distributed soft bus, or the like. The manner in which the device 1 establishes the communication connection to the device 2 is not limited in embodiments of this application.

In some feasible examples, a process in which the device 1 establishes the communication connection to the device 2 may include steps such as device discovery, a security check, and transmission establishment. For details, refer to the following steps S4602 to S4604.

The device 1 may be the device 10A, the device 20A, the device 30A, or the device 40A shown in FIG. 1 to FIG. 4, and the device 2 may be the device 10B, the device 20B, the device 30B, or the device 40B shown in FIG. 1 to FIG. 4. One or two physical SIM cards may be inserted into the device 1. Alternatively, with development of future protocols and devices, a plurality of physical SIM cards may be inserted into the device 1. No SIM card is inserted into the device 2, or one SIM card may be inserted.

S4602: A near field secure transmission module in the device 1 and a near field secure transmission module in the device 2 perform device discovery.

S4603: The near field secure transmission module in the device 1 and the near field secure transmission module in the device 2 perform a security check.

S4604: The near field secure transmission module in the device 1 establishes transmission with the near field secure transmission module in the device 2.

The near field secure transmission module in the device 1 may be a module used for near field device communication, for example, a Wi-Fi communication module or a Bluetooth communication module. Similarly, the near field secure transmission module in the device 2 may be a module used for near field device communication, for example, a Wi-Fi communication module or a Bluetooth communication module.

The device 1 may discover a nearby device by using the near field secure transmission module, and the device 2 may also discover a nearby device by using the near field secure transmission module. In this embodiment of this application, the device 1 and the device 2 may discover each other by using the respective near field secure transmission modules in the devices. In other words, the device 1 may discover the device 2 by using the near field secure transmission module, and the device 2 may also discover the device 1 by using the near field secure transmission module.

When the device 1 establishes a connection to the device 2 for the first time, the near field secure transmission module in the device 1 and the near field secure transmission module in the device 2 may perform a security check. After the security check succeeds, the near field secure transmission module in the device 1 may establish a transmission channel with the near field secure transmission module in the device 2. For example, the Bluetooth communication module may implement discovery of a nearby device (for example, within a range of 50 meters). In a Bluetooth communication protocol, first pairing between devices requires user agreement and authorization. After the user agrees and authorizes for the first time, the Bluetooth communication module automatically checks both communication parties, and establishes a transmission channel. A manner in which the near field secure transmission module in the device 1 and the near field secure transmission module in the device 2 perform the security check is not limited in embodiments of this application.

It may be understood that, after the transmission channel is established between the device 1 and the device 2, the device 1 may send a device identifier (for example, a device ID of the device 1 or a unique device identifier (UDID) of the device 1) of the device 1 to the device 2 by using the near field secure transmission module in the device 1. The device 2 may also send a device identifier (for example, a device ID of the device 2 or a UDID of the device 2) of the device 2 to the device 1 by using the near field secure transmission module in the device 2.

S4605*a*: The near field secure transmission module in the device 2 notifies a card account management module in the device 2 of a device discovery result.

The near field secure transmission module in the device 2 may notify the card account management module in the device 2 of the device discovery result, and send the device identifier of the device 1 to the card account management module in the device 2.

S4605*b*: The near field secure transmission module in the device 1 notifies a card account management module in the device 1 of a device discovery result.

The near field secure transmission module in the device 1 may notify the card account management module in the device 1 of the device discovery result, and send the device identifier of the device 2 to the card account management module in the device 1.

S4606: The card account management module in the device 2 obtains SIM card information D1 of the SIM card 1 in the device 1 from the card account management module in the device 1.

The card account management module in the device 2 obtains the SIM card information D1 of the SIM card 1 in the device 1 from the card account management module in the device 1. Specifically, the card account management module in the device 2 may send a request for obtaining the SIM card information D1 to the card account management in the device 1 through the near field secure transmission module in the device 2, where the request may carry the identifier of the device 2. The device 1 may receive, by using the near field secure transmission module in the device 1, the request that is for obtaining the SIM card information D1 and that is sent by the device 2, and send the request to the card account management module in the device 1. The card account management module in the device 1 may receive the request that is for obtaining the SIM card information D1 and that is sent by the device 2, and send the SIM card information D1 of the SIM card 1 stored in the card account management module to the card account management module in the device 2 through the near field secure transmission modules.

The SIM card information D1 is a first part of the complete SIM card information of the SIM card 1. The SIM card information D1 includes an integrated circuit card identity ICCID, an IMSI, and a mobile subscriber international integrated services digital network number MSISDN of the SIM card 1. The SIM card information D1 does not include information such as an authentication key, an operator root key, and an authentication algorithm in the SIM card information of the SIM card 1. It may be understood that the information such as the authentication key, the operator root key, and the authentication algorithm in the SIM card information of the physical SIM card is data that is restricted to access, and generally cannot be obtained by another device.

In some examples, the SIM card information D1 may also be referred to as first information in the SIM card information of the SIM card 1.

When only one physical SIM card is inserted into the device 1, the SIM card is the SIM card 1. When a plurality of SIM cards are inserted into the device 1, the SIM card 1 may be a primary card in the device 1, a default data flow card or a default call making card in the device 1, or the like.

It may be understood that, when the user selects, in the device 2, to share the mobile communication capability of the device 1, the card account management module of the device 2 obtains the SIM card information D1 of the SIM card 1 in the device 1 from the card account management module of the device 1. For how the user selects, in the device 2, to share the mobile communication capability of the device 1, refer to the specific process of sharing the mobile communication capability of the mobile phone 40 with the tablet 50 in FIG. 5 to FIG. 21. Details are not described herein again.

It may be understood that, when the user selects, in the device 1, to share the mobile communication capability of the device 1 with the device 2, the card account management module of the device 2 may obtain the SIM card information D1 that is of the SIM card 1 in the device 1 and that is provided by the card account management module in the device 1. For how the user selects, in the device 1, to share the mobile communication capability with the device 2, refer to the specific process in which the mobile phone 40 shares the mobile communication capability with the tablet 50 in FIG. 22 to FIG. 37. Details are not described herein again.

S4607: The card account management module in the device 2 creates a virtual SIM module.

S4608: The virtual SIM module in the device 2 buffers the SIM card information of the SIM card 1.

Optionally, the card account management module in the device 2 may create the virtual SIM module, and buffer the obtained SIM card information D1 of the SIM card 1 in the virtual SIM module. The card account management module in the device 2 may use the SIM card information D1 of the SIM card 1 as SIM card information of a virtual SIM card 1 of the device 2.

Optionally, in some embodiments, to reduce a memory of the device 2, the card account management of the device 2 may not create the virtual SIM module or buffer the obtained SIM card information D1 of the SIM card 1 into the virtual SIM module.

In a possible implementation, after the device 2 obtains the SIM card information D1 of the SIM card 1 in the device 1, the device 2 may generate a virtual SIM card, and display the virtual SIM card and related information (for example, a mobile phone number and a corresponding operator name) of the virtual SIM card. For example, a SIM card 2 is shown on a SIM card management interface in FIG. 44.

S4609: An application Ain the device 2 invokes a communication interface to query the SIM card information in the card account management module.

The application A in the device 2 may invoke the communication interface in the device 2 to query the SIM card information in the card account management module. The application A may be a phone app, a messaging app, an instant messaging app, a video playing app, an audio playing app, a browser app, or the like. A type of the application A and a specific application of the application A are not limited in embodiments of this application.

When the user opens the application A or logs in on a login interface of the application A, the application A may invoke the communication interface in the device 2 to query the SIM card information in the card account management module.

S4610: The card account management module in the device 2 determines that the device 2 uses the virtual SIM card in the virtual SIM module.

S4611: The card account management module in the device 2 indicates to use the virtual SIM card in the virtual SIM module.

In some feasible examples, when the card account management module in the device 2 stores only the SIM card information D1 of the SIM card 1 of the device 1, the card account management module in the device 2 determines that the SIM card information (namely, the SIM card information D1 of the SIM card 1 of the device 1) of the virtual SIM card in the virtual SIM module is used in the device 2.

Optionally, in some feasible examples, when the card account management module in the device 2 stores both SIM card information of a physical SIM card in the device 2 and the SIM card information of the virtual SIM card (namely, the SIM card information D1 of the SIM card 1 in the device 1), and the user sets the virtual SIM card as a default data flow card, a default call making card, and the like, the card account management module in the device 2 determines to use the SIM card information of the virtual SIM card buffered in the virtual SIM module.

Optionally, in some feasible examples, the device 2 may preset some trustlist applications that can use the SIM card information of the virtual SIM card. If the application A is a trustlist application, the card account management module in the device 2 may indeed use the virtual SIM.

Optionally, in some feasible examples, when the device 2 determines that a current foreground interface of the application A is the login interface, the card account management module in the device 2 may determine to use the SIM card information of the virtual SIM card in the virtual SIM module.

Optionally, in some feasible examples, when the card account management module of the device 2 stores the SIM card information of the virtual SIM card, regardless of which application is the application A, the card account management determines to use the SIM card information of the virtual SIM card in the virtual SIM module, and indicates the virtual SIM module to send the SIM card information of the virtual SIM card, namely, the SIM card information D1 of the SIM card 1 in the device 1, to the application.

S4612: The virtual SIM module in the device 2 determines that the SIM card information D1 of the SIM card 1 exists.

S4613: The virtual SIM module in the device 2 returns the SIM card information D1 to the application Ain the device 2.

When the virtual SIM module in the device 2 receives an indication that is sent by the card account management and that is used to return the SIM card information to the application, the virtual SIM module may first determine whether the SIM card information is stored. If the virtual SIM module stores the SIM card information D1, the virtual SIM module may send the stored SIM card information to the application A through the communication interface. If the virtual SIM does not store the SIM card information, the virtual SIM module may send a reply message to the card account management module, where the reply message may indicate that the virtual SIM does not store the SIM card information. The card account management module of the device 2 may obtain the SIM card information D1 of the SIM card 1 in the device 1 from the device 1.

Alternatively, optionally, in some feasible examples, the card account management module in the device 2 may send, to the application A through the communication interface, the SIM card information D1 of the SIM card 1 stored in the card account management module.

After the application A obtains the SIM card information D1, if the application A is an application having a login interface, the application may perform login and perform a check by using the obtained SIM card information D1. If the application A is an instant messaging application, a video playing application, an audio playing application, a browser application, or the like, the application A may access the Internet and obtain a cellular mobile data network based on the obtained SIM card information D1. If the application A is a phone app, the application A may make and answer calls by using the obtained SIM card information D1. If the application A is a messaging app, the application A may receive and send SMS messages by using the obtained SIM card information D1. In other words, after step S4606, the device 2 may access the Internet, make and answer calls, and receive and send SMS messages by using the obtained SIM card information D1 of the SIM card 1 in the device 1.

The following uses an example in which the application A is an application (for example, an instant messaging application, a video playing application, and an audio playing application) that requires the cellular mobile data network, to specifically describe how the application A in the device 2 accesses the Internet by using the SIM card information D1 that is of the SIM card 1 of the device 1 and that is obtained by the device 2, and obtains the cellular mobile data network.

Figure 47A:
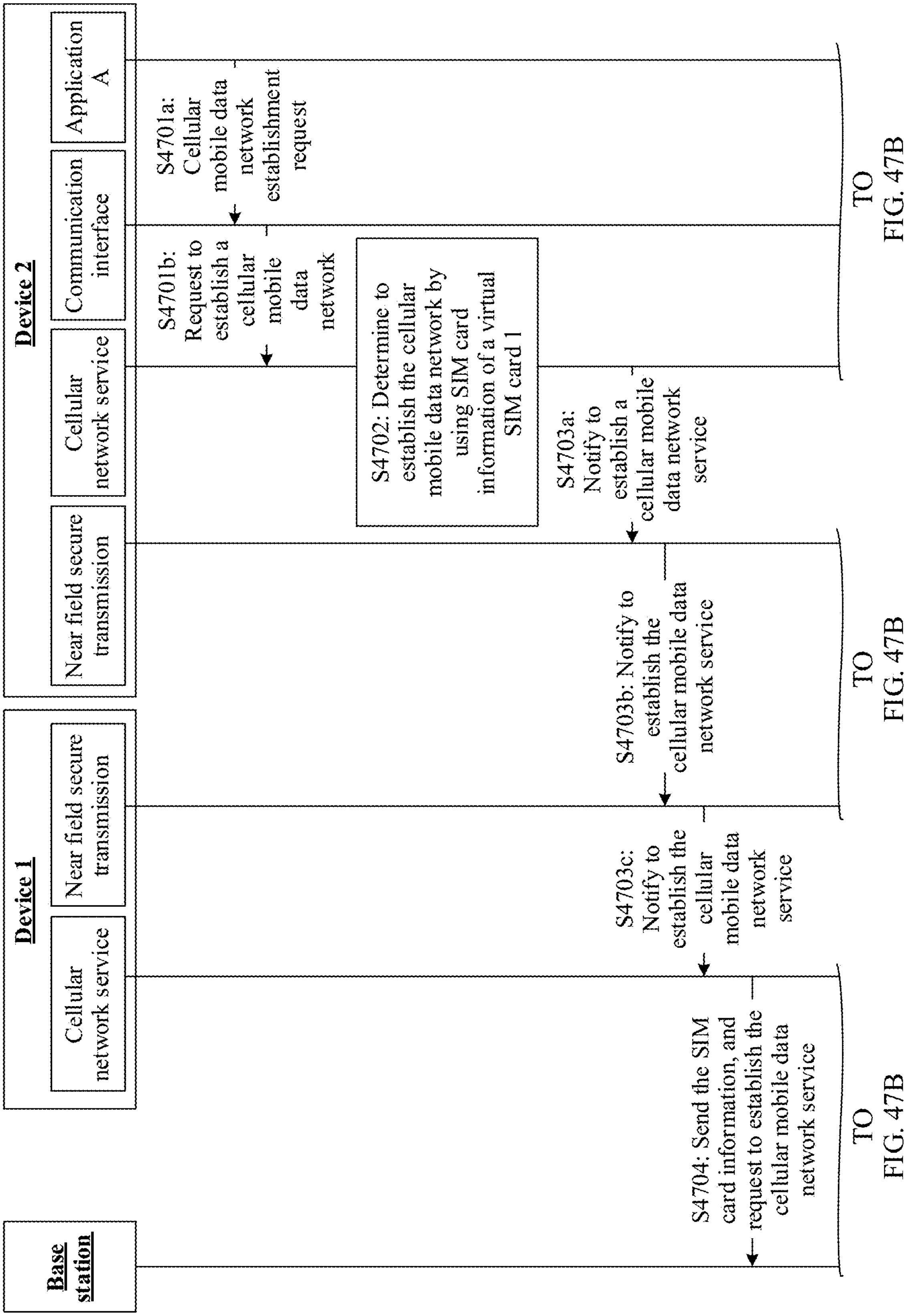
FIG. 47A to FIG. 47C are a schematic interaction diagram in which an application A in a device 2 accesses the Internet by using SIM card information that is of a SIM card 1 of a device 1 and that is obtained by the device 2 according to an embodiment of this application.
Figure 47B:
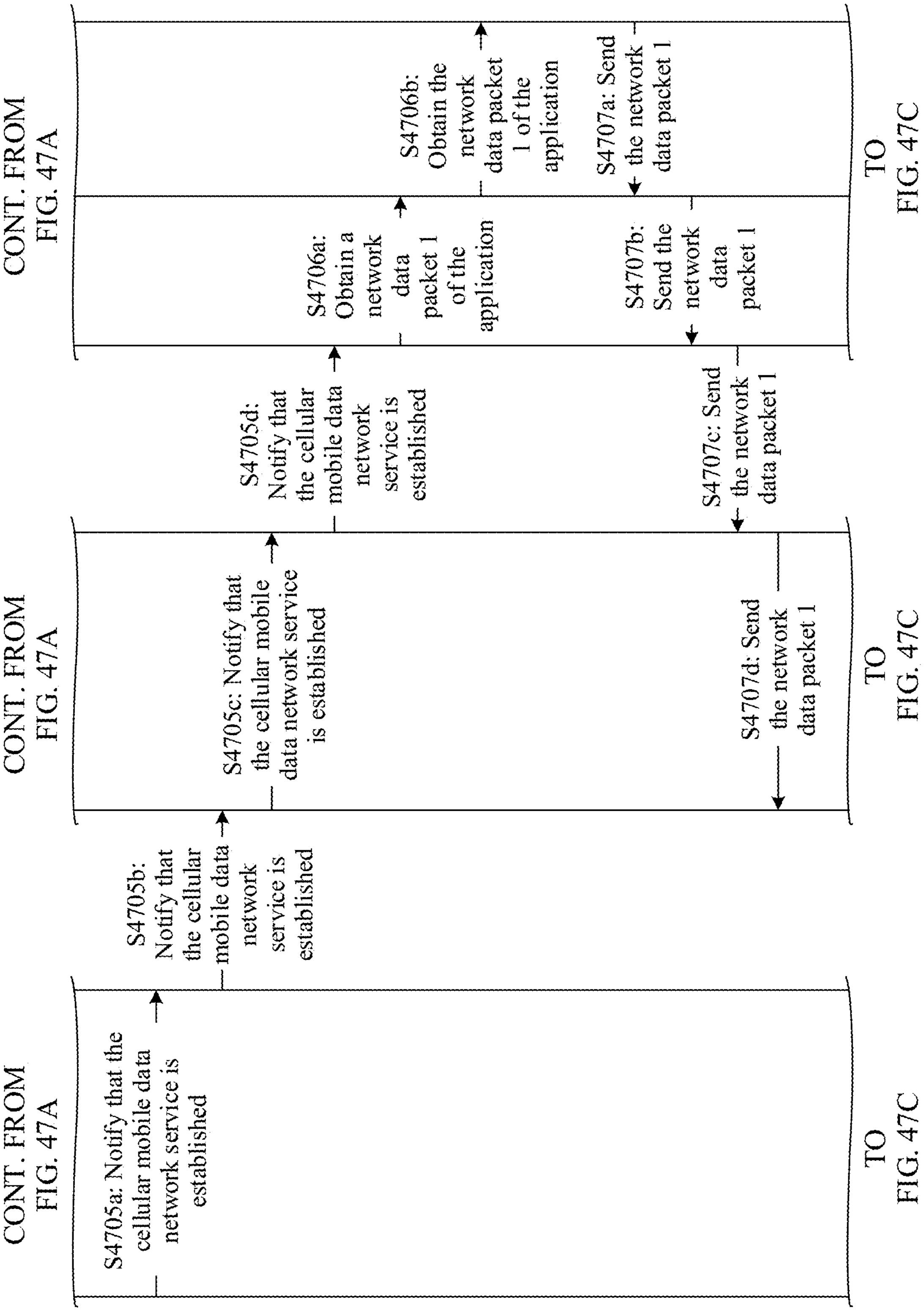
Figure 47C:
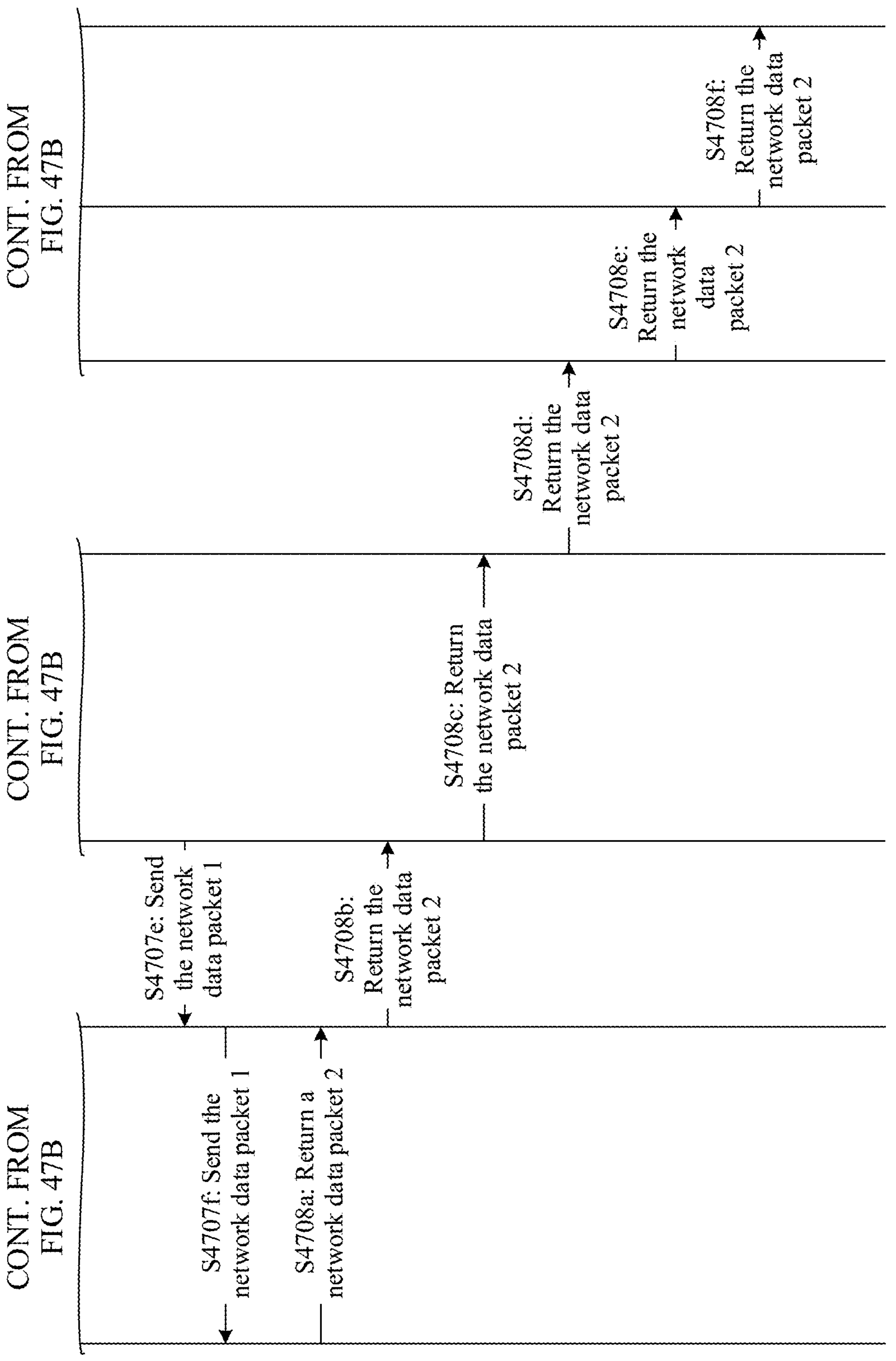

FIG. 47A to FIG. 47C are an example of a schematic interaction diagram in which the application A in the device 2 accesses the Internet by using the SIM card information D1 that is of the SIM card 1 of the device 1 and that is obtained by the device 2. As shown in FIG. 47A to FIG. 47C, how the application A in the device 2 accesses the Internet by using the SIM card information D1 that is of the SIM card 1 of the device 1 and that is obtained by the device 2 may specifically include the following steps.

S4701*a*: The application A in the device 2 sends a cellular mobile data network establishment request to the communication interface in the device 2.

S4701*b*: The communication interface in the device 2 sends the cellular mobile data network establishment request to a cellular network service module in the device 2.

When the application Ain the device 2 receives an operation of the user, for example, sending an instant message, playing a network video, or playing a network audio, the application Ain the device 2 may send the cellular mobile data network establishment request to the cellular network service module in the device 2 through the communication interface in the device 2.

S4702: The cellular network service module in the device 2 determines to establish the cellular mobile data network by using the SIM card information of the virtual SIM card 1.

After the cellular network service module in the device 2 receives the cellular mobile data network establishment request sent by the application A, the cellular network service module may query the card account management module in the device 2 for the SIM card information. If the card account management module has only the SIM card information of the virtual SIM card 1 (namely, the SIM card information D1 of the SIM card 1 in the device 1), the cellular network service module determines to establish the cellular mobile data network by using the SIM card information of the virtual SIM card 1. If the card account management module has SIM card information of a plurality of SIM cards, but the virtual SIM card 1 is set by the user as the default data traffic card, the cellular network service module determines to establish the cellular mobile data network by using the SIM card information of the virtual SIM card 1.

After the cellular network service module in the device 2 receives the cellular mobile data network establishment request of the application A, the cellular network service module needs to first determine whether there is a SIM card in the device 2. If there is a SIM card in the device 2 and only the virtual SIM card 1 exists, or there is a virtual SIM card and it is determined that the virtual SIM card is set as the default data traffic card, the cellular network service module in the device 2 may determine to establish the cellular mobile data network by using the SIM card information of the virtual SIM card 1.

It may be understood that the cellular network service module can provide a cellular network service for the device only when the cellular network service module determines that the device has a SIM card (a physical SIM card or a virtual SIM card). When the cellular network service module determines that there is no SIM card in the device, the cellular network service module may not provide a cellular network-related service for an application in the device, for example, establish the cellular mobile data network for the application.

Because the SIM card information of the virtual SIM card does not include related information such as the authentication key and the operator root key, the cellular network service module in the device 2 cannot directly perform authentication with a network device of an operator by using the SIM card information of the virtual SIM card, and cannot establish the cellular mobile data network. The cellular network service module in the device 2 needs to notify a cellular network service module in the device 1 that provides the SIM card information of the virtual SIM card to establish the cellular mobile data network.

S4703*a*: The cellular network service module in the device 2 notifies, through the near field secure transmission module in the device 2, the device 1 to establish the cellular mobile data network.

S4703*b*: The near field secure transmission module in the device 2 notifies the near field secure transmission module in the device 1 to establish the cellular mobile data network.

S4703*c*: The near field secure transmission module in the device 1 notifies the cellular network service module in the device 1 to establish the cellular mobile data network.

The cellular network service module in the device 2 may notify the cellular network service module in the device 1 to establish the cellular mobile data network by using the SIM card information that is of the SIM card 1 and that corresponds to the SIM card information of the virtual SIM card 1. Specifically, the cellular network service module in the device 2 notifies, through the near field secure transmission module in the device 2, the device 1 to use the SIM card 1 to establish the cellular mobile data network. Then, the near field secure transmission module in the device 2 notifies the near field secure transmission module in the device 1 to establish the cellular mobile data network. Then, the near field secure transmission module in the device 1 notifies the cellular network service module in the device 1 to establish the cellular mobile data network.

S4704: The cellular network service module in the device 1 sends the SIM card information to a base station, and requests to establish the cellular mobile data network.

The cellular network service module in the device 1 sends the SIM card information of the SIM card 1 to the base station, and requests to establish the cellular mobile data network. For how the base station establishes the cellular mobile data network by using the SIM card information of the SIM card 1, refer to specific steps of establishing a cellular mobile data network (which may also be referred to as a cellular network or a mobile network) by the base station in an existing communication protocol. Details are not described herein again.

The SIM card information of the SIM card 1 may include information such as the integrated circuit card identity ICCID, the IMSI, the mobile subscriber international integrated services digital network number MSISDN, the authentication key, the operator root key, and the authentication algorithm.

S4705*a*: The base station notifies the cellular network service module in the device 1 that the cellular mobile data network service is established.

S4705*b*: The cellular network service module in the device 1 notifies the near field secure transmission module in the device 1 that the cellular mobile data network service is established.

S4705*c*: The near field secure transmission module in the device 1 notifies the near field secure transmission module in the device 2 that the cellular mobile data network service is established.

S4705*d*: The near field secure transmission module in the device 2 notifies the cellular network service module in the device 2 that the cellular mobile data network service is established.

After the base station successfully establishes the cellular mobile data network service based on the SIM card information of the SIM card 1, the base station may notify the cellular network service module in the device 1. After receiving a notification sent by the base station, the cellular network service module in the device 1 may notify the cellular network service module in the device 2 that the cellular network mobile data network service is established. Specifically, the cellular network service module in the device 1 notifies the near field secure transmission module in the device 1 that the cellular mobile data network service is established. Then, the near field secure transmission module in the device 1 notifies the near field secure transmission module in the device 2 that the cellular mobile data network service is established. Then, the near field secure transmission module in the device 2 notifies the cellular network service module in the device 2 that the cellular mobile data network service is established.

S4706*a*: The cellular network service module in the device 2 sends, to the communication interface in the device 2, an instruction used to obtain a network data packet 1 of the application A.

S4706*b*: The communication interface in the device 2 sends the instruction used to obtain the network data packet 1 of the application A to the application in the device 2.

The cellular network service module in the device 2 may send, to the application A through the communication interface in the device 2, the instruction used to obtain the network data packet 1 of the application A. Specifically, the cellular network service module in the device 2 sends, to the communication interface in the device 2, the instruction used to obtain the network data packet 1 of the application A. Then, the communication interface in the device 2 sends the instruction used to obtain the network data packet 1 of the application A to the application in the device 2.

S4707*a*: The application in the device 2 sends the network data packet 1 to the communication interface.

S4707*b*: The communication interface in the device 2 sends the network data packet 1 to the cellular network service module in the device 2.

After the application A in the device 2 receives the instruction sent by the cellular network service module in the device 2, the application A in the device 2 may send the network data packet 1 through the communication interface. Specifically, the application in the device 2 may send the network data packet 1 to the communication interface. Then, the communication interface in the device 2 may send the network data packet 1 to the cellular network service module in the device 2.

S4707*c*: The cellular network service module in the device 2 sends the network data packet 1 to the near field secure transmission module in the device 2.

S4707*d*: The near field secure transmission module in the device 2 sends the network data packet 1 to the near field secure transmission module in the device 1.

S4707*e*: The near field secure transmission module in the device 1 sends the network data packet 1 to the cellular network service module in the device 1.

S4707*f*: The cellular network service module in the device 1 sends the network data packet 1 to the base station.

After receiving the network data packet 1, the cellular network service module in the device 2 may send the network data packet 1 to the cellular network service module in the device 1 through the near field secure transmission module in the device 2. Specifically, the cellular network service module in the device 2 may send the network data packet 1 to the near field secure transmission module in the device 2. Then, the near field secure transmission module in the device 2 may send the network data packet 1 to the near field secure transmission module in the device 1. Then, the near field secure transmission module in the device 1 may send the network data packet 1 to the cellular network service module in the device 1.

Then, after the cellular network service module in the device 1 receives the network data packet 1, the cellular network service module in the device 1 may send the network data packet 1 to the base station.

S4708*a*: The base station returns a network data packet 2 to the cellular network service module in the device 1.

The base station may parse the network data packet 1. The network data packet 1 may carry an identifier of a target device. The base station may obtain the network data packet 2 from the target device. The target device may be a server corresponding to the application A, or the target device may be a receiving device of the network data packet 1. For example, if the application A is a video playing application, the network data packet 1 may be video information (for example, a name of a video and a quantity of episodes of the video) that the user wants to play, and the network data packet 2 is a video stream that corresponds to the video information and that is returned by the server corresponding to the application A. The server corresponding to the application A is the target device. If the application A is an instant messaging application, the network data packet 1 is instant messaging information that is of a user of a device 3 and that is sent by the user of the device 1 by using the application A. In this case, the network data packet 2 may be instant messaging information returned by the device 3 to the device 1. The device 3 is the target device.

The base station may return the network data packet 2 to the cellular network service module in the device 1.

S4708*b*: The cellular network service module in the device 1 returns the network data packet 2 to the near field secure transmission module in the device 1.

S4708*c*: The near field secure transmission module in the device 1 returns the network data packet 2 to the near field secure transmission module in the device 2.

S4708*d*: The near field secure transmission module in the device 2 returns the network data packet 2 to the cellular network service module in the device 2.

The cellular network service module in the device 1 may send the network data packet 2 to the cellular network service module in the device 2 through the near field secure transmission module in the device 1. Specifically, the cellular network service module in the device 1 may return the network data packet 2 to the near field secure transmission module in the device 1. Then, the near field secure transmission module in the device 1 returns the network data packet 2 to the near field secure transmission module in the device 2. Then, the near field secure transmission module in the device 2 returns the network data packet 2 to the cellular network service module in the device 2.

S4708*e*: The cellular network service module in the device 2 returns the network data packet 2 to the communication interface in the device 2.

S4708*f*: The cellular network service module in the device 2 returns the network data packet 2 to the application A in the device 2.

After receiving the network data packet 2, the cellular network service module in the device 2 may send the network data packet 2 to the application A through the communication interface in the device 2. Specifically, the cellular network service module in the device 2 returns the network data packet 2 to the communication interface in the device 2. Then, the cellular network service module in the device 2 returns the network data packet 2 to the application A in the device 2.

When the application A needs to continuously obtain cellular network service data, the application A may send a network data packet to the cellular network service module in the device 2 again, and then the cellular network service module in the device 2 sends the network data packet to the base station through the cellular network service module in the device 1. Then, the cellular network service module in the device 1 sends, to the cellular network service module in the device 2, a network data packet returned by the base station. Finally, the cellular network service module in the device 2 sends the network data packet to the application A in the device 2. In other words, step S4707*a* to step S4708*f* are repeatedly performed.

In this way, the application A in the device 2 may access the Internet by using the communication capability of the SIM card in the device 1, to obtain the cellular mobile data network service.

The following uses an example in which the application Ais a phone app to describe in detail how the application A in the device 2 makes a call by using the SIM card information D1 that is of the SIM card 1 of the device 1 and that is obtained by the device 2.

Figures 1, 48A:
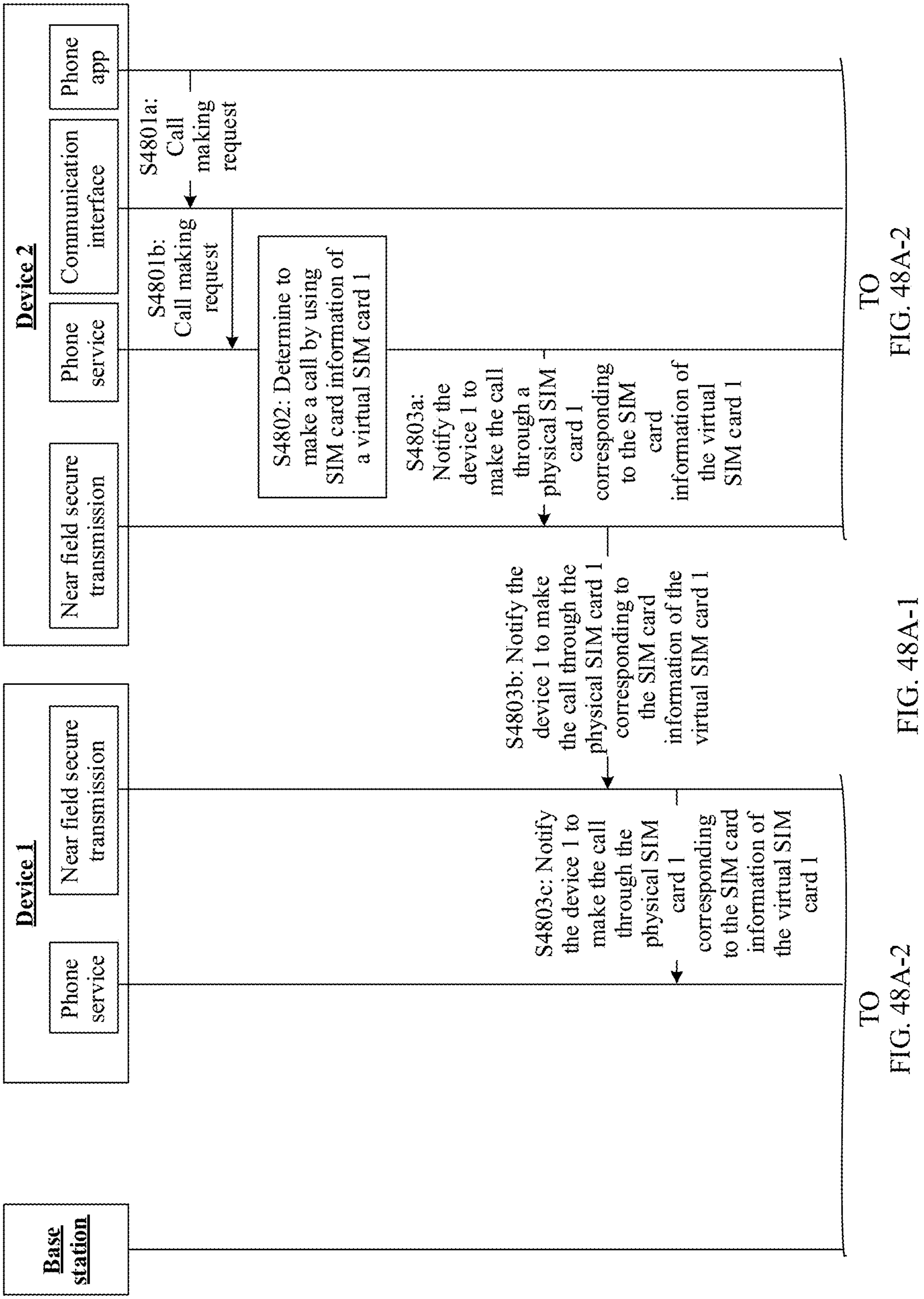
Figures 2, 48A:
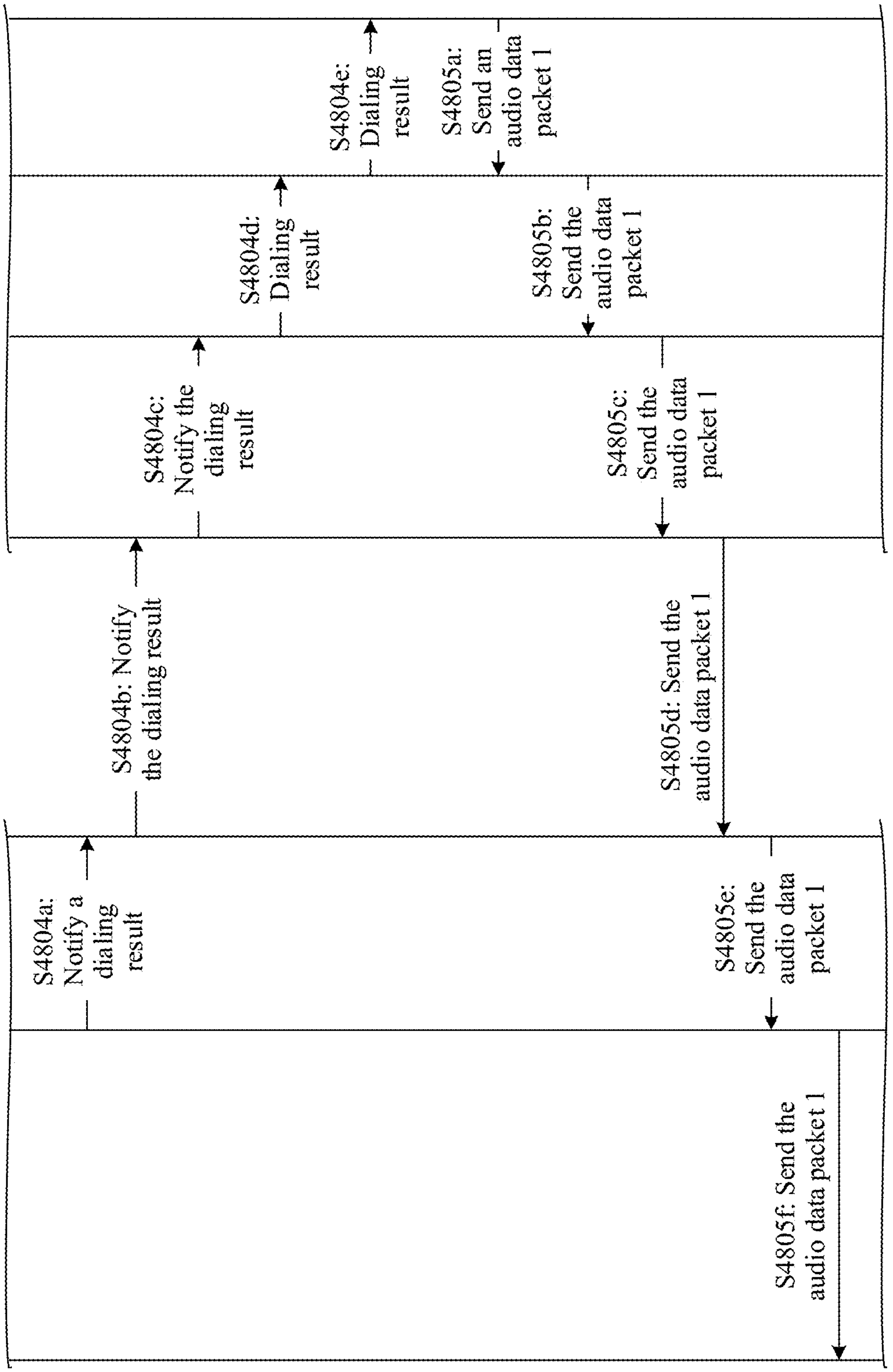
Figures 3, 48A:
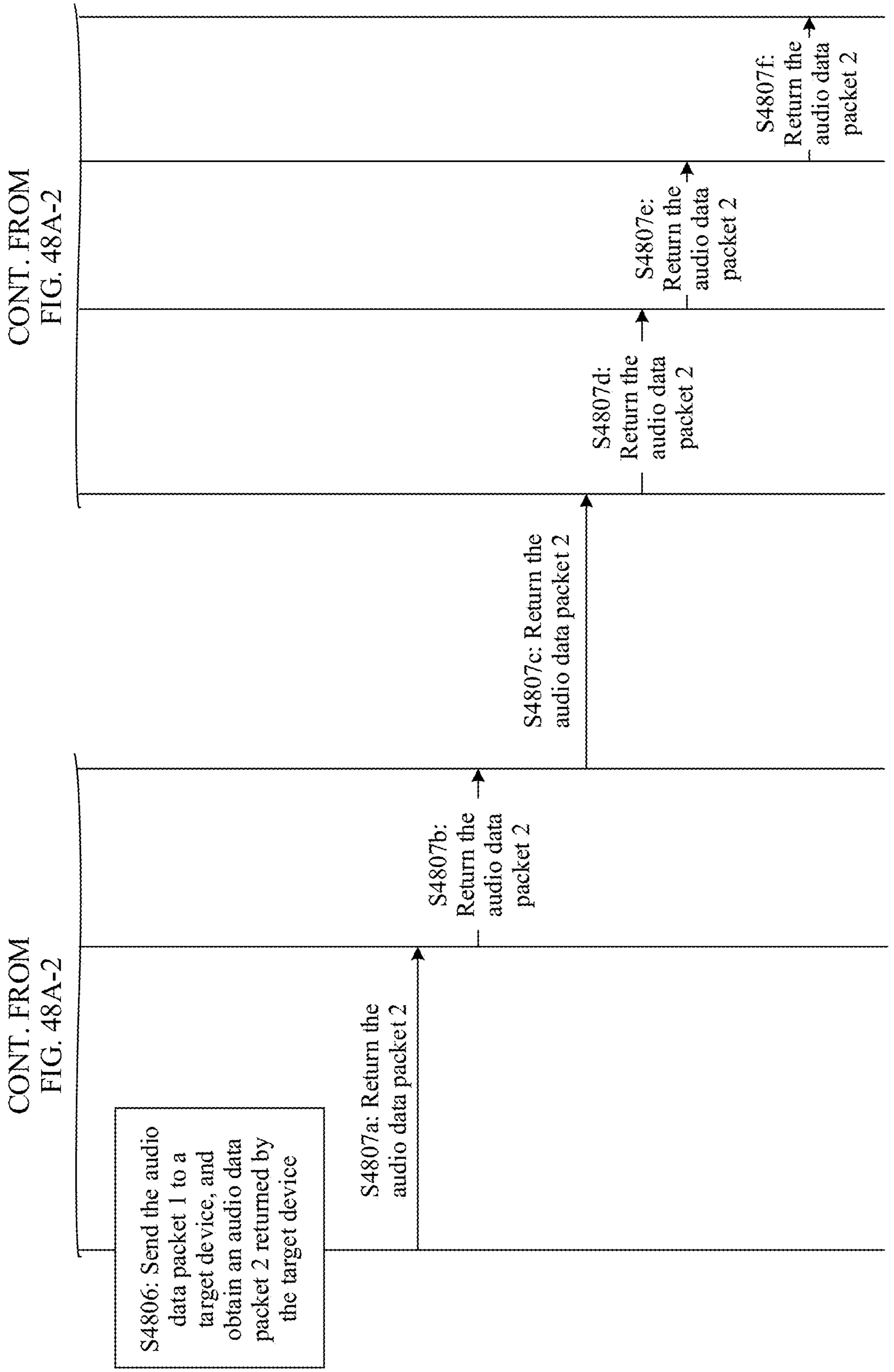

FIG. 48A-1 to FIG. 48A-3 are an example of a schematic interaction diagram in which the phone app in the device 2 makes a call by using the obtained SIM card information D1 of the SIM card 1 of the device 1. As shown in FIG. 48A-1 to FIG. 48A-3, that the phone app in the device 2 makes a call by using the obtained SIM card information D1 of the SIM card 1 of the device 1 may specifically include the following steps.

S4801*a*: The phone app in the device 2 sends a call making request to the communication interface in the device 2.

S4801*b*: The communication interface in the device 2 sends the call making request to a phone service module in the device 2.

When the user makes the call by using the phone app in the device 2, the phone app in the device 2 may send the call making request to the phone service module in the device 2 through the communication interface.

S4802: The phone service module in the device 2 determines to make the call by using the SIM card information of the virtual SIM card 1.

After receiving the call making request of the phone app in the device 2, the phone service module in the device 2 may query the card account management in the device 2. If the card account management in the device 2 has only the SIM card information of the virtual SIM card 1 (namely, the SIM card information D1 of the SIM card 1 in the device 1), the phone service module in the device 2 determines to make the call by using the SIM card information of the virtual SIM card 1. If SIM card information of a plurality of SIM cards is in the card account management module in the device 2, but the virtual SIM card 1 is set by the user as the default call making card, the phone service in the device 2 determines to make the call by using the SIM card information of the virtual SIM card 1.

After the phone service module in the device 2 receives the call making request of the phone app, the phone service module needs to first determine whether there is a SIM card in the device 2. If there is a SIM card in the device 2 and only the virtual SIM card 1 exists, or there is a virtual SIM card and it is determined that the virtual SIM card is set as the default call making card, the phone service module in the device 2 may determine to make the call by using the SIM card information of the virtual SIM card 1.

It may be understood that the phone service module can provide a call answering service for the device only when the phone service module determines that the device has a SIM card (a physical SIM card or a virtual SIM card). When the phone service module determines that there is no SIM card in the device, the phone service module may not provide a call answering-related service for the phone app in the device.

Because the SIM card information of the virtual SIM card does not include related information such as the authentication key and the operator root key, the phone service module in the device 2 cannot directly perform authentication with a network device of an operator by using the SIM card information of the virtual SIM card, and cannot directly make the call. The phone service module in the device 2 needs to notify a phone service module in the device 1 that provides the SIM card information of the virtual SIM card to make the call.

S4803*a*: The phone service module in the device 2 sends a notification message M1 to the near field secure transmission module in the device 2, where the notification message M1 is used to notify the device 1 to make the call through the physical SIM card corresponding to the SIM card information of the virtual SIM card 1.

S4803*b*: The near field secure transmission module in the device 2 sends the notification message M1 to the near field secure transmission module in the device 1, where the notification message M1 is used to notify the device 1 to make the call through the physical SIM card corresponding to the SIM card information of the virtual SIM card 1.

S4803*c*: The near field secure transmission module in the device 1 sends the notification message M1 to the phone service module in the device 1, where the notification message M1 is used to notify the device 1 to make the call through the physical SIM card corresponding to the SIM card information of the virtual SIM card 1.

The phone service module in the device 2 may send the notification message M1 to the phone service in the device 1 through the near field secure transmission module in the device 2, where the notification message M1 is used to notify the device 1 to make the call through the physical SIM card corresponding to the SIM card information of the virtual SIM card 1. Specifically, the phone service in the device 2 sends the notification message M1 to the near field secure transmission module in the device 2, where the notification message M1 is used to notify the device 1 to make the call through the physical SIM card corresponding to the SIM card information of the virtual SIM card 1. Then, the near field secure transmission module in the device 2 sends the notification message M1 to the near field secure transmission module in the device 1. Then, the near field secure transmission module in the device 1 sends the notification message M1 to the phone service module in the device 1.

S4804*a*: The phone service module in the device 1 notifies the near field secure transmission module in the device 1 of a dialing result.

S4804*b*: The near field secure transmission module in the device 1 notifies the near field secure transmission module in the device 2 of the dialing result.

S4804*c*: The near field secure transmission module in the device 2 notifies the phone service module in the device 2 of the dialing result.

S4804*d*: The phone service module in the device 2 notifies the communication interface in the device 2 of the dialing result.

S4804*e*: The communication interface in the device 2 notifies the phone app in the device 2 of the dialing result.

After receiving the notification message M1, the phone service module in the device 1 may make the call through the SIM card 1. Herein, for how the device 1 makes the call through the SIM card 1, refer to descriptions in the conventional technology. Details are not described herein again. Then, the phone service in the device 1 may notify the phone service module in the device 2 of a dialing result through the near field secure transmission module in the device 1. Specifically, the phone service module in the device 1 may notify the near field secure transmission module in the device 1 of the dialing result. Then, the near field secure transmission module in the device 1 may notify the near field secure transmission module in the device 2 of the dialing result. Then, the near field secure transmission module in the device 2 may notify the phone service module in the device 2 of the dialing result. Then, the phone service module in the device 2 may notify the communication interface in the device 2 of the dialing result. Finally, the communication interface in the device 2 may notify the phone app in the device 2 of the dialing result.

It may be understood that the dialing result may be that the dialing succeeds or the dialing fails, or a peer party is busy, or the like, which is not limited herein.

S4805*a*: The phone app in the device 2 sends an audio data packet 1 to the communication interface.

S4805*b*: The communication interface in the device 2 sends the audio data packet 1 to the phone service in the device 2.

After the phone app in the device 2 determines that the dialing succeeds, the phone app in the device 2 may send the audio data packet 1 to the phone service module of the device 2 through the communication interface.

S4805*c*: The phone service module in the device 2 sends the audio data packet 1 to the near field secure transmission module in the device 2.

S4805*d*: The near field secure transmission module in the device 2 sends the audio data packet 1 to the near field secure transmission module in the device 1.

S4805*e*: The near field secure transmission module in the device 1 sends the audio data packet 1 to the phone service module in the device 1.

S4805*f*: The phone service module in the device 1 sends the audio data packet 1 to a base station.

After receiving the audio data packet 1, the phone service module in the device 2 may send the audio data packet 1 to the phone service module in the device 1 through the near field secure transmission in the device 2. Specifically, the phone service module in the device 2 may send the audio data packet 1 to the near field secure transmission module in the device 2. Then, the near field secure transmission module in the device 2 may send the audio data packet 1 to the near field secure transmission module in the device 1. Then, the near field secure transmission module in the device 1 may send the audio data packet 1 to the phone service in the device 1.

After receiving the audio data packet 1, the phone service module in the device 1 may send the audio data packet 1 to the base station.

S4806: The base station sends the audio data packet 1 to a target device, and obtains an audio data packet 2 returned by the target device.

After receiving the audio data packet 1, the base station may send the audio data packet 1 to the target device. The target device is a call answering device. The base station may further obtain the audio data packet 2 returned by the target device.

S4807*a*: The base station returns the audio data packet 2 to the phone service module in the device 1.

S4807*b*: The phone service module in the device 1 returns the audio data packet 2 to the near field secure transmission module in the device 1.

S4807*c*: The near field secure transmission module in the device 1 returns the audio data packet 2 to the near field secure transmission module in the device 2.

S4807*d*: The near field secure transmission module in the device 2 returns the audio data packet 2 to the phone service module in the device 2.

S4807*e*: The phone service module in the device 2 returns the audio data packet 2 to the communication interface in the device 2.

S4807*f*: The communication interface in the device 2 returns the audio data packet 2 to the phone app in the device 2.

The base station may send the returned audio data packet 2 to the phone app in the device 2 through the phone service module in the device 1. Specifically, the base station may return the audio data packet 2 to the phone service module in the device 1. Then, the phone service module in the device 1 may return the audio data packet 2 to the near field secure transmission module in the device 1. Then, the near field secure transmission module in the device 1 may return the audio data packet 2 to the near field secure transmission module in the device 2. Then, the near field secure transmission module in the device 2 may return the audio data packet 2 to the phone service module in the device 2. Then, the phone service module in the device 2 may return the audio data packet 2 to the communication interface in the device 2. Finally, the communication interface in the device 2 may return the audio data packet 2 to the phone app in the device 2.

When the device 2 continuously makes the call to the target device through the SIM card 1 in the device 1, the phone app in the device 2 may continuously send audio data to the base station through the phone service module in the device 1, and then the base station sends the audio data to the target device. Then, the base station sends audio data returned by the target device to the phone service module of the device 1, to send the audio data to the phone service module of the device 2 through the phone service module of the device 1, and then send the audio data to the phone app of the device 2. In other words, the device 1, the device 2, and the base station may repeatedly perform step S4805*a* to step S4807*f*.

In some possible examples, when the device 2 obtains the SIM card information D1 of the SIM card 1 of the device 1, the device 2 may display, on a dialing interface, identifier information of the virtual SIM card generated by using the SIM card information D1 of the SIM card 1. When the user performs dialing by using the identifier information of the virtual SIM card, the phone service module of the device 2 may determine to perform dialing by using the SIM card information of the virtual SIM card. After determining that the SIM card information of the virtual SIM card is stored in the virtual SIM module, the phone service module in the device 2 may indicate the phone service module in the device 1 to perform dialing through the SIM card 1 corresponding to the SIM card information of the virtual SIM card.

Figure 48B:
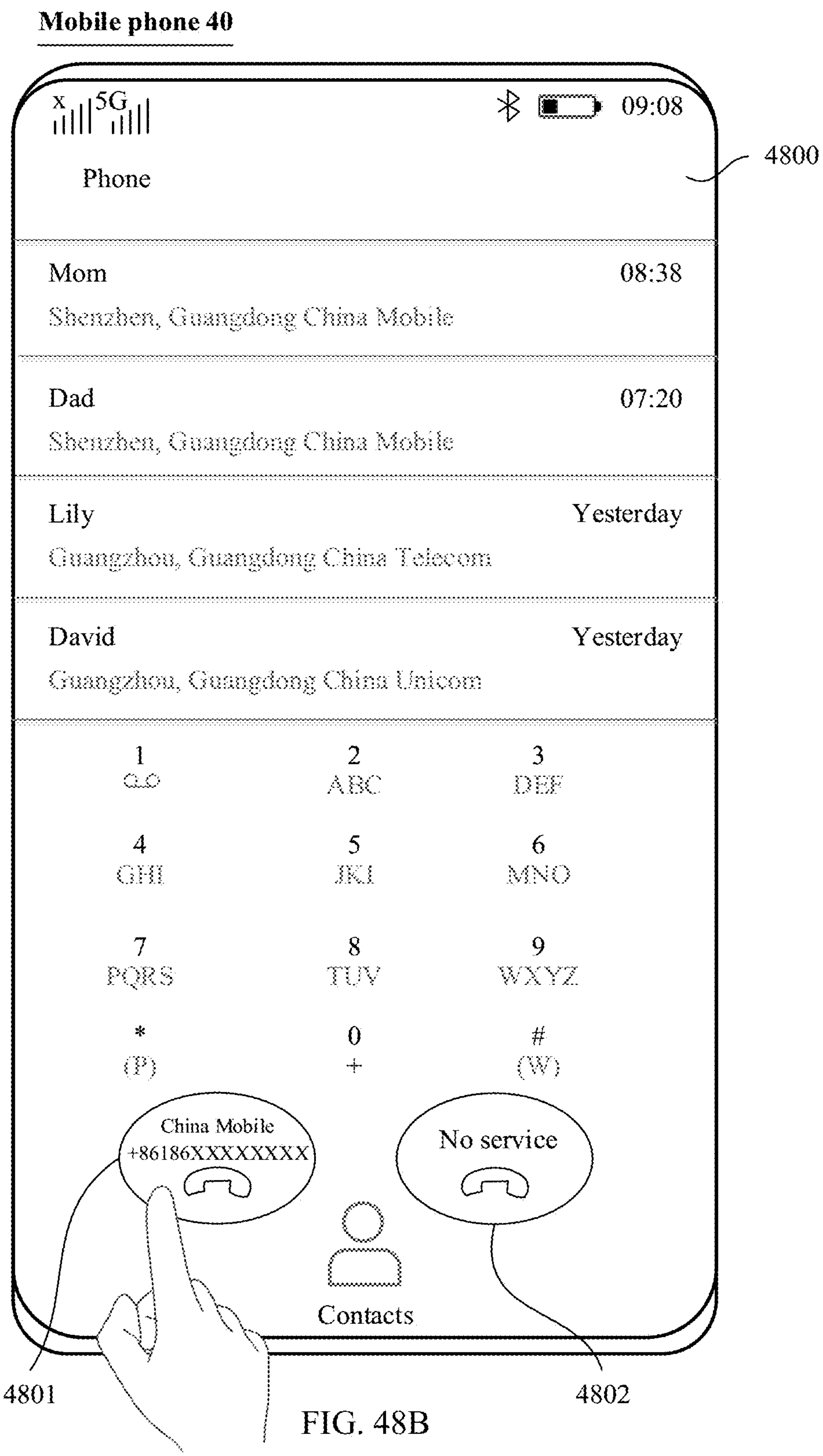
FIG. 48B is a schematic diagram of a user interface according to an embodiment of this application.

For example, as shown in FIG. 48B, a dialing interface 4800 of the mobile phone 40 may include a dialing control 4801 and a dialing control 4802. The dialing control 4801 may include identifier information of the virtual SIM card in the mobile phone 40, namely, the distributed SIM card 2 shown in FIG. 44, for example, an operator name and a subscriber number that correspond to the virtual SIM card. The identifier information of the virtual SIM card shown in the dialing control 4801 is not limited in this application. The user may tap the dialing control 4801, and in response to the user operation, the mobile phone 40 may perform dialing by using the SIM information of the virtual SIM card.

In this way, when no SIM card is inserted into the device 2, or the SIM card inserted into the device 2 has no service, the device 2 may make and answer calls through the SIM card of the device 1. In addition, the SIM card in the device 1 does not need to be removed and inserted into the device 2.

The following uses an example in which the application A is a messaging app to describe in detail how the application A in the device 2 sends an SMS message by using the SIM card information D1 that is of the SIM card 1 of the device 1 and that is obtained by the device 2.

Figures 1, 49A:
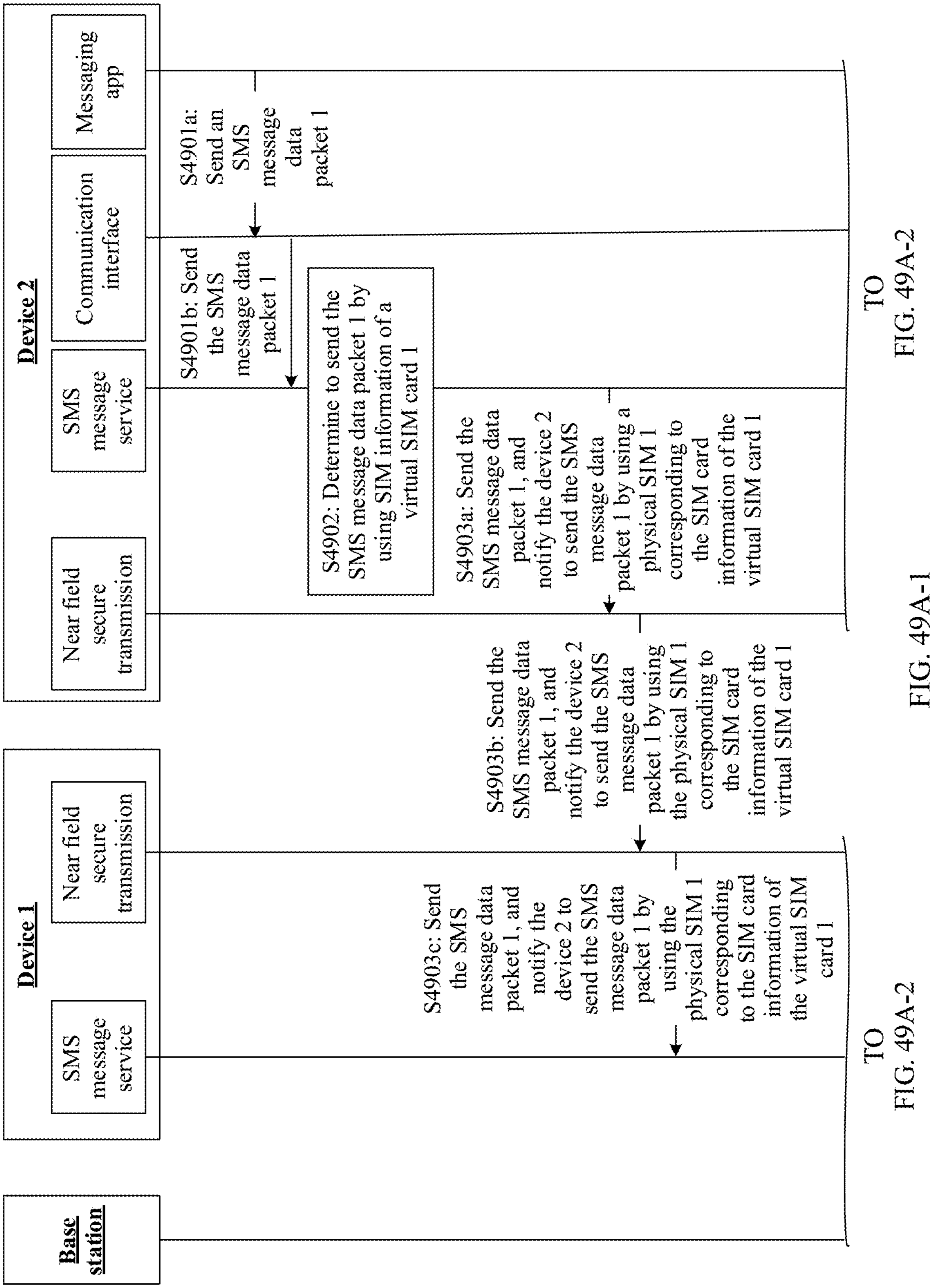
Figures 2, 49A:
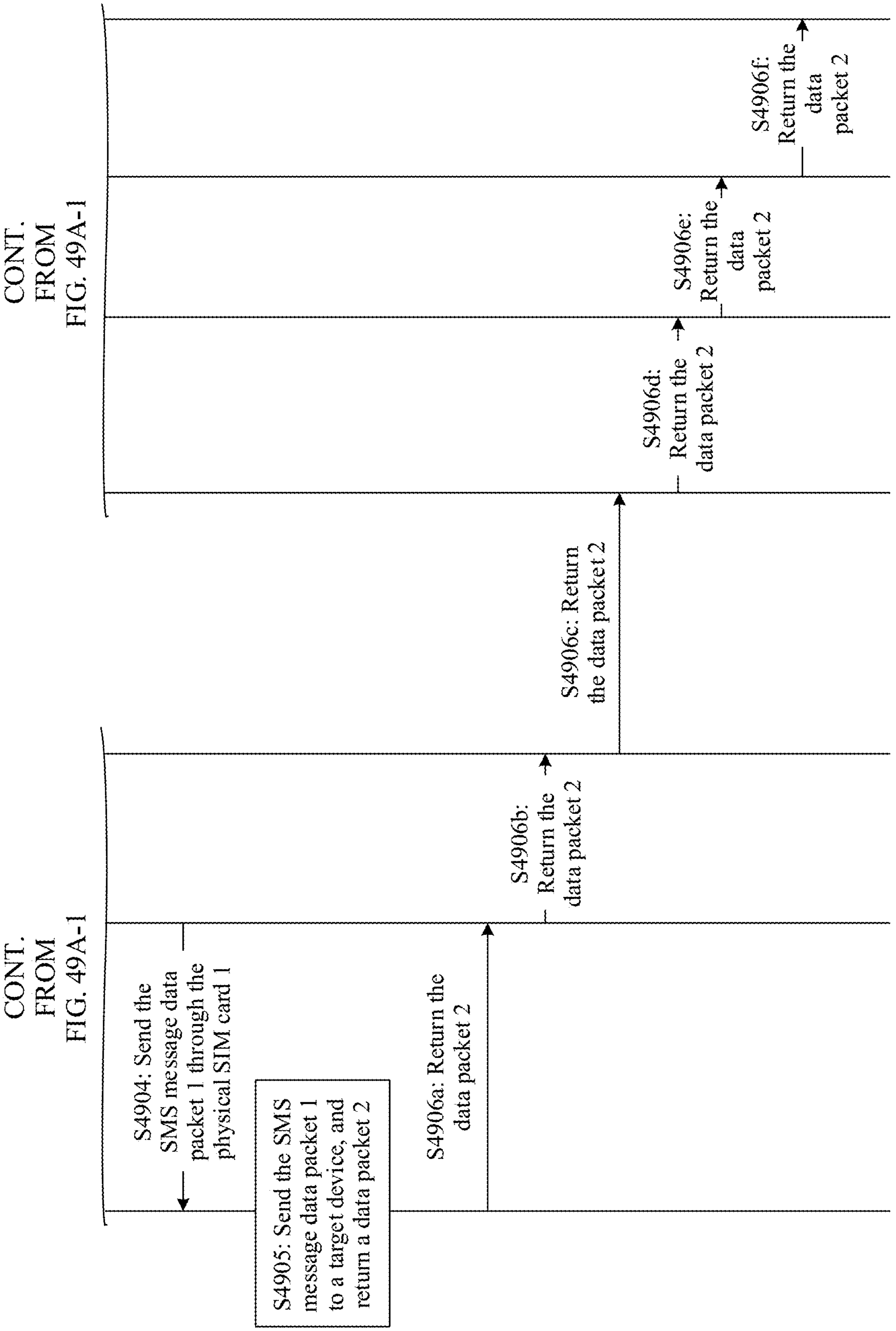

FIG. 49A-1 and FIG. 49A-2 are an example of a schematic interaction diagram in which the phone app in the device 2 sends an SMS message by using the obtained SIM card information D1 of the SIM card 1 of the device 1. As shown in FIG. 49A-1 and FIG. 49A-2, that the phone app in the device 2 sends an SMS message by using the obtained SIM card information D1 of the SIM card 1 of the device 1 may specifically include the following steps.

S4901*a*: The messaging app in the device 2 sends an SMS message data packet 1 to the communication interface in the device 2.

S4901*b*: The communication interface in the device 2 sends the SMS message data packet 1 to an SMS message service module in the device 2.

When the user sends the SMS message by using the messaging app in the device 2, the messaging app in the device 2 may send the SMS message data packet 1 to the SMS message service module in the device 2 through the communication interface.

S4902: The SMS message service module in the device 2 determines to send the SMS message data packet 1 by using the SIM information of the virtual SIM card 1.

After receiving the SMS message data packet 1 sent by the messaging app in the device 2, the SMS message service module in the device 2 may query the card account management in the device 2. If the card account management in the device 2 has only the SIM card information of the virtual SIM card 1 (namely, the SIM card information D1 of the SIM card 1 in the device 1), the SMS message service module in the device 2 determines to send the SMS message data packet 1 by using the SIM card information of the virtual SIM card 1. If SIM card information of a plurality of SIM cards is in the card account management module in the device 2, but the virtual SIM card 1 is set by the user as a primary card, the SMS message service module in the device 2 determines to send the SMS message data packet 1 by using the SIM card information of the virtual SIM card 1.

After the SMS message service module in the device 2 receives the SMS message data packet of the messaging app, the SMS message service module needs to first determine whether there is a SIM card in the device 2. If there is a SIM card in the device 2 and only the virtual SIM card 1 exists, or there is a virtual SIM card and it is determined that the virtual SIM card is set as the primary card, the SMS message service module in the device 2 may determine to send the SMS message by using the SIM card information of the virtual SIM card 1.

It may be understood that the SMS message service module can provide an SMS message receiving and sending service for the device only when the SMS message service module determines that the device has a SIM card (a physical SIM card or a virtual SIM card). When the SMS message service module determines that there is no SIM card in the device, the SMS message service module may not provide an SMS message sending and receiving-related service for the messaging app in the device.

Because the SIM card information of the virtual SIM card does not include related information such as the authentication key and the operator root key, the SMS message service module in the device 2 cannot directly perform authentication with a network device of an operator by using the SIM card information of the virtual SIM card, and cannot directly send an SMS message to the network device. The SMS message service module in the device 2 needs to notify an SMS message service module in the device 1 that provides the SIM card information of the virtual SIM card to receive and send SMS messages.

S4903*a*: The SMS message service module in the device 2 sends an SMS message data packet 1 and a notification message M2 to the near field secure transmission module in the device 2, where the notification message M2 is used to notify the device 1 to send the SMS message data packet 1 through the physical SIM card 1 corresponding to the SIM card information of the virtual SIM card 1.

S4903*b*: The near field secure transmission module in the device 2 sends the SMS message data packet 1 and the notification message M2 to the near field secure transmission module in the device 1, where the notification message M2 is used to notify the device 1 to send the SMS message data packet 1 through the physical SIM card 1 corresponding to the SIM card information of the virtual SIM card 1.

S4903*c*: The near field secure transmission module in the device 1 sends the SMS message data packet 1 and the notification message M2 to the SMS message service module in the device 1, where the notification message M2 is used to notify the device 1 to send the SMS message data packet 1 through the physical SIM card 1 corresponding to the SIM card information of the virtual SIM card 1.

The SMS message service module in the device 2 may send the notification message M2 to the SMS message service module in the device 1 through the near field secure transmission module in the device 2, where the notification message M2 is used to notify the device 1 to send the SMS message data packet 1 through the physical SIM card 1 corresponding to the SIM card information of the virtual SIM card 1. Specifically, the SMS message service module in the device 2 sends the SMS message data packet 1 and the notification message M2 to the near field secure transmission module in the device 2, where the notification message M2 is used to notify the device 1 to send the SMS message data packet 1 through the physical SIM card 1 corresponding to the SIM card information of the virtual SIM card 1. Then, the near field secure transmission module in the device 2 sends the SMS message data packet 1 and the notification message M2 to the near field secure transmission module in the device 1. Then, the near field secure transmission module in the device 1 sends the SMS message data packet 1 and the notification message M2 to the SMS message service module in the device 1.

S4904: The SMS message service module in the device 1 sends the SMS message data packet 1 to a base station through the physical SIM card 1.

After receiving the SMS message data packet 1 and the notification message M2, the SMS message service module in the device 1 may send the SMS message data packet 1 to the base station through the physical SIM card 1.

S4905: The base station sends the SMS message data packet 1 to a target device, and returns a data packet 2.

After receiving the SMS message data packet 1, the base station may parse the SMS message data packet 1, and determine a target corresponding to the SMS message data packet 1. Then, the base station sends the SMS message data packet 1 to the target device. After completing sending, the base station may return the data packet 2. The data packet 2 may indicate that the SMS message data packet 1 is successfully sent or fails to be sent.

S4906*a*: The base station returns the data packet 2 to the SMS message service module in the device 1.

S4906*b*: The SMS message service module in the device 1 returns the data packet 2 to the near field secure transmission module in the device 1.

S4906*c*: The near field secure transmission module in the device 1 returns the data packet 2 to the near field secure transmission module in the device 2.

S4906*d*: The near field secure transmission module in the device 2 returns the data packet 2 to the SMS message service module in the device 2.

S4906*e*: The SMS message service module in the device 2 returns the data packet 2 to the communication interface in the device 2.

S4906*f*: The communication interface in the device 2 returns the data packet 2 to the messaging app in the device 2.

The base station may send the returned data packet 2 to the messaging app in the device 2 through the SMS message service module in the device 1. Specifically, the base station may return the data packet 2 to the SMS message service module in the device 1. Then, the SMS message service module in the device 1 may return the data packet 2 to the near field secure transmission module in the device 1. Then, the near field secure transmission module in the device 1 may return the data packet 2 to the near field secure transmission module in the device 2. Then, the near field secure transmission module in the device 2 may return the data packet 2 to the SMS message service module in the device 2. Then, the SMS message service module in the device 2 may return the data packet 2 to the communication interface in the device 2. Finally, the communication interface in the device 2 may return the data packet 2 to the messaging app in the device 2.

The target device may also return an SMS message to the device 2. Specifically, the target device may send a returned SMS message data packet to the base station, and then the base station sends the SMS message data packet to the device 2 through the device 1. For details herein, refer to step S4906*a* to step S4906*f*.

In some feasible examples, after obtaining the SIM card information D1 of the SIM card 1 in the device 1, the device 2 may display, on an SMS message sending interface, identifier information of the virtual SIM card generated by using the SIM card information D1 of the SIM card 1. The user may select, by using the identifier information of the virtual SIM card, the device 2 to send the SMS message through the virtual SIM card. In response to the user operation, the SMS message service module in the device 2 may determine to send the SMS message by using the SIM card information of the virtual SIM card. When the SMS message service module determines that the SIM card information of the virtual SIM card is stored in the virtual SIM module, the SMS message service module in the device 2 may send the SMS message data packet to the device 1 in which the SIM card 1 corresponding to the SIM card information of the virtual SIM card is located, and the SMS message service module in the device 1 sends the SMS message data packet to the base station.

Figure 49B:
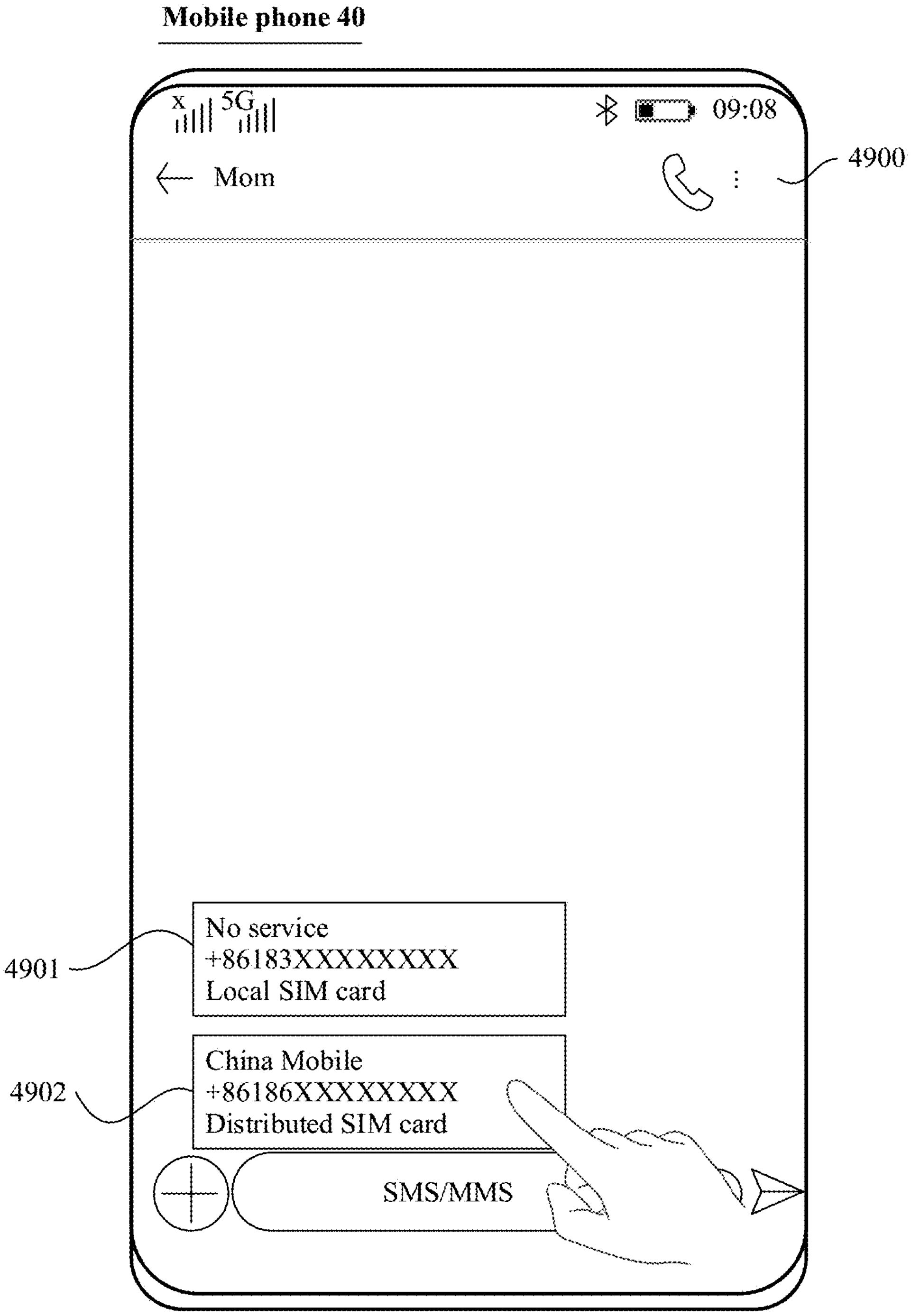
FIG. 49B is a schematic diagram of a user interface according to an embodiment of this application.

For example, FIG. 49B shows an SMS message sending interface 4900 of the mobile phone 40. The SMS message sending interface 4900 may include a tab 4901 and a tab 4902. The tab 4901 may include identifier information of the local SIM card in the mobile phone 40. The tab 4902 may include identifier information of the virtual SIM card. The user may select the tab 4902. In response to the user operation, the SMS message service module in the mobile phone 40 may determine to send an SMS message data packet by using the SIM card information of the virtual SIM card.

In this way, when no SIM card is inserted into the device 2, or the SIM card inserted into the device 2 has no service, the device 2 may receive and send SMS messages through the SIM card of the device 1. In addition, the SIM card in the device 1 does not need to be removed and inserted into the device 2.

The following describes an example electronic device 5000 provided in embodiments of this application.

Figure 50:
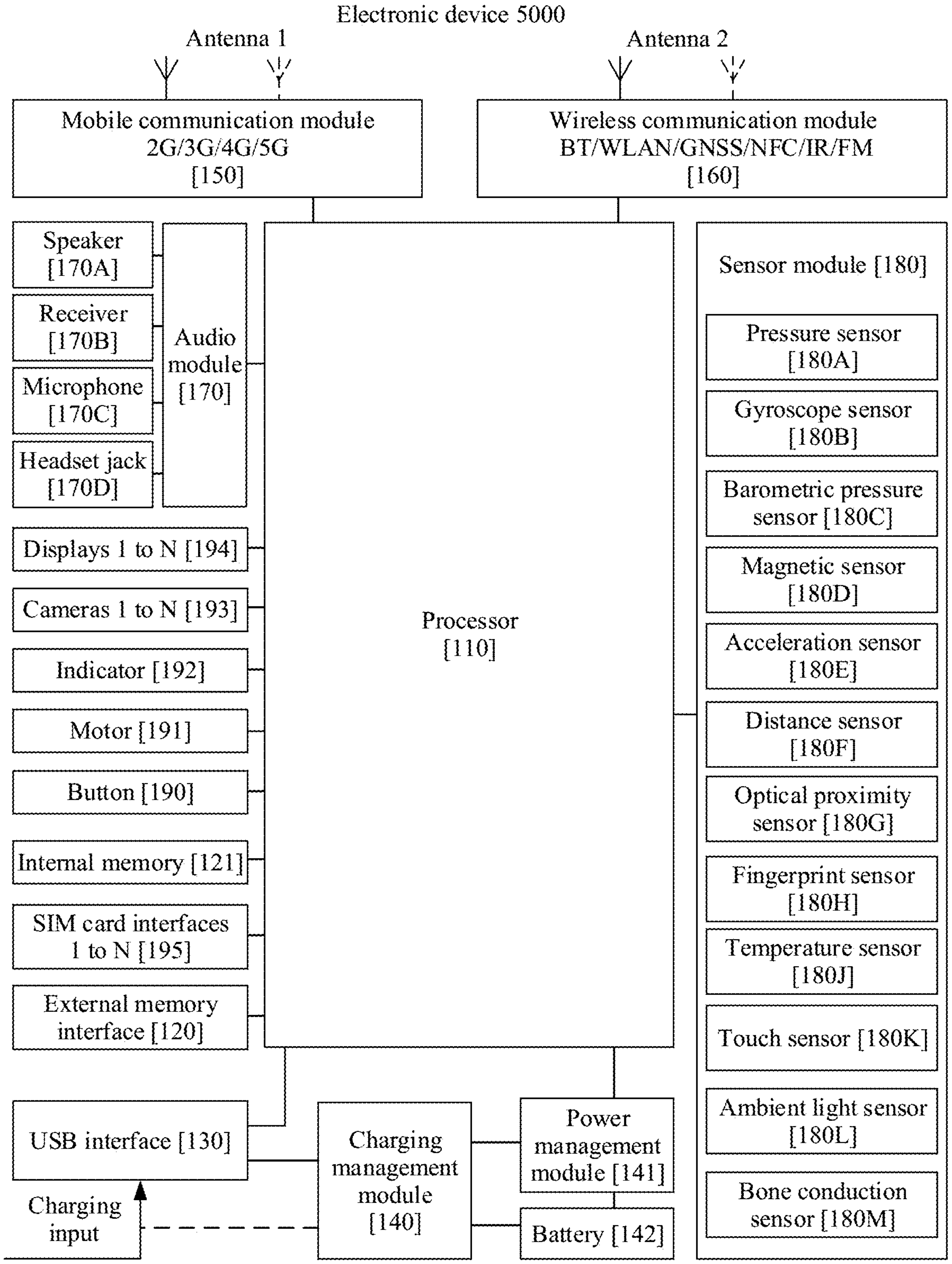
FIG. 50 is a schematic diagram of a structure of an electronic device according to an embodiment of this application.

FIG. 50 is a schematic diagram of a structure of the electronic device 5000 according to an embodiment of this application.

The following uses the electronic device 5000 as an example to describe embodiments in detail. It should be understood that the electronic device 5000 may have more or fewer components than those shown in the figure, or may combine two or more components, or may have different component configurations. Various components shown in the figure may be implemented in hardware including one or more signal processing and/or application-specific integrated circuits, software, or a combination of hardware and software.

The electronic device 5000 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 5000. In some other embodiments of this application, the electronic device 5000 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 5000. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 5000.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement the photographing function of the electronic device 5000. The processor 110 communicates with the display 194 through the DSI interface, to implement a display function of the electronic device 5000.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The SIM interface may be configured to communicate with the SIM card interface 195, to implement a function of transmitting data to a SIM card or reading data in a SIM card.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 5000, or may be configured to transmit data between the electronic device 5000 and a peripheral device, or may be configured to connect to a headset for playing audio through the headset. Alternatively, the interface may be configured to connect to another electronic device, for example, an AR device.

It may be understood that an interface connection relationship between the modules shown in this embodiment of the present invention is merely an example for description, and does not constitute a limitation on the structure of the electronic device 5000. In some other embodiments of this application, the electronic device 5000 may alternatively use an interface connection manner different from that in the foregoing embodiment, or use a combination of a plurality of interface connection manners.

The charging management module 140 is configured to receive a charging input from the charger. The charger may be a wireless charger or a wired charger.

The power management module 141 is configured to connect the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the electronic device 5000 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 5000 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 5000 and that includes wireless communication technologies such as 2G, 3G, 4G, and 5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the electronic device 5000 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 5000, the antenna 1 and the mobile communication module 150 are coupled, and the antenna 2 and the wireless communication module 160 are coupled, so that the electronic device 5000 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 5000 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 5000 may include one or N displays 194, where N is a positive integer greater than 1.

The electronic device 5000 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 5000 may include one or N cameras 193, where N is a positive integer greater than 1.

The digital signal processor is configured to process a digital signal, and may process another digital signal in addition to the digital image signal. For example, when the electronic device 5000 selects a frequency, the digital signal processor is configured to perform Fourier transform on frequency energy, or the like.

The video codec is configured to compress or decompress a digital video. The electronic device 5000 may support one or more video codecs. In this way, the electronic device 5000 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, by referring to a mode of transmission between human brain neurons, and may further continuously perform self-learning. Applications such as intelligent cognition of the electronic device 5000 may be implemented through the NPU, for example, image recognition, facial recognition, voice recognition, and text understanding.

The external memory interface 120 may be configured to connect to an external storage card, for example, a micro SD card, to extend a storage capability of the electronic device 5000. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 5000 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created during use of the electronic device 5000. In addition, the internal memory 121 may include a high-speed random access memory, and may further include a non-volatile memory, for example, at least one magnetic disk storage device, a flash storage device, or a universal flash storage (UFS).

The electronic device 5000 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 5000 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 5000, the receiver 170B may be put close to a human ear to receive a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 5000. In some other embodiments, two microphones 170C may be disposed in the electronic device 5000, to collect a sound signal and implement a noise reduction function. In some other embodiments, three, four, or more microphones 170C may alternatively be disposed in the electronic device 5000, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 5000 determines pressure intensity based on the change in the capacitance. When a touch operation is performed on the display 194, the electronic device 5000 detects intensity of the touch operation through the pressure sensor 180A. The electronic device 5000 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messaging application icon, an instruction for viewing an SMS message is performed. When a touch operation whose touch operation intensity is greater than or equal to the first pressure threshold is performed on the Messaging application icon, an instruction for creating a new SMS message is performed.

The gyroscope sensor 180B may be configured to determine a motion posture of the electronic device 5000. In some embodiments, an angular velocity of the electronic device 5000 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 5000 jitters, calculates, based on the angle, a distance for which a lens module needs to compensate, and allows the lens to cancel the jitter of the electronic device 5000 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 5000 calculates an altitude through the barometric pressure measured by the barometric pressure sensor 180C, to assist in positioning and navigation.

The magnetic sensor 180D includes a Hall sensor. The electronic device 5000 may detect opening and closing of a flip cover by using the magnetic sensor 180D. In some embodiments, when the electronic device 5000 is a clamshell phone, the electronic device 5000 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 5000. When the electronic device 5000 is still, a magnitude and a direction of gravity may be detected. The acceleration sensor may be further configured to identify a posture of the electronic device, and is used in an application such as switching between a landscape mode and a portrait mode or a pedometer.

The distance sensor 180F is configured to measure a distance. The electronic device 5000 may measure the distance in an infrared manner or a laser manner. In some embodiments, in a photographing scenario, the electronic device 5000 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 5000 emits infrared light by using the light emitting diode. The electronic device 5000 detects infrared reflected light from a nearby object by using the photodiode. When sufficient reflected light is detected, it may be determined that there is an object near the electronic device 5000. When insufficient reflected light is detected, the electronic device 5000 may determine that there is no object near the electronic device 5000. The electronic device 5000 may detect, by using the optical proximity sensor 180G, that the user holds the electronic device 5000 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 5000 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 5000 is in a pocket, to avoid an accidental touch.

The fingerprint sensor 180H is configured to collect a fingerprint. The electronic device 5000 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 5000 executes a temperature processing policy by using the temperature detected by the temperature sensor 180J. For example, when the temperature reported by the temperature sensor 180J exceeds a threshold, the electronic device 5000 lowers performance of a processor located near the temperature sensor 180J, to reduce power consumption to implement thermal protection. In some other embodiments, when the temperature is lower than another threshold, the electronic device 5000 heats the battery 142 to prevent the electronic device 5000 from being shut down abnormally because of a low temperature. In some other embodiments, when the temperature is lower than still another threshold, the electronic device 5000 boosts an output voltage of the battery 142 to avoid abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 5000 at a location different from that of the display 194.

The button 190 includes a power button, a volume button, and the like. The button 190 may be a mechanical button or a touch button. The electronic device 5000 may receive a button input, and generate a button signal input related to a user setting and function control of the electronic device 5000.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. The touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 5000. The electronic device 5000 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 5000 interacts with a network through the SIM card, to implement functions such as calling and data communication.

The electronic device 5000 may be the device A, the device 10A, the device 20A, the device 30A, the device 40A, the device 30B, the device 40B, or the device 1. Optionally, the electronic device 5000 may have no SIM interface. When the electronic device 5000 has no SIM card or has no SIM card capability, the electronic device 5000 may be the device B, the device 2, the device 10B, or the device 20B.

Figure 51:
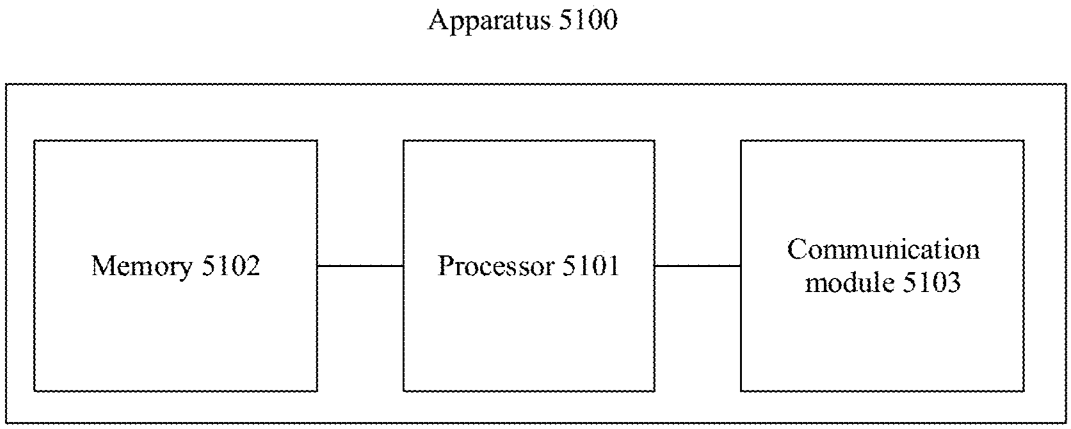
FIG. 51 is a schematic diagram of a structure of an apparatus according to an embodiment of this application.

As shown in FIG. 51, an embodiment of this application may further provide an apparatus 5100. The apparatus 5100 may include a processor 5101, a memory 5102, and a communication module 5103.

The processor 5101 may be configured to indicate the communication module 5103 to obtain SIM card information of a SIM card 1 of another apparatus.

The processor 5101 may be further configured to indicate the memory 5102 to store the obtained SIM card information of the SIM card 1.

The processor 5101 may be further configured to obtain, based on a request of an application in the apparatus 5100 for querying the SIM card information, the SIM card information of the SIM card 1 stored in the memory 5102.

The processor 5101 may be further configured to indicate, based on a request of an application in the apparatus 5100 for establishing a cellular mobile data network, the communication module 5103 to send indication information 1 to an apparatus corresponding to the SIM card information of the SIM card 1, where the indication information 1 indicates the apparatus corresponding to the SIM card information of the SIM card 1 to establish a cellular mobile data network service by using the SIM card information of the SIM card 1.

The processor 5101 may be further configured to indicate the communication module 5103 to send indication information 2 to an apparatus corresponding to the SIM card information of the SIM card 1, where the indication information 2 indicates the apparatus corresponding to the SIM card information of the SIM card 1 to make a call through the SIM card 1.

The processor 5101 may be further configured to indicate the communication module 5103 to send indication information 3 to an apparatus corresponding to the SIM card information of the SIM card 1, where the indication information 3 indicates the apparatus corresponding to the SIM card information of the SIM card 1 to send an SMS message data packet to a base station through the SIM card 1.

The memory 5102 may be configured to store the SIM card information of the SIM card 1 of the another apparatus.

The communication module 5103 may be configured to obtain the SIM card information of the SIM card 1 of the another apparatus.

The communication module 5103 may be further configured to send the indication information 1, the indication information 2, and the indication information 3.

Optionally, in some feasible examples, the apparatus 5100 may be the device 10, the device 20B, the device 30B, the device 40B, or the device 2.

An embodiment of this application further provides a communication sharing system 5200. The communication sharing system 5200 may include an apparatus 5201, an apparatus 5202, and an apparatus 5203.

When the apparatus 5202 is enabled, a distributed networking management module 52023 in the apparatus 5202 may detect whether the apparatus 5201 can provide a network connection for the apparatus 5202, and detect network quality of a cellular mobile data network provided by the apparatus 5201.

When the apparatus 5201 can provide the network connection, and the network quality of the cellular mobile data network provided by the apparatus 5201 is good (for example, a network data transmission delay is less than a first threshold, or a data transmission rate is greater than a second threshold), a communication module 52011 in the apparatus 5201 may transmit network data to an application 52021 in the apparatus 5202 through a network interface 52012 and a network interface 52022 that is in the apparatus 5202.

When the apparatus 5201 cannot provide the network connection, and the network quality of the cellular mobile data network provided by the apparatus 5201 is poor (for example, a network data transmission delay is greater than a first threshold, or a data transmission rate is less than a second threshold), the distributed networking management module 52023 in the apparatus 5202 indicates a Wi-Fi module 52024 in the apparatus 5202 to establish a connection to a Wi-Fi module 52032 in the apparatus 5203. For example, the Wi-Fi module 52024 and the Wi-Fi module 52032 may establish a communication connection through Wi-Fi point to point (P2P). The Wi-Fi module 52024 may obtain, through the Wi-Fi module 52032, a network provided by the communication module 52031. Then, the Wi-Fi module 52024 may transmit the network provided by the communication module 52031 to the application 52021.

For details about how the apparatus 5202 uses the network provided by the apparatus 5203, refer to the descriptions of sharing the cellular mobile data network of the device 1 with the device 2 in FIG. 47A to FIG. 47C. Details are not described herein again.

In a possible implementation, the apparatus 5201 may be an intelligent vehicle-mounted terminal (telematic box, T-BOX) in a vehicle. The apparatus 5202 may be a cockpit domain controller (CDC) in a vehicle. The apparatus 5203 may be a smartphone.

In some examples, the apparatus 5201 and the apparatus 5202 are combined into one apparatus, and the apparatus may be referred to as an in-vehicle infotainment.

An embodiment of this application provides a communication sharing method. The method may be applied to a communication sharing system, the system includes a first device, a second device, and a network device, and the method includes: The first device displays a first collaboration interface, where an icon of the first device and an icon of the second device are displayed on the first collaboration interface; the first device detects a first operation, where the first operation is used to enable the icon of the second device to approach the icon of the first device; the first device displays a first option box in response to the first operation, where the first option box is used to select to share a mobile communication capability of the second device; the first device detects a second operation, where the second operation is used to select the first device for sharing the mobile communication capability of the second device; the first device obtains first information in SIM card information of a first SIM card of the second device in response to the second operation; the first device receives a first request of a first application; the first device sends the first request of the first application to the second device, and indicates the second device to send the first request to the network device based on the first SIM card corresponding to the first information; the second device sends the first request to the network device; the network device sends a first response to the second device based on the first request; and the second device sends the first response to the first device. In this way, based on the first information in the first SIM card information of the second device, the mobile communication capability provided by the first SIM card in the second device may be shared with the first device. In this way, when no SIM card is inserted into the first device or the first device has no SIM card capability, the first device can still use a mobile communication network through the first SIM card in the first device, to access the Internet, make and answer calls, receive and send SMS messages, and the like.

Figure 53:
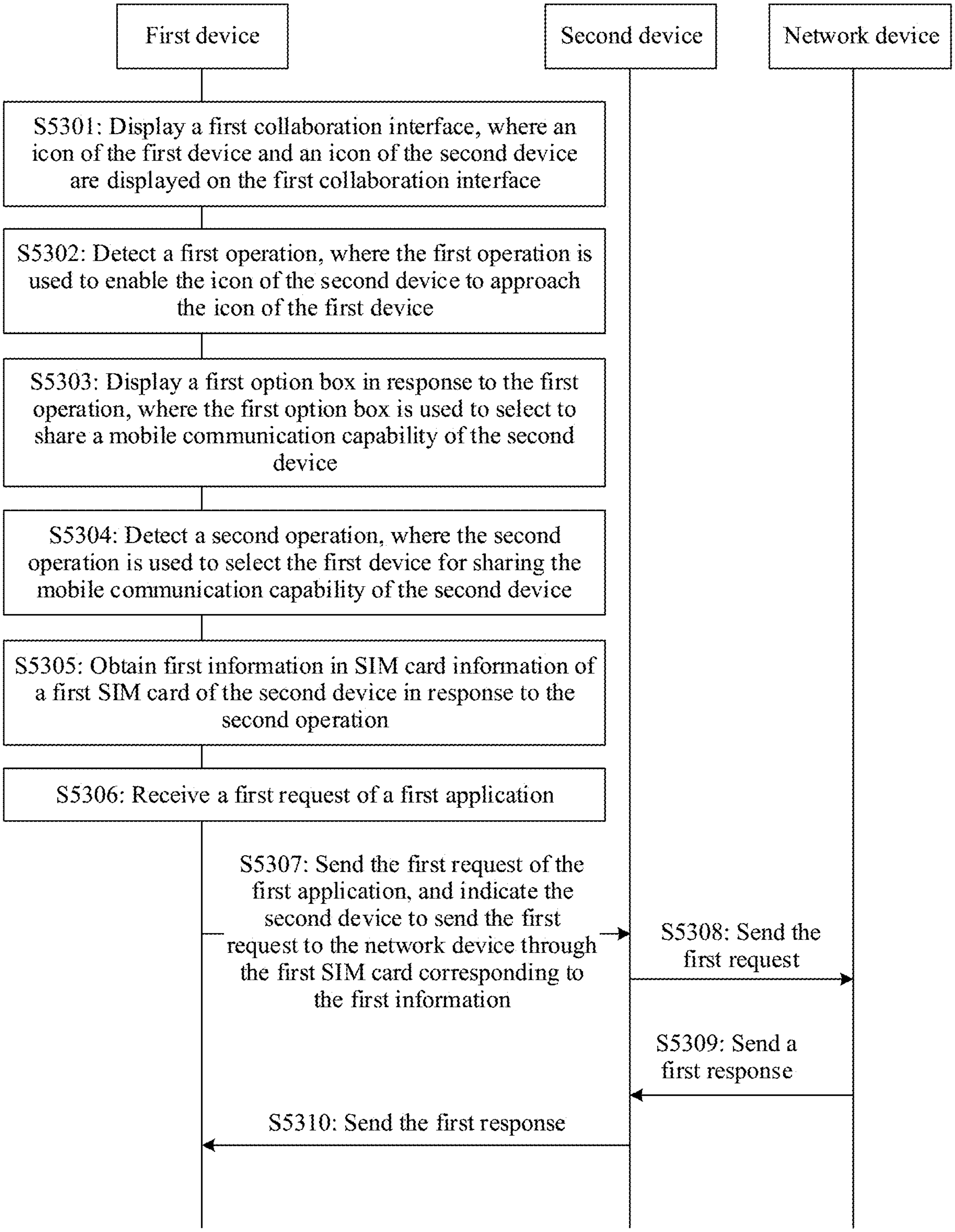
FIG. 53 is a flowchart of a communication sharing method according to an embodiment of this application.

FIG. 53 is an example of a flowchart of a communication sharing method. As shown in FIG. 53, a communication sharing method provided in an embodiment of this application may include the following steps.

S5301: A first device displays a first collaboration interface, where an icon of the first device and an icon of a second device are displayed on the first collaboration interface.

S5302: The first device detects a first operation, where the first operation is used to enable the icon of the second device to approach the icon of the first device.

S5303: The first device displays a first option box in response to the first operation, where the first option box is used to select to share a mobile communication capability of the second device.

S5304: The first device detects a second operation, where the second operation is used to select the first device for sharing the mobile communication capability of the second device.

S5305: The first device obtains first information in SIM card information of a first SIM card of the second device in response to the second operation.

S5306: The first device receives a first request of a first application.

S5307: The first device sends the first request of the first application to the second device, and indicates the second device to send the first request to the network device through the first SIM card corresponding to the first information.

S5308: The second device sends the first request to the network device.

S5309: The network device sends a first response to the second device based on the first request.

S5310: The second device sends the first response to the first device.

In this embodiment of this application, the first device may be the device 2, the tablet 50, or the apparatus 5202 described above. The second device may be the device 1 or the apparatus 5203 described above. The network device may be the base station described above.

In the examples shown in FIG. 5 to FIG. 37, the mobile communication capability provided by the mobile phone 40 may be shared with the tablet 50. In this scenario, the mobile phone 40 may also be referred to as a second device.

In the examples shown in FIG. 44 and FIG. 45, the mobile communication capability provided by the mobile phone 70 may be shared with the mobile phone 40. In this scenario, the mobile phone 40 may be referred to as a first device. The mobile phone 70 may be referred to as a second device.

The SIM card information of the first SIM card includes at least one of the following items: an integrated circuit card identity ICCID, an international mobile subscriber identity IMSI, a mobile subscriber international integrated services digital network number MSISDN, an authentication key, an operator root key, and an authentication algorithm; and the first information includes at least one of the following items: the integrated circuit card identity ICCID, the international mobile subscriber identity IMSI, and the mobile subscriber international integrated services digital network number MSISDN in the SIM card information of the first SIM card.

Figure 52:
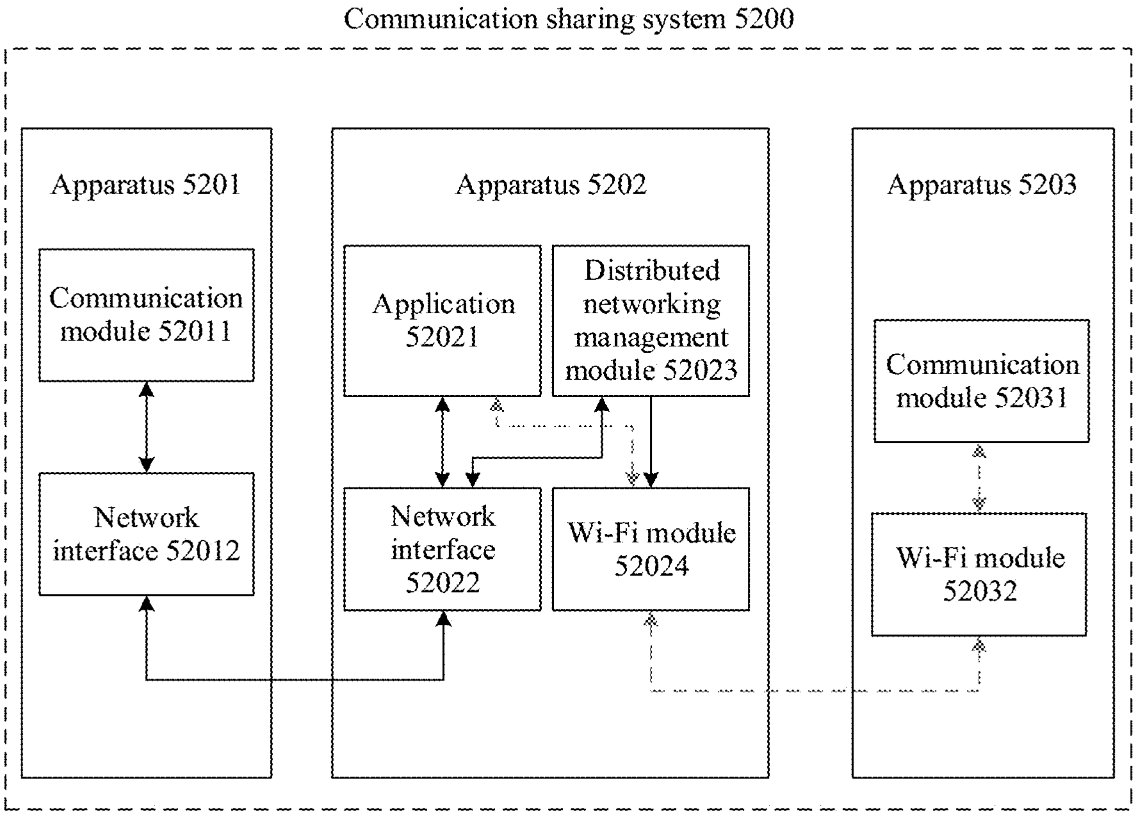
FIG. 52 is a schematic diagram of a communication sharing system according to an embodiment of this application.

In this embodiment of this application, the first device may alternatively automatically establish a connection to the second device, and obtain the first information in the SIM information of the first SIM card in the second device. For example, when the first device has no network service or network quality deteriorates, the first device may automatically connect to the second device, obtain the first information in the SIM information of the first SIM card in the second device, and use the mobile communication network by using the mobile communication capability provided by the first SIM card in the second device. For example, for details herein, refer to the descriptions that the apparatus 5202 accesses the Internet by using the mobile communication network of the apparatus 5203 in FIG. 52. Details are not described herein again.

In some feasible examples, a user may alternatively perform manual connection on the first device or the second device, so that the first device obtains the first information in the SIM information of the first SIM card in the second device. For example, in an operation process shown in steps S5301 to S5305, the user may establish a connection between the first device and the second device on the first collaboration interface of the first device, so that the first device obtains the first information in the SIM information of the first SIM card in the second device. The first collaboration interface may be the user interface 700 shown in FIG. 7. For example, for details about how the user establishes the connection between the first device and the second device on the first collaboration interface, refer to the descriptions in FIG. 5 to FIG. 11. Details are not described herein again.

Optionally, in a possible implementation, the user may alternatively establish a connection between the first device and the second device on a setting interface of the first device, so that the first device obtains the first information in the SIM information of the first SIM card in the second device. For example, for details, refer to the descriptions in FIG. 12 to FIG. 15. Details are not described herein again.

Optionally, in a possible implementation, the user may alternatively establish a connection between the first device and the second device on a second collaboration interface of the second device, so that the first device obtains the first information in the SIM information of the first SIM card in the second device. For example, for details, refer to the descriptions in FIG. 22 to FIG. 28. Details are not described herein again.

Optionally, in a possible implementation, the user may further establish a connection between the first device and the second device on a setting interface of the second device, so that the first device obtains the first information in the SIM information of the first SIM card in the second device. For example, for details, refer to the descriptions in FIG. 29 to FIG. 37. Details are not described herein again.

Optionally, in a possible implementation, the first device may automatically display a prompt box, and the user may select, by using the prompt box, to establish a connection between the first device and the second device, so that the first device obtains the first information in the SIM information of the first SIM card in the second device. For example, for details, refer to the descriptions in FIG. 20. Details are not described herein again.

After the first device establishes the connection to the second device, and the first device obtains the first information in the SIM information of the first SIM card in the second device, the first device may display indication information, to prompt that the mobile communication capability of the second device is shared with the first device.

In a possible implementation, after the first device establishes the connection to the second device, and the first device obtains the first information in the SIM information of the first SIM card in the second device, first prompt information may be displayed in a status bar of the first device. The first prompt information includes at least one of the following items: signal strength of mobile communication provided by the first SIM card, an operator name corresponding to the first SIM card, and a network standard corresponding to the first SIM card. For example, as shown in FIG. 10, the signal strength indicator 1004 of the mobile communication signal or the operator name "China Mobile" 1005 is displayed in the status bar of the tablet 50. For details, refer to the descriptions in FIG. 10. Details are not described herein again.

In a possible implementation, the first device displays second prompt information, where the second prompt information indicates that the first device uses the mobile communication capability of the second device. For example, as shown in FIG. 16, the icon 1605 may be displayed in the super device card 1604 on the tablet 50. For details, refer to the descriptions in FIG. 16. Details are not described herein again.

After the first device disconnects from the second device, the first device stops displaying the indication information that prompts that the mobile communication capability of the second device is shared with the first device.

In a possible implementation, the first device disconnects from the second device, and the first device stops displaying the first prompt information. For example, the tablet 50 shown in FIG. 17 no longer displays the signal strength indicator 1004 of the mobile communication signal or the operator name "China Mobile" 1005. For details, refer to the descriptions in FIG. 17. Details are not described herein again.

In a possible implementation, the first device stops displaying the second prompt information. For example, a related icon indicating that the mobile phone 40 shares the mobile communication capability with the tablet 50 is no longer displayed in the super device card 604 of the tablet 50 shown in FIG. 17. For details, refer to the descriptions in FIG. 17. Details are not described herein again.

In a possible implementation, after the first device establishes the connection to the second device, and the first device obtains the first information in the SIM information of the first SIM card in the second device, the second device also displays indication information, to indicate that the second device shares the mobile communication capability, for example, the icon 2702 on the user interface 2700 of the mobile phone 40 shown in FIG. 27 and the icon 3602 on the user interface 3600 of the mobile phone 40 shown in FIG. 36. For details, refer to the descriptions in FIG. 27 and FIG. 36. Details are not described herein again.

In a possible implementation, the first device may further display a first notification box, where the first notification box is used to display a value of traffic that is used by the first device and that is of a mobile communication network provided by the second device, for example, the notification box 2101 displayed in FIG. 21. For details, refer to the descriptions in FIG. 21. Details are not described herein again.

In a possible implementation, the second device displays a second notification box, where the second notification box is used to display a value of traffic that is used by the first device and that is of a mobile communication network provided by the second device, for example, the notification box 3302 displayed in FIG. 33. For details, refer to the descriptions in FIG. 33. Details are not described herein again.

Optionally, in a possible implementation, the user may further customize, in the second device, mobile traffic that can be shared by the second device with the first device each month, for example, the prompt information 3401 shown in FIG. 34. For details, refer to the descriptions in FIG. 34. Details are not described herein again.

Optionally, in a possible implementation, after the first device obtains the first information in the SIM card information of the first SIM card of the second device, the first device may further generate a virtual SIM card based on the first information in the SIM card information of the first SIM card, and display the virtual SIM card on a SIM card management interface, for example, the card 2 shown in FIG. 44. For details, refer to the descriptions in FIG. 44. Details are not described herein again.

In a possible implementation, the first request is used to request to establish a cellular mobile data network, and the first response indicates that the cellular mobile data network is successfully established. Specifically, for details about how the first device obtains cellular mobile network data by using the first information in the SIM card information of the first SIM card after obtaining the first information in the SIM card information of the first SIM card of the second device, refer to the descriptions in FIG. 47A to FIG. 47C. Details are not described herein again.

In a possible implementation, the first request is used to request to make a call, and the first response indicates that the call is successfully made. Specifically, for details about how the first device makes the call by using the first information in the SIM card information of the first SIM card after obtaining the first information in the SIM card information of the first SIM card of the second device, refer to the descriptions in FIG. 48A-1 to FIG. 48A-3. Details are not described herein again.

In a possible implementation, the first request is used to request to send first SMS message data, the first request carries the first SMS message data, and the first response indicates that the first SMS message data is successfully sent. Specifically, for details about how the first device sends the SMS message by using the first information in the SIM card information of the first SIM card after obtaining the first information in the SIM card information of the first SIM card of the second device, refer to the descriptions in FIG. 49A-1 and FIG. 49A-2. Details are not described herein again.

In this embodiment of this application, that the second device sends the first request to the network device by using or through the first SIM card corresponding to the first information means that the second device uses the first SIM card corresponding to the first information to perform authentication with the network device. After the authentication succeeds and a data transmission channel is established, the second device may send the first request to the network device.

In this way, according to the communication sharing method provided in embodiments of this application, based on the first information in the first SIM card information of the second device, the mobile communication capability provided by the first SIM card in the second device may be shared with the first device. In this way, when no SIM card is inserted into the first device or the first device has no SIM card capability, the first device can still use a mobile communication network through the first SIM card in the first device, to access the Internet, make and answer calls, receive and send SMS messages, and the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the processes of the methods in embodiments may be implemented by a computer program instructing related hardware. The program may be stored in a computer-readable storage medium. When the program runs, the processes of the methods in embodiments are performed.

The storage medium includes any medium that can store program code, such as a ROM, a random access memory RAM, a magnetic disk, or an optical disc.

The invention claimed is:

1. A communication sharing method, wherein the method is applied to a first device, and the method comprises:

displaying, by the first device, a first collaboration interface, wherein an icon of the first device and an icon of a second device are displayed on the first collaboration interface;

detecting, by the first device, a first operation, wherein the first operation is used to enable the icon of the second device to approach the icon of the first device;

displaying, by the first device, a first option box in response to the first operation, wherein the first option box is used to select to share a mobile communication capability of the second device;

detecting, by the first device, a second operation, wherein the second operation is used to share the mobile communication capability of the second device;

obtaining, by the first device, first information in SIM card information of a first SIM card of the second device in response to the second operation;

receiving, by the first device, a first request of a first application;

sending, by the first device, the first request of the first application to the second device, and indicating the second device to send the first request of the first application to a network device through the first SIM card corresponding to the first information; and receiving, by the first device, a first response sent by the second device, wherein the first response is sent by the network device to the second device after the network device receives the first request of the first application sent by the second device.

2. The method according to claim 1, wherein, after the obtaining, by the first device, first information in SIM card information of a first SIM card of the second device in response to the second operation, the method further comprises:

displaying, by the first device, first prompt information in a status bar of the first device, wherein the first prompt information comprises at least one of the following items: signal strength of mobile communication provided by the first SIM card, an operator name corresponding to the first SIM card, or a network standard corresponding to the first SIM card.

3. The method according to claim 2, wherein, after the displaying, by the first device, first prompt information in a status bar of the first device, the method further comprises:

disconnecting, by the first device, from the second device, and stopping, by the first device, displaying the first prompt information.

4. The method according to claim 1, wherein, after the obtaining, by the first device, first information in SIM card information of a first SIM card of the second device in response to the second operation, the method further comprises:

displaying, by the first device, second prompt information, wherein the second prompt information indicates that the first device uses the mobile communication capability of the second device.

5. The method according to claim 1, wherein, after the displaying, by the first device, second prompt information, the method further comprises:

disconnecting, by the first device, from the second device, and stopping, by the first device, displaying the second prompt information.

6. The method according to claim 1, wherein the method further comprises:

displaying, by the first device, a first prompt box, wherein the first prompt box indicates whether a user selects the first device to use the mobile communication capability of the second device;

detecting, by the first device, a third operation, wherein the third operation is used to select, in the first prompt box, the first device to use the mobile communication capability of the second device; and obtaining, by the first device, the first information in the SIM card information of the first SIM card of the second device in response to the third operation.

7. The method according to claim 1, wherein the method further comprises:

displaying, by the first device, a first notification box, wherein the first notification box is used to display a value of traffic that is used by the first device and that is of a mobile communication network provided by the second device.

8. The method according to claim 1, wherein, after the obtaining, by the first device, first information in SIM card information of a first SIM card of the second device in response to the second operation, the method further comprises:

displaying a first dialing control on a call making interface of the first device, wherein the first dialing control indicates the first device to perform dialing through the first SIM card of the second device.

9. The method according to claim 1, wherein, after the obtaining, by the first device, first information in SIM card information of a first SIM card of the second device in response to the second operation, the method further comprises:

displaying a first tab on an SMS message sending interface of the first device, wherein the first tab is used by the first device to select to send an SMS message through the first SIM card of the second device.

10. The method according to claim 1, wherein, after the obtaining, by the first device, first information in SIM card information of a first SIM card of the second device in response to the second operation, the method further comprises:

displaying a first virtual SIM card on a SIM card management interface of the first device, wherein the first virtual SIM card is generated by the first device based on the first information.

11. The method according to claim 10, wherein there is a second SIM card in the first device, and the method further comprises:

displaying an intelligent switching option on the SIM card management interface of the first device, wherein the intelligent switching option is used to enable or disable intelligent selection, of the first virtual SIM card or the second SIM card, that is performed by the first device for mobile communication.

12. The method according to claim 1, wherein:

the SIM card information of the first SIM card comprises at least one of the following items: an integrated circuit card identity (ICCID), an international mobile subscriber identity (IMSI), a mobile subscriber international integrated services digital network number (MSISDN), an authentication key, an operator root key, and an authentication algorithm; and the first information comprises at least one of the following items: the integrated circuit card identity (ICCID), the international mobile subscriber identity (IMSI), or the mobile subscriber international integrated services digital network number (MSISDN) in the SIM card information of the first SIM card.

13. The method according to claim 12, wherein, before the receiving, by the first device, a first request of a first application, the method comprises:

detecting, by the first device, a seventh operation, wherein the seventh operation is used to use a first virtual SIM card generated based on the first information as a default dialing card; and setting, by the first device, the first virtual SIM card as the default dialing card in the first device in response to the seventh operation.

14. The method according to claim 11, wherein the second SIM card is inserted into the first device, and the method further comprises:

detecting, by the first device, an eighth operation, wherein the eighth operation is used to set the second SIM card as a default outgoing call display card; and setting, by the first device, the second SIM card as the default outgoing call display card in response to the eighth operation.

15. A communication sharing method, wherein the method is applied to a second device, and the method comprises:

displaying, by the second device, a second collaboration interface, wherein an icon of a first device and an icon of the second device are displayed on the second collaboration interface;

detecting, by the second device, a fifth operation, wherein the fifth operation is used to enable the icon of the first device to approach the icon of the second device;

displaying, by the second device, a second option box in response to the fifth operation, wherein the second option box is used to select to share a mobile communication capability of the second device with the first device;

detecting, by the second device, a sixth operation, wherein the sixth operation is used to select the second device to share the mobile communication capability of the second device with the first device;

sending, by the second device, first information in SIM card information of a first SIM card of the second device to the first device in response to the sixth operation;

receiving, by the second device, a first request of a first application and second indication information that are sent by the first device, wherein the second indication information indicates the second device to send the first request of the first application to a network device through the first SIM card corresponding to the first information;

sending, by the second device, the first request of the first application to the network device; and receiving, by the second device, a first response sent by the network device, and sending the first response to the first device.

16. The method according to claim 15, wherein, after the sending, by the second device, first information in SIM card information of a first SIM card of the second device to the first device in response to the sixth operation, the method further comprises:

displaying, by the second device, third prompt information in a status bar of the second device, wherein the third prompt information indicates that the second device shares the mobile communication capability.

17. The method according to claim 16, wherein, after the displaying, by the second device, third prompt information in a status bar of the second device, the method further comprises:

disconnecting, by the second device, from the first device; and stopping, by the second device, displaying the third prompt information.

18. The method according to claim 16, wherein, after the sending, by the second device, first information in SIM card information of a first SIM card of the second device to the first device in response to the sixth operation, the method further comprises:

displaying, by the second device, fourth prompt information, wherein the fourth prompt information prompts the second device to share the mobile communication capability with the first device.

19. The method according to claim 16, wherein the method further comprises:

displaying, by the second device, a first setting bar, wherein the first setting bar is used to set and display a limit of traffic that is of a mobile communication network and that can be provided by the second device for the first device.

20. The method according to claim 19, wherein the method further comprises:

when a value of traffic that is of the mobile communication network and that is provided by the second device for the first device reaches the limit of the traffic that is of the mobile communication network and that can be provided by the second device for the first device, stopping, by the second device, providing the mobile communication network for the first device.

* * * * *